(12) United States Patent
Walser et al.

(10) Patent No.: US 7,306,355 B2
(45) Date of Patent: Dec. 11, 2007

(54) OPTICS FOR CONTROLLING THE DIRECTION OF LIGHT RAYS AND ASSEMBLIES INCORPORATING THE OPTICS

(75) Inventors: Jeremy A. Walser, Knightdale, NC (US); Darin D. Tuttle, Byron Center, MI (US); John K. Roberts, East Grand Rapids, MI (US); Jeremy A. Fogg, Holland, MI (US); Timothy J. Thomas, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 138 days.

(21) Appl. No.: 10/890,056

(22) Filed: Jul. 13, 2004

(65) Prior Publication Data

US 2006/0012990 A1    Jan. 19, 2006

(51) Int. Cl.
*F21S 4/00* (2006.01)
(52) U.S. Cl. .................. 362/494; 362/498; 362/540; 362/545; 362/549
(58) Field of Classification Search ........... 362/494, 362/498, 541, 542, 540, 543, 544, 545, 548, 362/549, 499, 235
See application file for complete search history.

(56) References Cited

U.S. PATENT DOCUMENTS

| | | | |
|---|---|---|---|
| 1,874,138 A | 8/1932 | Stimson | |
| 2,580,014 A | 12/1951 | Gazda | |
| 4,722,023 A * | 1/1988 | Arima et al. | ............... 362/503 |
| 4,809,137 A | 2/1989 | Yamada | |
| 5,014,167 A | 5/1991 | Roberts | |
| 5,207,492 A | 5/1993 | Roberts | |
| 5,361,190 A | 11/1994 | Roberts et al. | |
| 5,371,659 A | 12/1994 | Pastrick et al. | |
| 5,788,357 A | 8/1998 | Muth et al. | |
| 5,803,579 A | 9/1998 | Turnbull et al. | |
| 6,326,900 B2 * | 12/2001 | DeLine et al. | ........... 340/815.4 |
| 6,335,548 B1 | 1/2002 | Roberts et al. | |
| 6,356,376 B1 | 3/2002 | Tonar et al. | |
| 6,521,916 B2 | 2/2003 | Roberts et al. | |
| 6,550,949 B1 | 4/2003 | Bauer et al. | |
| 6,670,207 B1 | 12/2003 | Roberts | |
| 6,700,502 B1 * | 3/2004 | Pederson | ............... 340/815.45 |
| 6,814,475 B2 | 11/2004 | Amano | |
| 2004/0080958 A1 * | 4/2004 | Bukosky et al. | ............ 362/494 |

* cited by examiner

*Primary Examiner*—Sharon Payne
(74) *Attorney, Agent, or Firm*—James E. Shultz, Jr.

(57) ABSTRACT

The present invention relates to improvements in controlling the direction of light rays. Various assemblies incorporating these inventive concepts are provided.

34 Claims, 45 Drawing Sheets

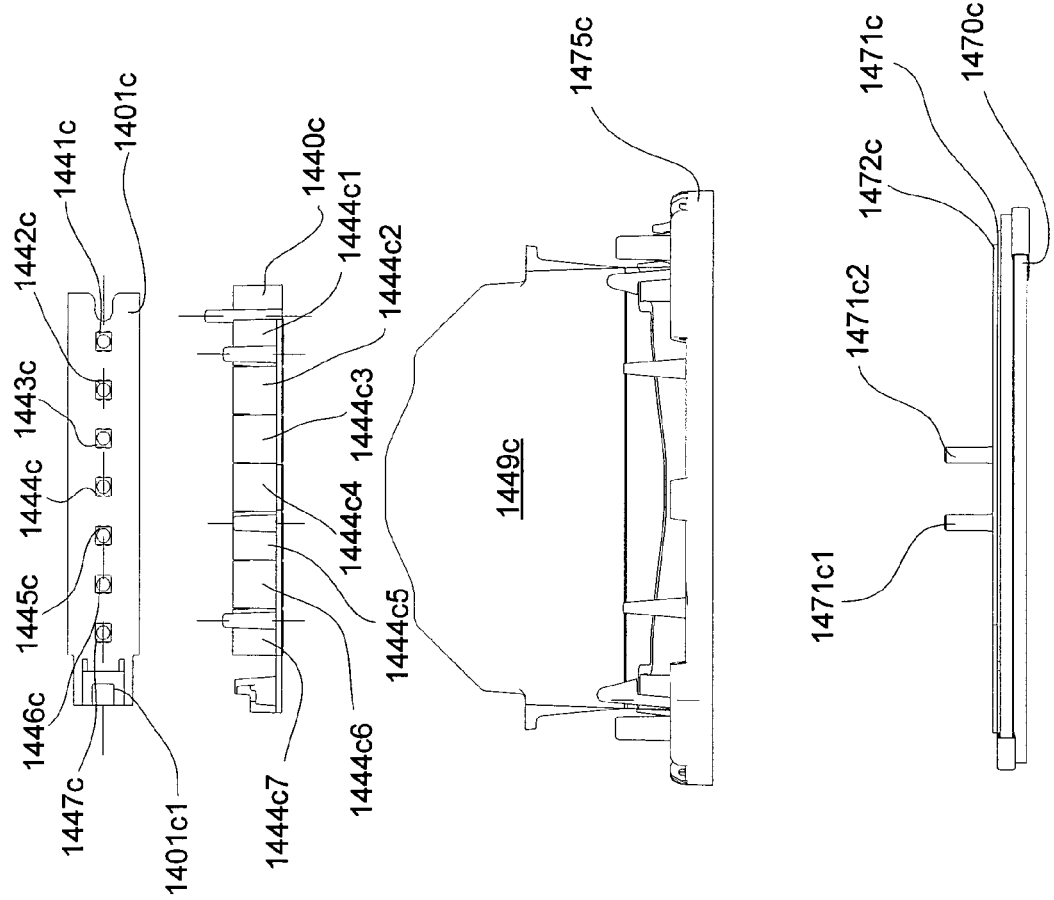

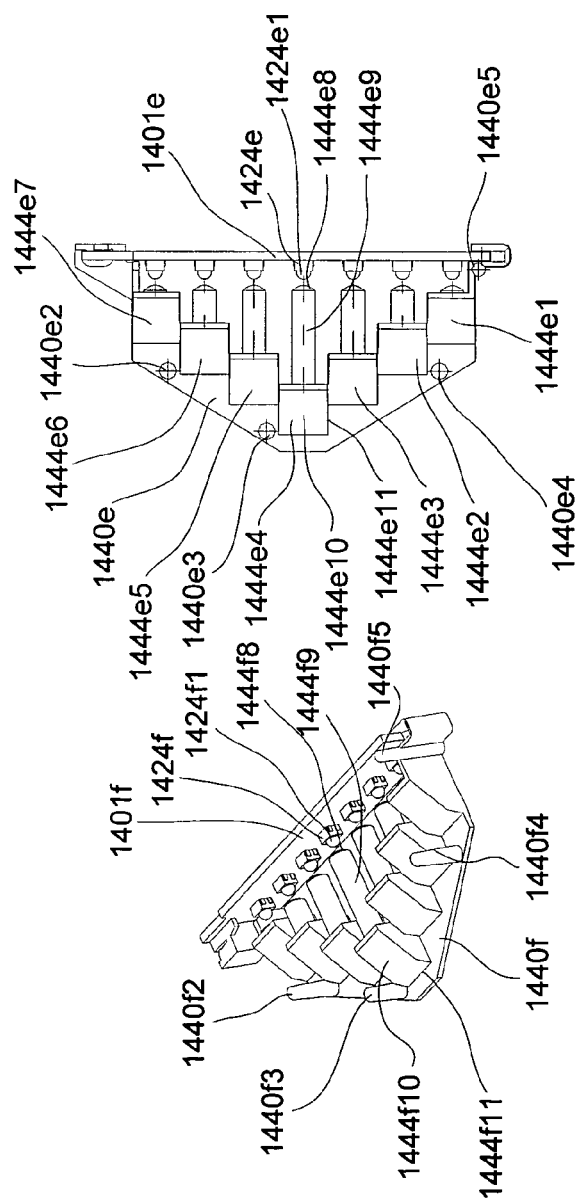
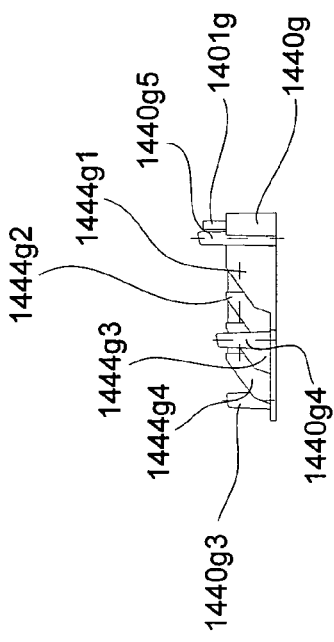
Fig. 14h
Fig. 14e
Fig. 14f
Fig. 14g

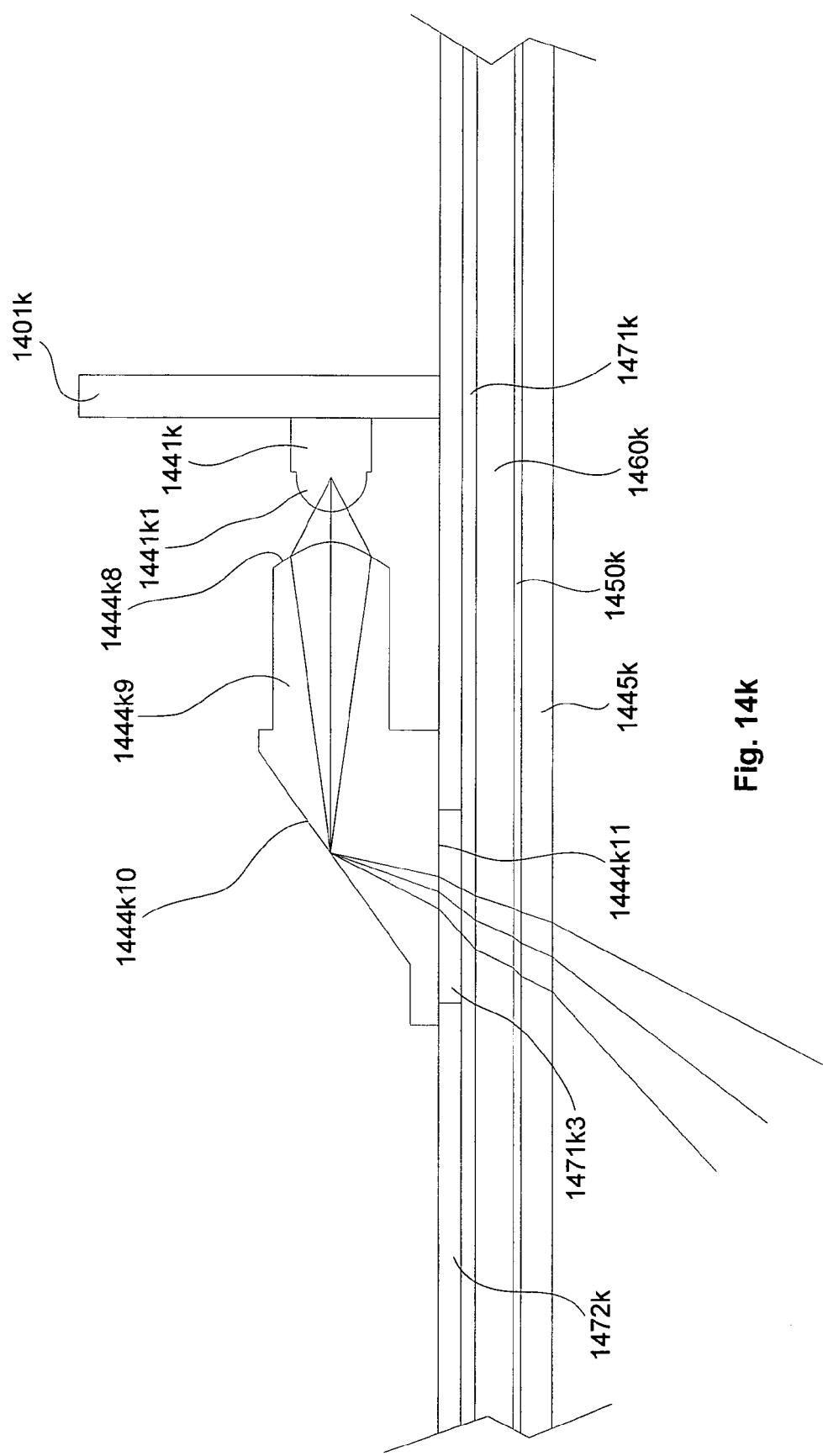

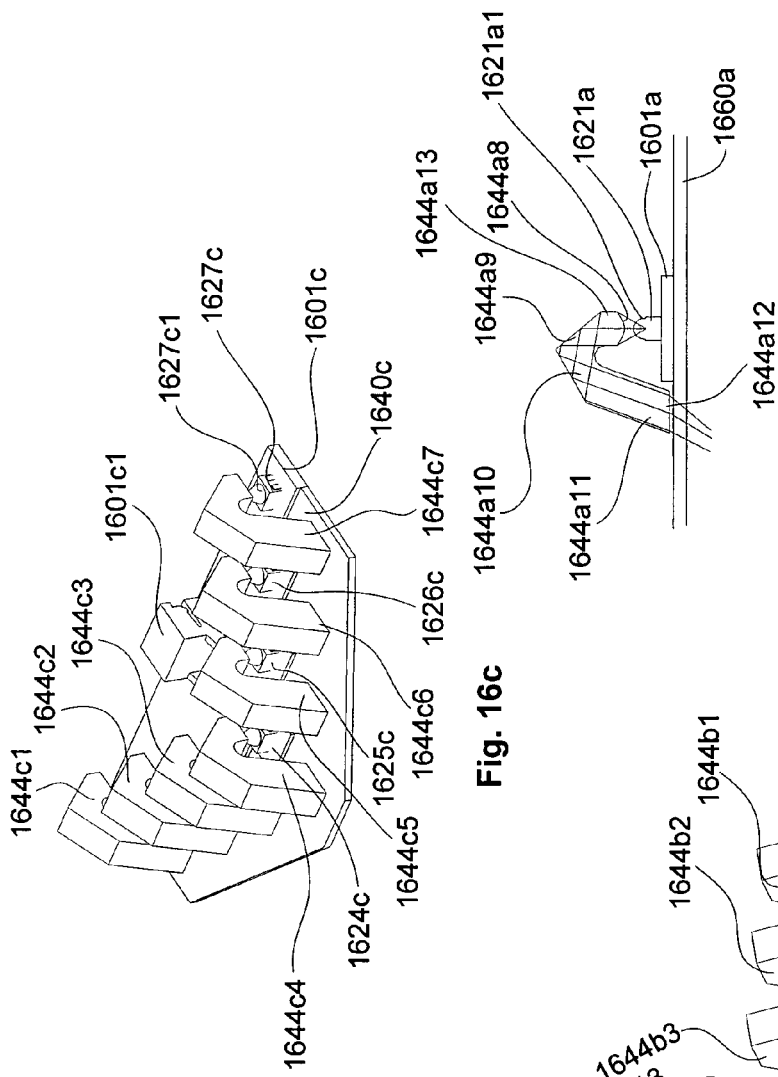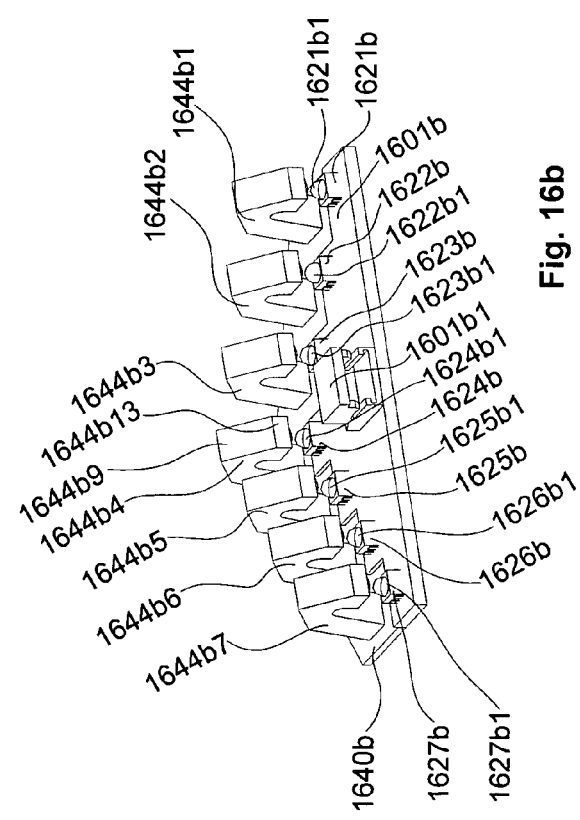

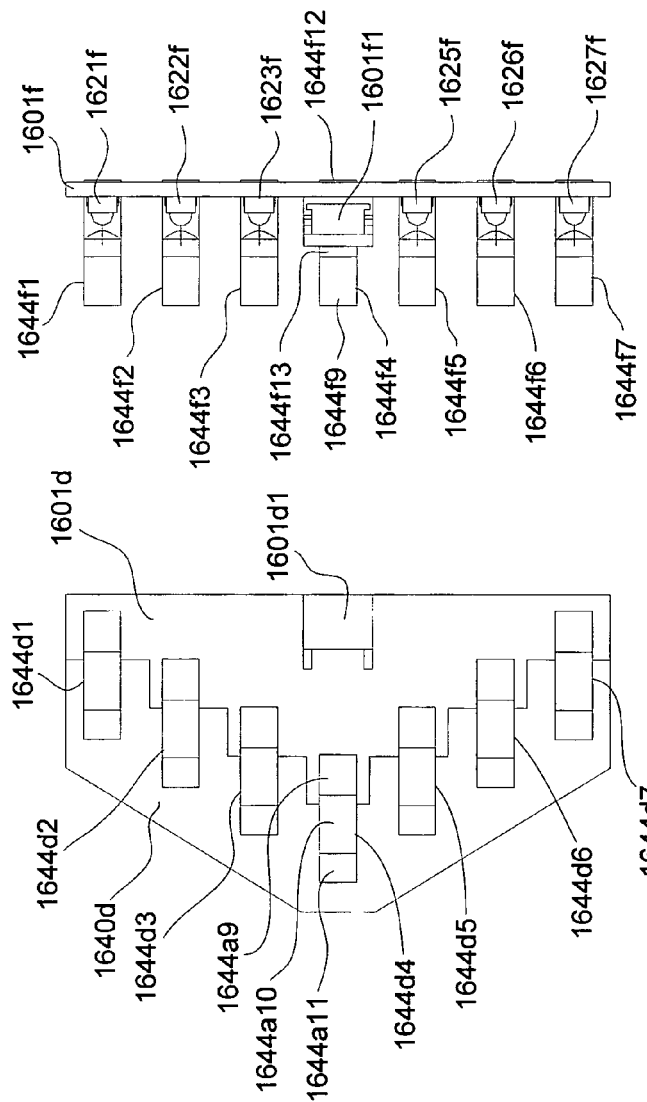
Fig. 16d
Fig. 16f
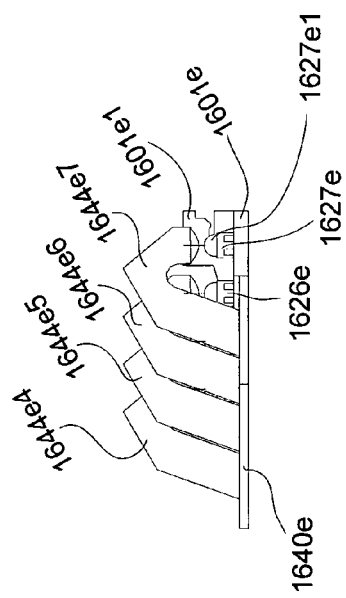
Fig. 16e

OPTICS FOR CONTROLLING THE DIRECTION OF LIGHT RAYS AND ASSEMBLIES INCORPORATING THE OPTICS

BACKGROUND

It has become desirable to provide a host of indicators, illuminators and information displays within various vehicle systems. More recently these devices have incorporated light emitting diodes as the light source to produce light rays.

What are needed are assemblies that emit light rays predominantly in a desired direction. Substantially all of the light rays emitted by at least one associated light source are redirected to a desired field of view. Vehicle systems incorporating these assemblies are also needed.

SUMMARY

What are provided are improved assemblies for controlling the direction of light rays. Vehicle systems incorporating these assemblies are also provided.

BRIEF DESCRIPTION OF THE FIGURES

FIG. 2b depicts an exploded, perspective, view of the assembly of FIG. 2a;

FIG. 3b depicts a second perspective view of the assembly of FIG. 3a;

FIGS. 14a-d depict various views of an exterior rearview mirror assembly;

FIGS. 14e-q depict various views of various optics blocks and light modules;

FIGS. 16a-f depict various views of an optics block and a light module.

DETAIL DESCRIPTION

Figure 1:
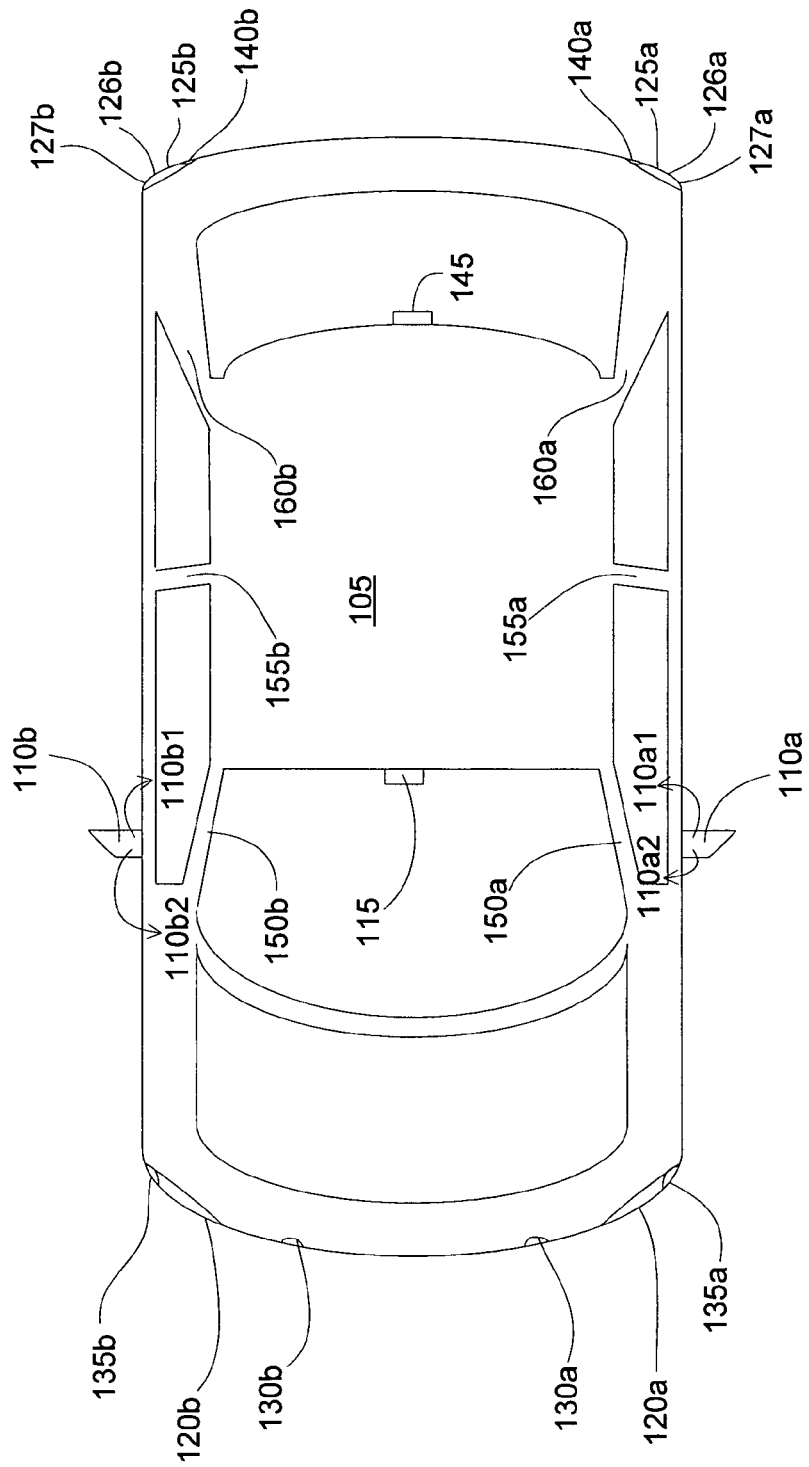
FIG. 1 depicts a controlled vehicle.

Vehicles commonly incorporate various visual indicators, illuminators, visual signals and information displays. As the use of these devices multiplies, it becomes more desirable to selectively direct associated light rays such that a majority of the light rays emitted by any given light source are substantially visible when viewed from only a desired viewing perspective. It should be recognized that as used herein the phrases "a majority of the light rays" and "substantially all of the light rays" are defined to refer to light rays that conform to theoretical optics design criteria acknowledging the fact that imperfections in the resulting optics will comprise imperfections that induce stray light rays.

In at least one embodiment of the present invention a light source is positioned such that associated light rays pass through at least one substrate of a rearview mirror element. In related embodiments, at least one visual indicator, illuminator, visual indicator or information display is configured to be substantially covert when not activated. In a preferred embodiment, substantially all of the light rays emitted from at least one light source are redirected to be visible from the perspective of a driver of a vehicle traveling in the "blind spot" associated with a driver of a controlled vehicle. Yet, the associated light rays are substantially not visible from the perspective of the driver of the controlled vehicle. A related assembly is described in detail herein to be incorporated in an exterior rearview mirror assembly of a controlled vehicle as a blind spot viewable, supplemental turning indicator assembly; it is preferable that the driver of the controlled vehicle not see the associated light rays. In at least one embodiment, a central axis of the associated light rays emitted by a light source is directed approximately 32° approximately 15°/−10°) outboard, away, from the controlled vehicle, rendering the light rays substantially invisible with regard to a driver of the controlled vehicle. In related embodiments, the central optical axis of the associated light rays forms between approximately 25° and approximately 40° (+approximately 10° to approximately 20°/−approximately 5° to approximately 25°) outboard, away, from the controlled vehicle. The given angle may be a function of an expected mirror element angle with respect to the controlled vehicle and, or, a driver thereof. It should be understood that the angle formed between the controlled vehicle and the mirror element is user selectable. In at least one embodiment, a surface mount light emitting diode is used with a corresponding circuit board placement within 1 mm, horizontally and vertically, of a desired center placement point. Preferably, the supplemental turning indicator assembly is designed to allow for 1 mm maximum displacement with respect to a rearview mirror element. In at least one embodiment, a visual indicator is configured as a blind spot indicator such that substantially all light rays emitted by at least one corresponding light source are redirected toward the driver of a controlled vehicle.

Turning now to FIG. 1 there is shown a controlled vehicle 105 comprising a driver's side rearview mirror 110a, a passenger's side rearview mirror 110b and rearview mirror 115. In a preferred embodiment, these rearview mirrors are configured to provide a driver of a controlled vehicle a view of substantially all of a scene generally rearward looking direction. As depicted, preferably the rearview mirrors 110a, 110b are configured to swivel rearwardly 110a1, 110b1 and forwardly 110a2, 110b2 relative to a controlled vehicle.

Details of various embodiments of the present invention are described herein in conjunction with further description of various vehicle systems.

With additional reference to FIG. 1, the controlled vehicle is depicted to comprise taillight assemblies 125a, 125b; break lights 126a, 126b; rear turn signals 127a, 127b; backup lights 140a, 140b; headlight assemblies 120a, 120b; foul weather lights 130a, 130b; front turn signals 135a, 135b and a center high mounted stop light (CHMSL) 145. It should be understood that the controlled vehicle may comprise various combinations of the exterior lights described with respect to FIG. 1. It should also be understood that the controlled vehicle may comprise additional exterior lights or may even comprise individual assemblies that provide combined functionality. Such as a headlight assembly that functions as a daytime running light, a low beam headlight, a high beam headlight, any one thereof, a subcombination thereof or a combination thereof. Continuously variable, bi-xenon, headlights are a specific example.

As additionally shown in FIG. 1, the controlled vehicle may comprise A-pillars 150a, 150b; B-pillars 155a, 155b and C-pillars 160a, 160b. Any of these locations, along with the rearview mirrors and exterior light assemblies, provide suitable locations for at least one imager, at least one indicator, at least one illuminator, at least one information display, any one thereof, a subcombination thereof or a combination thereof.

Figure 2A:
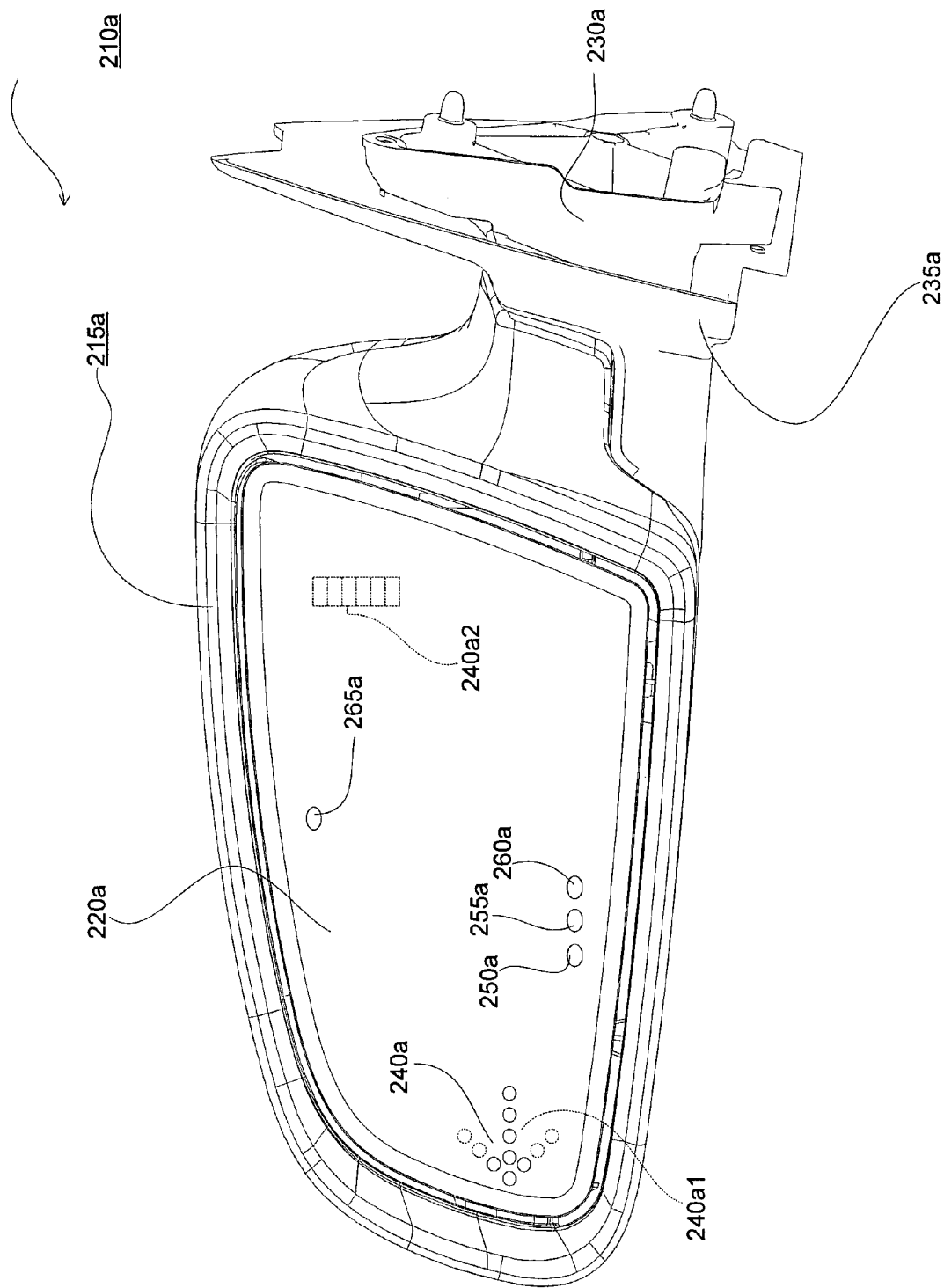
FIG. 2a depicts an exterior rearview mirror assembly.
Figure 2B:
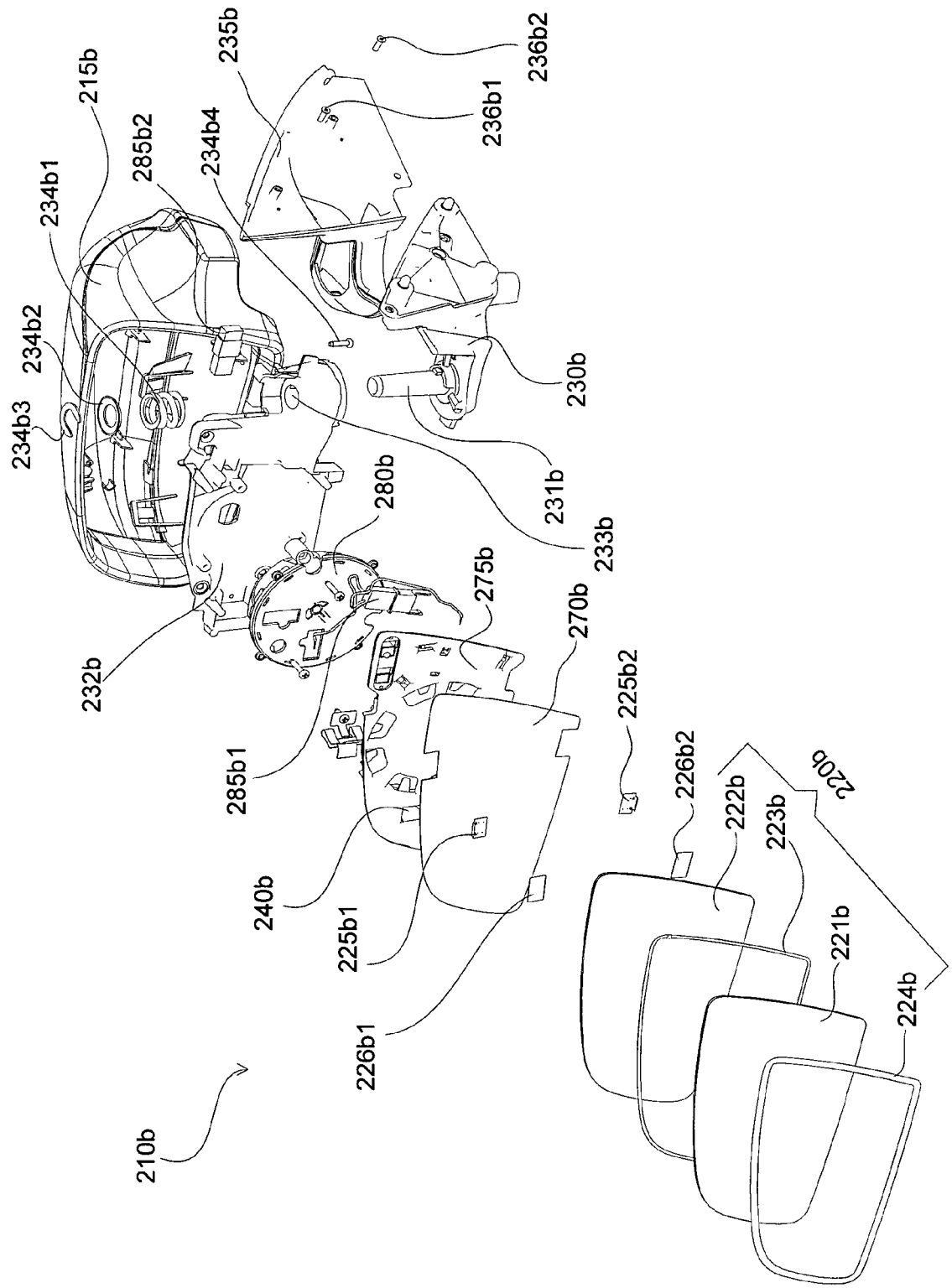

Turning to FIGS. 2a and 2b, there is shown a rearview mirror assembly 210a, 210b. Preferably, the mirror assembly comprises a mirror housing 215a, 215b comprising a mirror element 220a, 220b. Preferably, the mirror housing is configured to be pivotally mounted to a vehicle swivel structure 230a, 230b via a mirror swivel structure 232b. In at least one embodiment, the mirror assembly comprises a powered swivel means for swiveling the mirror swivel structure female portion 233b about the vehicle swivel structure male portion 231b. In at least one embodiment, the powered swivel means is configured to automatically swivel the mirror housing to a desired position in response to a corresponding button on a "keyfob." For example, a remote keyless entry system may be configured to swivel at least one mirror housing in a rearward direction in addition to unlocking a corresponding door. This functionality allows multiple use of a single illuminator, for example, a security light 255a may also serve as a keyhole/door illuminator 260a. In at least one embodiment, at least one light source of a supplemental turning indicator assembly is configured to provide a keyhole/door illuminator. The light source may be configured to emit a different spectral band of light rays as a function of the swivel position of an associated rearview mirror. For example, the light rays may be predominantly amber as a supplemental turning indicator assembly and predominantly white as a keyhole/door illuminator. It should be understood that the "unlock" button on a keyfob may be used or a devoted additional button may be added. Optionally, a given keyfob button may be configured such that a predetermined sequence of activations induces a predetermine swivel position. Additionally, the rearview mirror housing may be configured to swivel in a forwardly direction when subject to a "break away" force; preferably, the mirror housing would swivel and not break away. It should be understood that the keyfob button functionality may be configured to be user selectable or programmable. In at least one embodiment, a rearview mirror is configured such that it reverts to a predetermined swivel position upon opening of a door, closing a door, initiation of an ignition function, a second keyfob button, a keyfob sequence of button activation, anyone thereof, a subcombination thereof or combination thereof. It should be understood that a rearview mirror assembly may be configured with vertical swivel functionality in addition to, or in lieu of, the horizontal functionality described herein.

With further reference to FIGS. 2a and 2b, the rearview mirror assembly comprises a supplemental turning indicator assembly 240a; a blind spot indicator 250a; a security light 255a; a keyhole/door illuminator 260a and a generally rearward facing photo sensor 265a. Preferably, these devices are positioned behind the mirror element with respect to a viewer such that they are at least partially covert. The mirror element 220a, 220b comprises a first substrate 221b and a second substrate 222b secured in a spaced apart relationship with one another via a primary seal 223b to form a chamber there between. Preferably, the chamber comprises an electro-optic medium such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. The mirror element further comprises electrical clips 225b1, 225b2, preferably, secured to the second substrate via adhesive 226b1, 226b2. The mirror element is then attached to a carrier 275b, preferably, via adhesive 270b. The carrier is attached to the mirror swivel structure 232b via a positioner 280b. The mirror swivel structure is secured to the vehicle swivel structure via spring 234b1, washer 234b2, lock ring 234b3 and fastener 234b4. The vehicle swivel structure is secured to the vehicle shroud 235a, 235b via fasteners 236b1, 136b2. It should be understood that an additional illuminator may be provided near the chevron shape 240a configured as an illuminator. Alternatively, one of the illuminators of element 240a shown in FIG. 2a, may be configured as a door and, or, keyhole illuminator. The individual light sources may be configured as a triangle, circle, oval, rectangle, square, diamond, arrow, line, etc. A horizontal and, or, vertical series of individual light sources may be configured to form other than a chevron shape, such as, an arrow, a line, a vertical bar, a horizontal bar, etc.

Figure 2C:
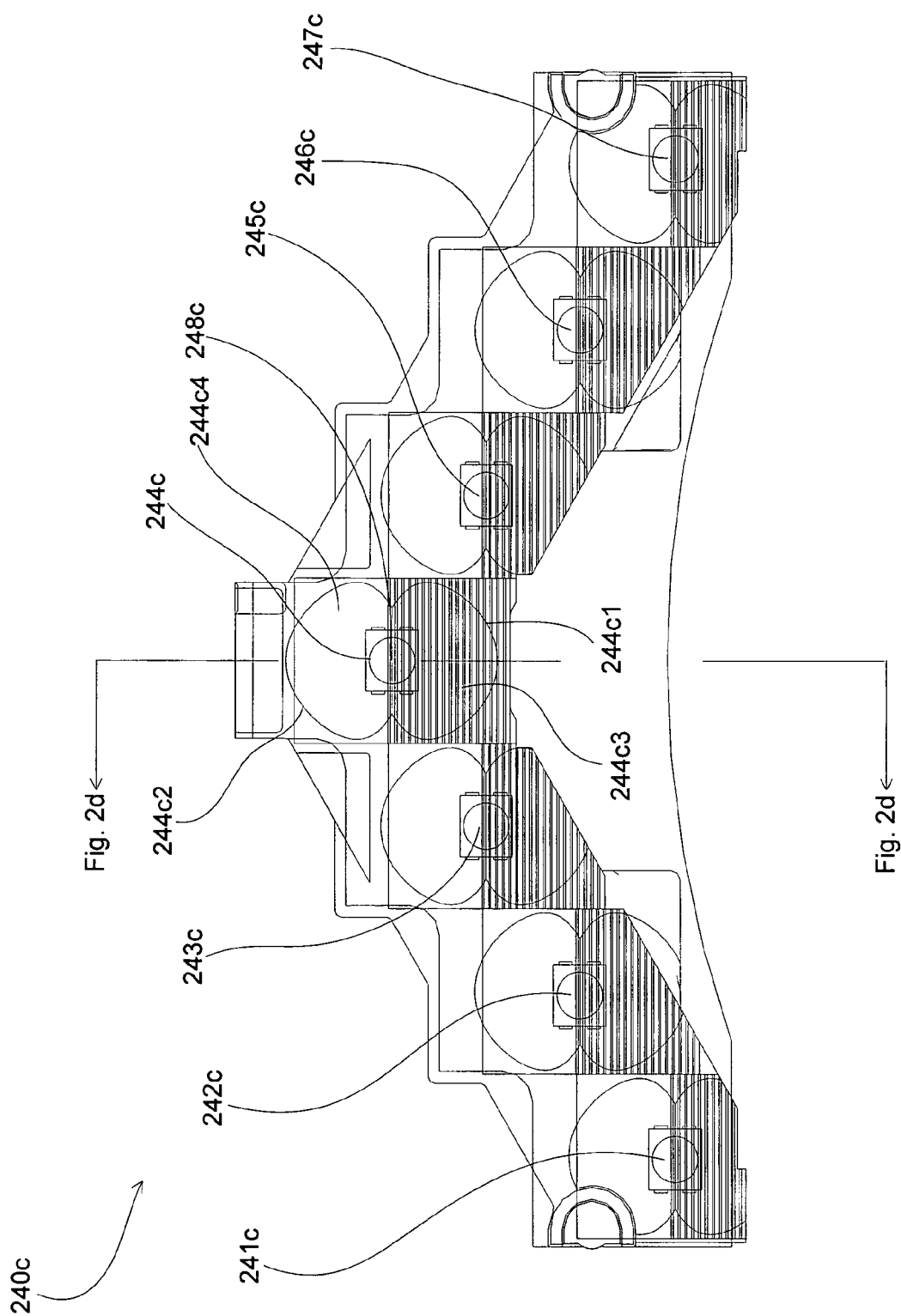
FIG. 2c depicts a plan view of a turn signal indicator.
Figure 2D:
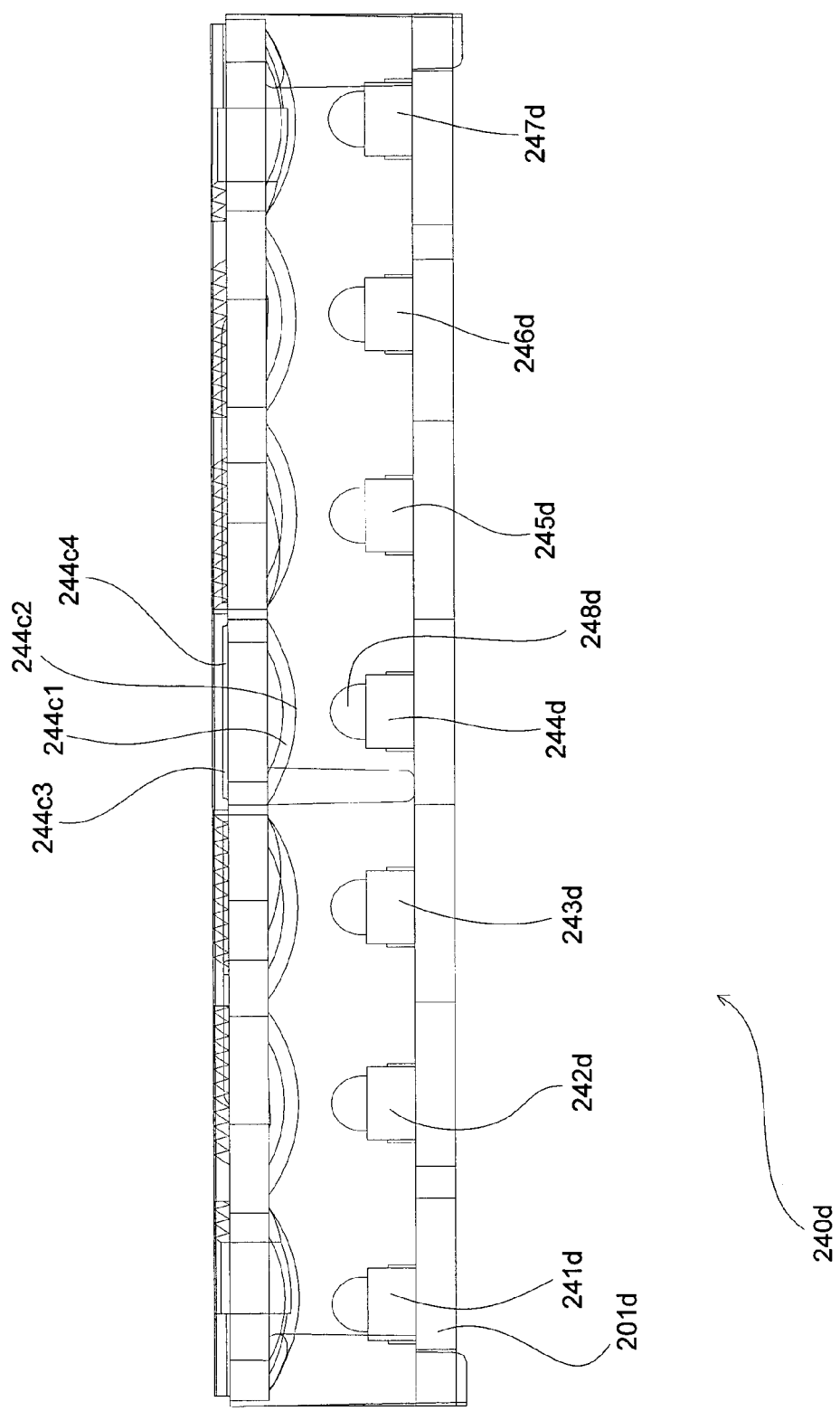
FIG. 2d depicts a profile view of the turn signal indicator of FIG. 2c.

Plan and profile views of a supplemental turning indicator assembly are shown in FIGS. 2c and 2d, respectively. The supplemental turning indicator assembly 240a, 240c, 240d comprises a first light source 241c, 241d; a second light source 242c, 242d; a third light source 243c, 243d; a fourth light source 244c, 244d; a fifth light source 245c, 245d; a sixth light source 246c, 246d and a seventh light source 247c, 247d. Preferably, each light source is a LA E63B, Power TOPLED®, available from OSRAM Corporation. It should be understood that any of the light sources described in commonly assigned U.S. Pat. Nos. 5,803,579 and 6,335,548, as well as U.S. patent application Ser. No. 09/835,278, the disclosures of which are incorporated in their entireties herein by reference, may be employed, the disclosures of each is incorporated in its entirety herein by reference. Preferably, each light source comprises a lens 248c, 248d. Each light source has an associated optics block comprising a first collimating portion 244c1, a first deviator portion 244c3, a second collimating portion 244c2 and a second deviator portion 244c4. Further details of related supplemental turning indicator assembly and optics blocks features are described in detail herein. It should be understood that more than one light source may be associated with a given optics block or multiple optics blocks may be associated with an individual light source. It should also be understood that multiple optics blocks may be incorporated into a common structure as shown in FIGS. 2c-2h. It should be understood that it is desirable to design the circuit board and optics block such that the light source is within 0.5 mm of a desired distance away from the optics block. In at least one embodiment, the optics block provides both vertical and horizontal light ray direction control. It should be understood that the optics blocks of the present invention may be incorporated individually for blind spot indicators, security lights, keyhole/door illuminators and other vehicle indicators, illuminators and information displays. It should be understood that the circuit board with light sources and other electrical components may be conformal coated and, or, the optics block may be configured such that it is ultrasonically, friction or vibratorilly welded, or otherwise sealingly adhered to the circuit board and configured to totally enclose the related electrical components of the supplemental turning indicator assembly.

Figure 2E:
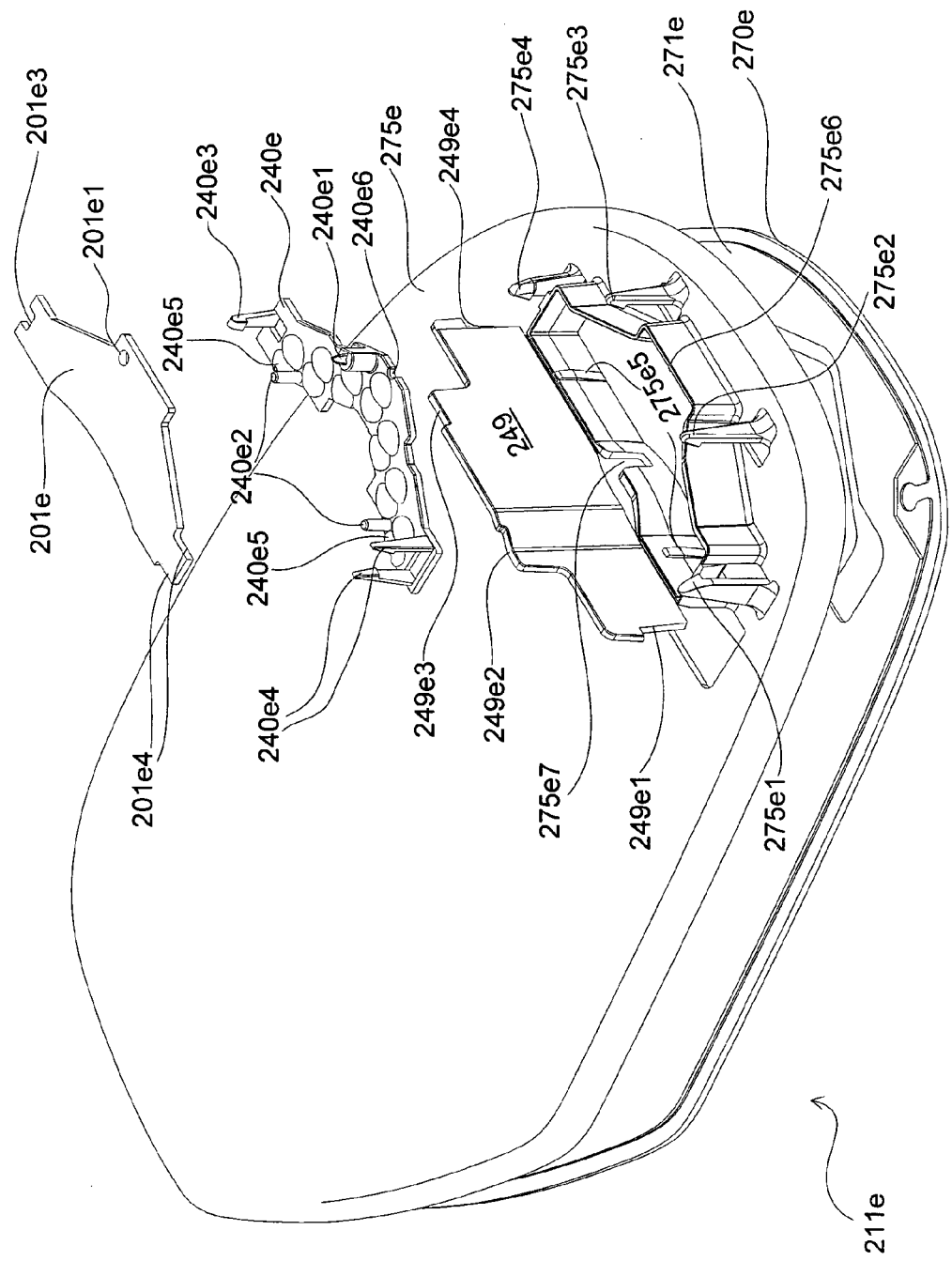
FIG. 2e depicts a perspective view of an exploded supplemental turning indicator assembly.
Figure 2F:
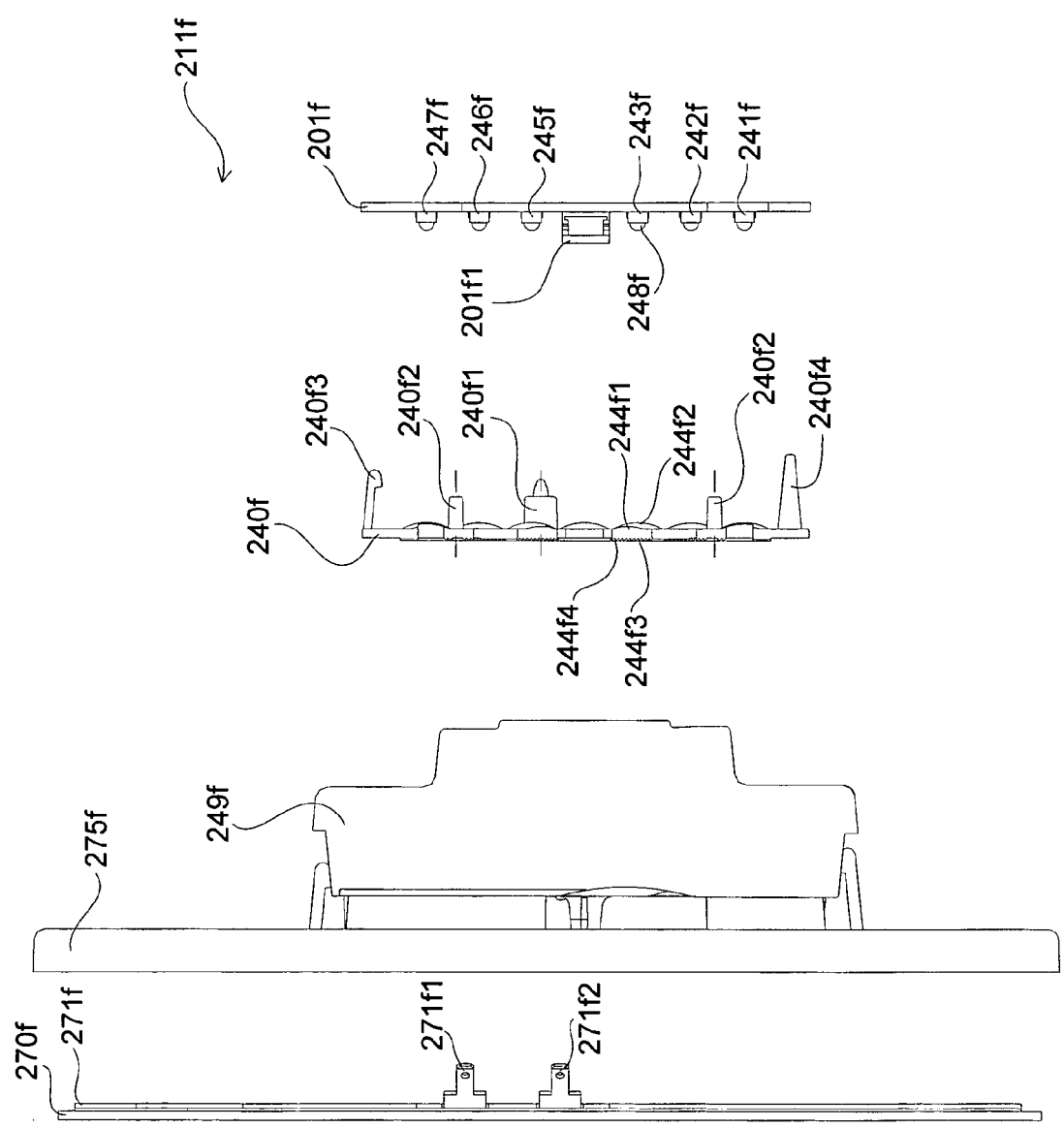
FIG. 2f depicts a profile view of the assembly of FIG. 2e.

With reference to FIGS. 2e and 2f, there is shown an embodiment of a rearview mirror assembly 211e, 211f comprising a supplemental turning indicator assembly. The supplemental turning indicator assembly comprises a printed circuit board 201e, 201f having an anti-rotation tab 201e4; an optics block alignment hole 201e1; an optics block alignment slot 201e3; first through seventh light sources 241f-247f and an electrical connector 201f1. Preferably, each light source has a lens 248f. The supplemental turning indicator assembly further comprises a combination optics block 240e, 240f having an alignment pin 240e1, 240f1; spacers 240e5, 240f5; anti-rotation clips 240e4, 240f4; an alignment slot clip 240e3, 240f3; optics block locators 240e5 and optics block positioner 240e6. Preferably, each optics block within the combination optics block 240e, 240f comprises a first collimating portion 244f1, a second collimating portion 244f2, a first deviator portion 244f3 and a second deviator portion 244f4. It should be understood that the optics block alignment hole cooperates with the alignment pin, the spacers cooperate with the circuit board, the alignment slot cooperates with the alignment slot clip and the anti-rotation tab cooperates with the anti-rotation clips to secure the circuit board in a desired relationship with respect to the combination optics block. It should be understood that accurate positioning of the light sources upon the circuit board is desirable to insure overall alignment with the associated optics block. It should also be understood that the optics block locators cooperate with the carrier locators 275e5 and the optics block positioner cooperates with the carrier positioner 275e6 to insure accurate alignment of the supplemental turning indicator assembly with the carrier and ultimately with the heater, adhesive pad and corresponding mirror element. With further reference to FIGS. 2e and 2f, the rearview mirror assembly further comprises a carrier 275e, 275f having a living hinged lid 249e, 249f and first through fourth clips 275e1-275e4. The lid comprises first through fourth lid clip surfaces 249e1-249e4 that cooperate with the respective first through fourth clips to secure the supplemental turning indicator assembly within the carrier. A heater element 270e, 270f having first and second electrical connectors 271f1, 271f2, respectively, is positioned proximate the carrier along with adhesive 270e, 270f. In at least one embodiment, the heater comprises at least a portion aligned with the supplemental turning indicator assembly that comprises a light ray diffuser. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

Figure 2G:
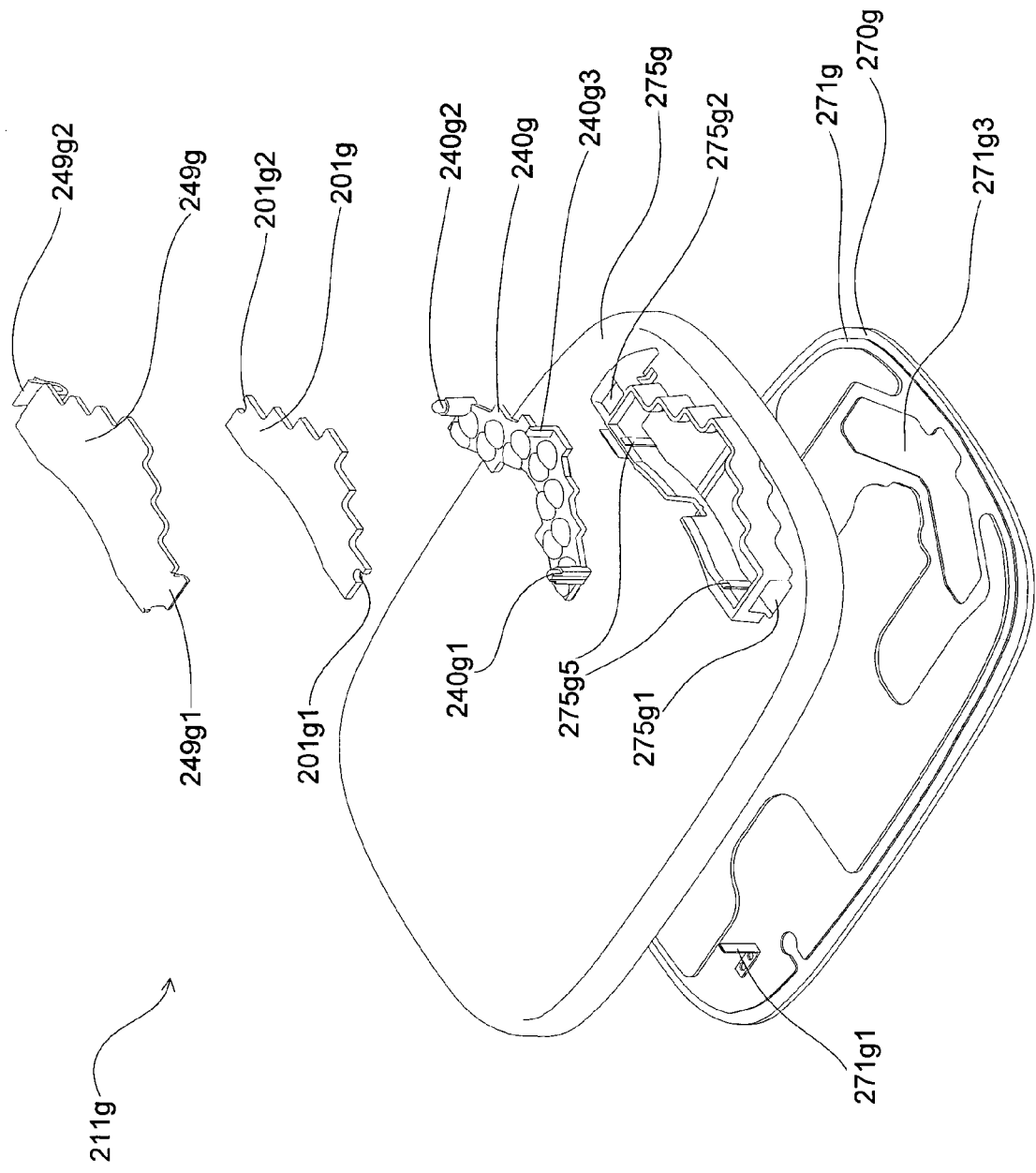
FIG. 2g depicts a perspective view of another exploded supplemental turning indicator assembly.
Figure 2H:
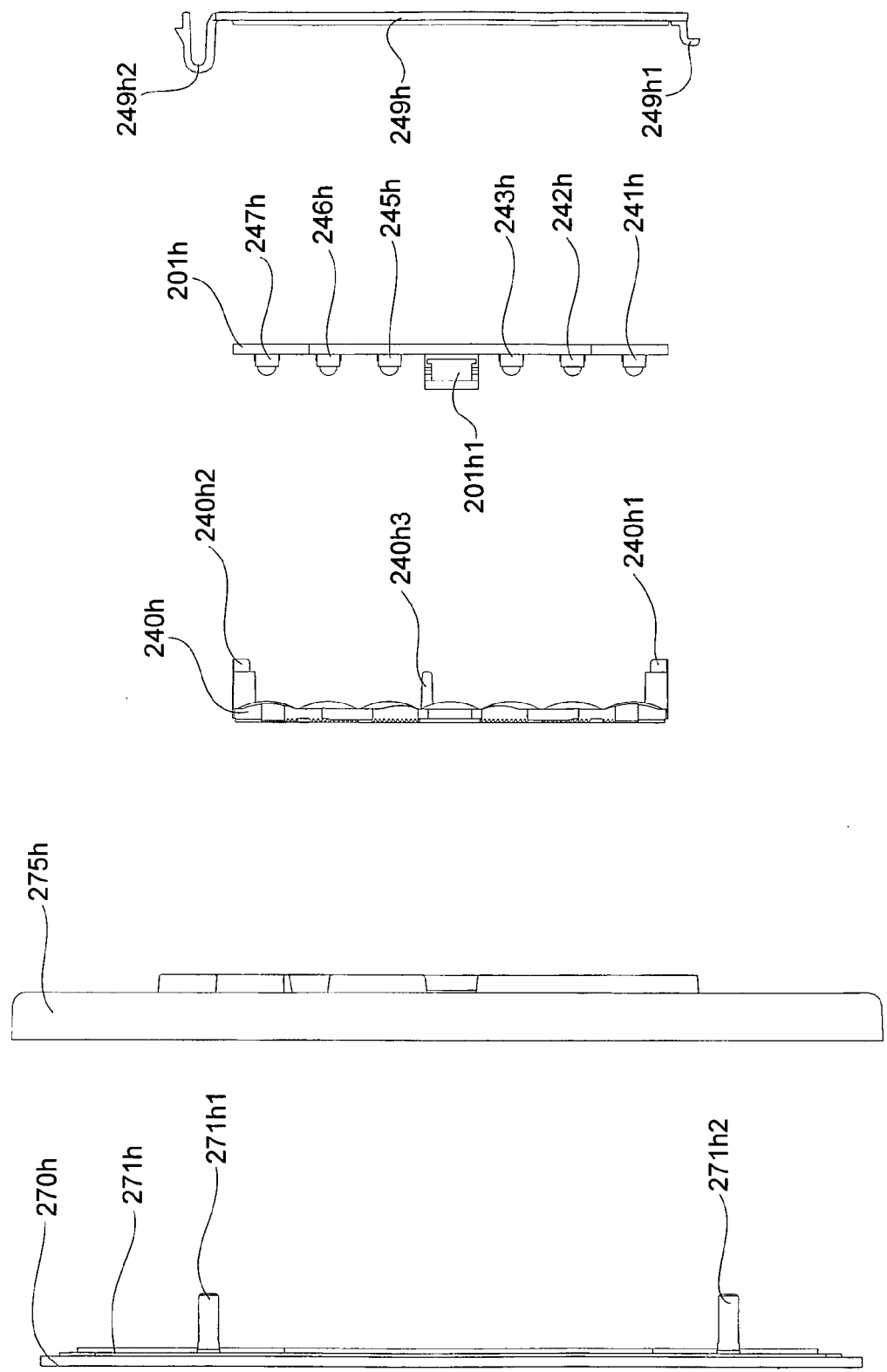
FIG. 2h depicts a profile view of the assembly of FIG. 2g.

With reference to FIGS. 2g and 2h, there is shown an embodiment of a rearview mirror assembly 211g, 211h comprising a supplemental turning indicator assembly. The supplemental turning indicator assembly comprises a printed circuit board 201g, 201h having an anti-rotation tab 201g1; an optics block alignment slot 201g2; first through seventh light sources 241h-247h and an electrical connector 201h1. The supplemental turning indicator assembly further comprises a combination optics block 240g, 240h having an anti-rotation pin 240g1, 240h1; a spacer 240g3, 240h3 and an alignment pin 240g2, 240h2; It should be understood that the spacer cooperates with the circuit board, the alignment slot cooperates with the alignment pin and the anti-rotation tab cooperates with the anti-rotation pin to secure the circuit board in a desired relationship with respect to the combination optics block. It should be understood that accurate positioning of the light sources upon the circuit board is desirable to insure overall alignment with the associated optics block. It should also be understood that the optics block locators cooperate with the carrier locators 275g5 to insure accurate alignment of the supplemental turning assembly with the carrier and ultimately with the heater, adhesive pad and corresponding mirror element. With further reference to FIGS. 2g and 2h, the rearview mirror assembly further comprises a carrier 275g, 275h having first and second clips 275g1-275g2. The lid 249g, 249h comprises first and second lid clips 249g1-249g2 that cooperate with the respective first and second clips to secure the supplemental turning indicator assembly within the carrier. A heater element 270g, 270h having first and second electrical connectors 271, g1271h1, 271h2, respectively, is positioned proximate the carrier along with adhesive 270g, 270h. In at least one embodiment, the heater comprises at least a portion aligned with the supplemental turning indicator assembly that comprises a light ray diffuser. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

Figure 3A:
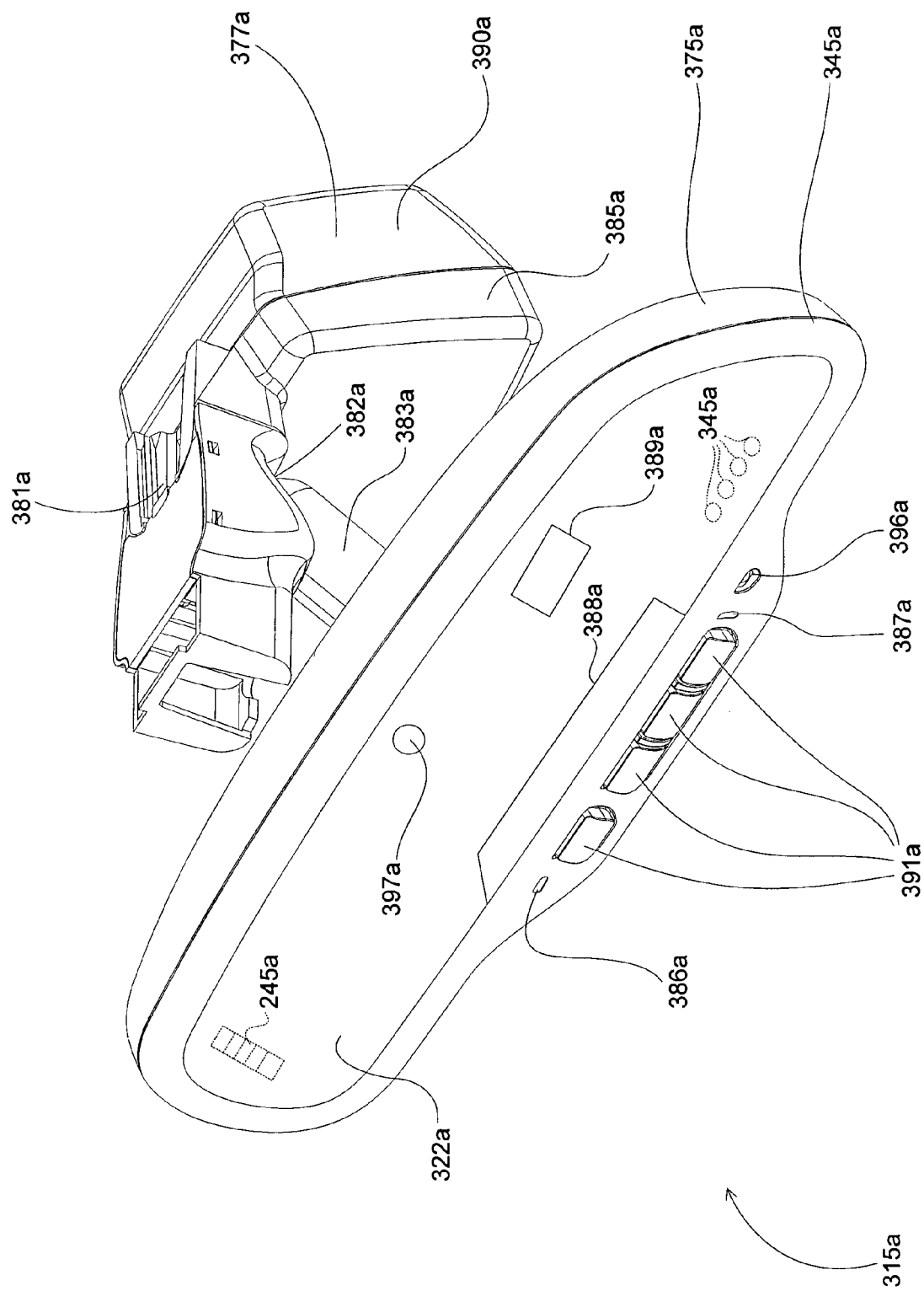
FIG. 3a depicts a perspective view of an interior rearview mirror assembly.
Figure 3B:
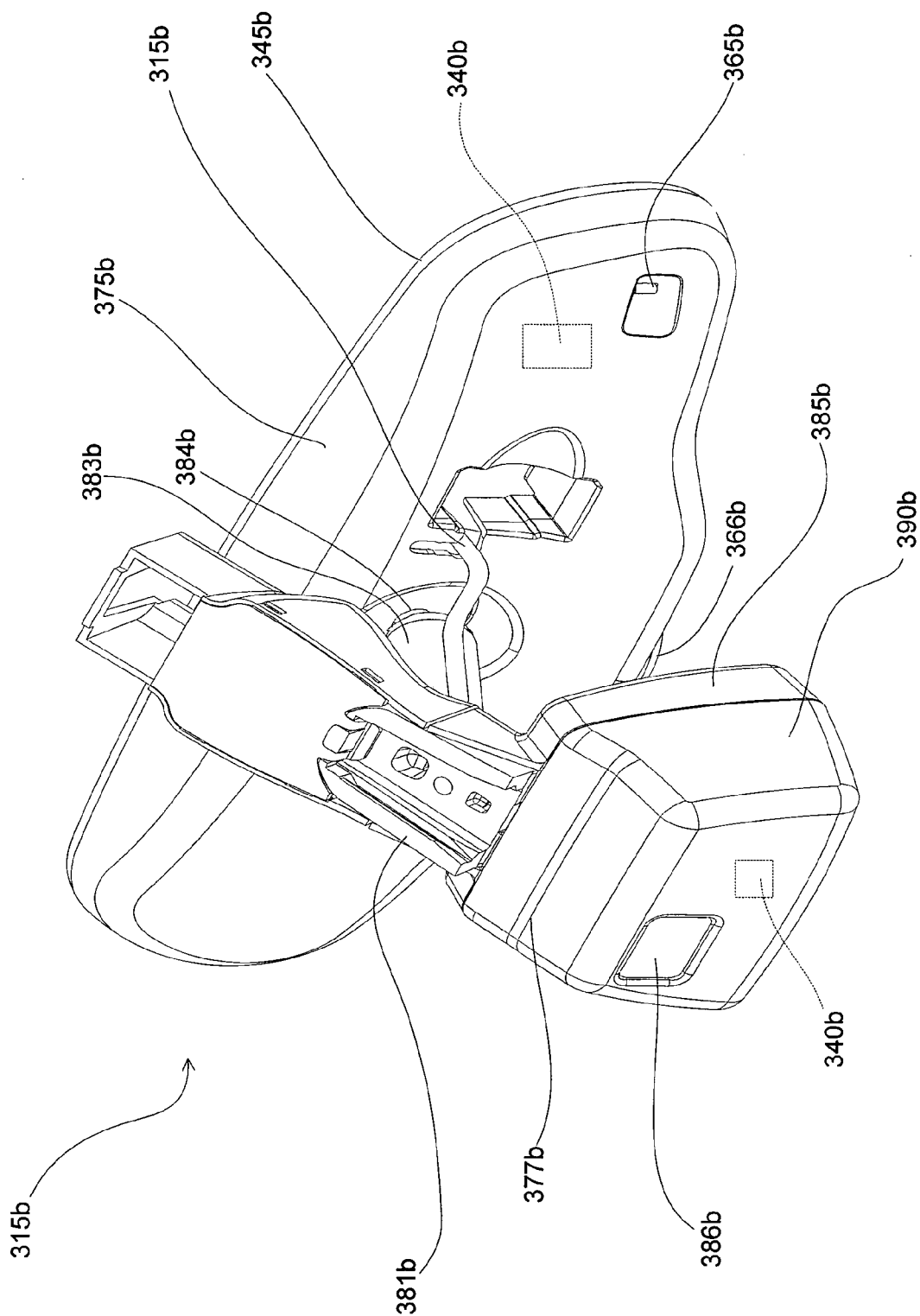

Turning now to FIGS. 3a and 3b a rearview mirror assembly 315a, 315b comprises a stationary housing 377a, 377b and a mirror housing 375a, 375b mounted to an attachment member 381a, 381b via a double ball stem 382a, 383a, 383b, 384b. The stationary housing comprises a rear portion 385a, 385b and a front portion 390a, 390b having a viewing window 386b. In at least one embodiment, the stationary housing comprises at least one imager, at least one automatic exterior light control module, at least one moisture sensor module, at least one compass sensor, at least one compass, at least one speaker, at least one microphone, at least one windshield wiper automatic control, at least one digital signal processor, at least one automatic defogger control, at least one collision avoidance control, at least one lane departure warning module, at least one electro-optic mirror element control module, at least one supplemental illuminator module, at least one photo sensor, at least one processor, any one thereof, a subcombination thereof or combination thereof. Preferably, the mirror assembly comprises a mirror element 322a and a bezel 345a, 345b. In at least one embodiment, the mirror housing comprises at least one imager, at least one automatic exterior light control module, at least one moisture sensor module, at least one compass sensor, at least one compass, at least one speaker, at least one microphone, at least one windshield wiper automatic control, at least one digital signal processor, at least one digital sound processor, at least one GPS system, at least one navigation system, at least one automatic defogger control, at least one collision avoidance control, at least one lane departure warning module, at least one electro-optic mirror element control module, at least one supplemental illuminator module, at least one photo sensor, at least one processor, any one thereof, a subcombination thereof or combination thereof. Preferably, the mirror assembly further comprises at least one ambient light sensor 365b, at least one microphone 366b and at least one interconnecting cable 315b for electrical communication from the mirror housing to the stationary housing. It should be understood that a second interconnecting cable may be provided for electrical communication from the mirror assembly to the vehicle and, or, at least one other rearview mirror assembly. The interconnecting cable, or cables, may be configured to route, at least partially, through the double ball stem, therefore, are at least partially covert. Preferably, the mirror assembly comprises at least one information display 388a, 389a, a first indicator 386a, at least a second indicator 387a, at least one glare light sensor 396a, at least one second glare sensor 397a, an illuminator, any one thereof, a subcombination thereof or combination thereof. In at least one embodiment, at least one indicator, illuminator, information display, photo sensor, subcombination thereof or combination thereof is positioned behind the mirror element with respect to a viewer. It should be understood that the optics blocks described herein may be employed with any of these device to control the direction of the associated light rays. Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; and U.S. patent application Ser. Nos. 09/448,364; 09/538,389; 09/605,102; 09/678,856; 09/800,460; 09/847,197; 09/938,774; 09/491,192; 60/404,879; 10/235,476; 10/783,431; 10/777,468; 10/783,273 and 10/208,142, the disclosures of which are incorporated in their entireties herein by reference, may be incorporated in accordance with the present invention. Examples of microphones for use with the present invention are described in commonly assigned U.S. patent application Ser. Nos. 09/144,176 and 10/076,158, the disclosures of which are incorporated in their entireties herein by reference. Various indicators for use with the present invention are described in commonly assigned U.S. Pat. Nos. 5,803,579 and 6,335,548, as well as commonly assigned U.S. patent application Ser. Nos. 09/835,278 and 60/495,906(2880), the disclosures of which are incorporated in their entireties herein by reference. Preferred light sensors for use within the present invention are described in detail in commonly assigned U.S. Pat. Nos. 5,923,027 and 6,313,457, the disclosures of which are incorporated in their entireties herein by reference. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. It should be understood that the mirror assembly may incorporate light-sensing electronic circuitry of the type illustrated and described in the above-referenced Canadian Patent No. 1,300,945, U.S. Pat. 5,204,778, U.S. Pat. No. 5,451,822, U.S. Pat. No. 6,402,328, or U.S. Pat. No. 6,386,713 and other circuits capable of sensing glare and ambient light and supplying a drive voltage to the electro-optic element, the disclosures of which are incorporated in their entireties herein by reference. Moisture sensors and windshield fog detector systems are described in commonly assigned U.S. Pat. Nos. 5,923,027 and 6,313,457, the disclosures of which are incorporated in their entireties herein by reference.

As depicted in FIGS. 2a, 3a and 3b, supplemental turning indicator assemblies and, or, blind spot indicators may be incorporated in various assemblies with optics in accordance with the present invention. It should be understood that the shape of any given "segment" of a given light source may comprise any of the shapes mentioned elsewhere herein. In at least one embodiment, the assembly is constructed in accordance with the environmentally improved mirror assembly of commonly assigned U.S. patent application Ser. No. 10/263,308(1828). In any event, it should be understood that both light sources configured to be viewed directly (indicators) and light sources configured to cast light rays upon an area or object to be viewed (illuminators) are within the scope of the present invention. Additionally, it is envisioned that similar optics may be applied to light sensing applications such as generally reward facing photo sensor 265a, 397a. When used for light sensing, the associated light transducer is positioned on the opposite side of the optic element than is a light source. Optics in accordance with the present invention may be applied to light sensing in accordance with the present invention as well. In at least one preferred embodiment, at least one indicator, at least one illuminator, at least one light sensor, a sub-combination thereof or combination thereof is incorporated behind a reflective element such that the device is substantially covert when not emitting light rays.

Figure 4A:
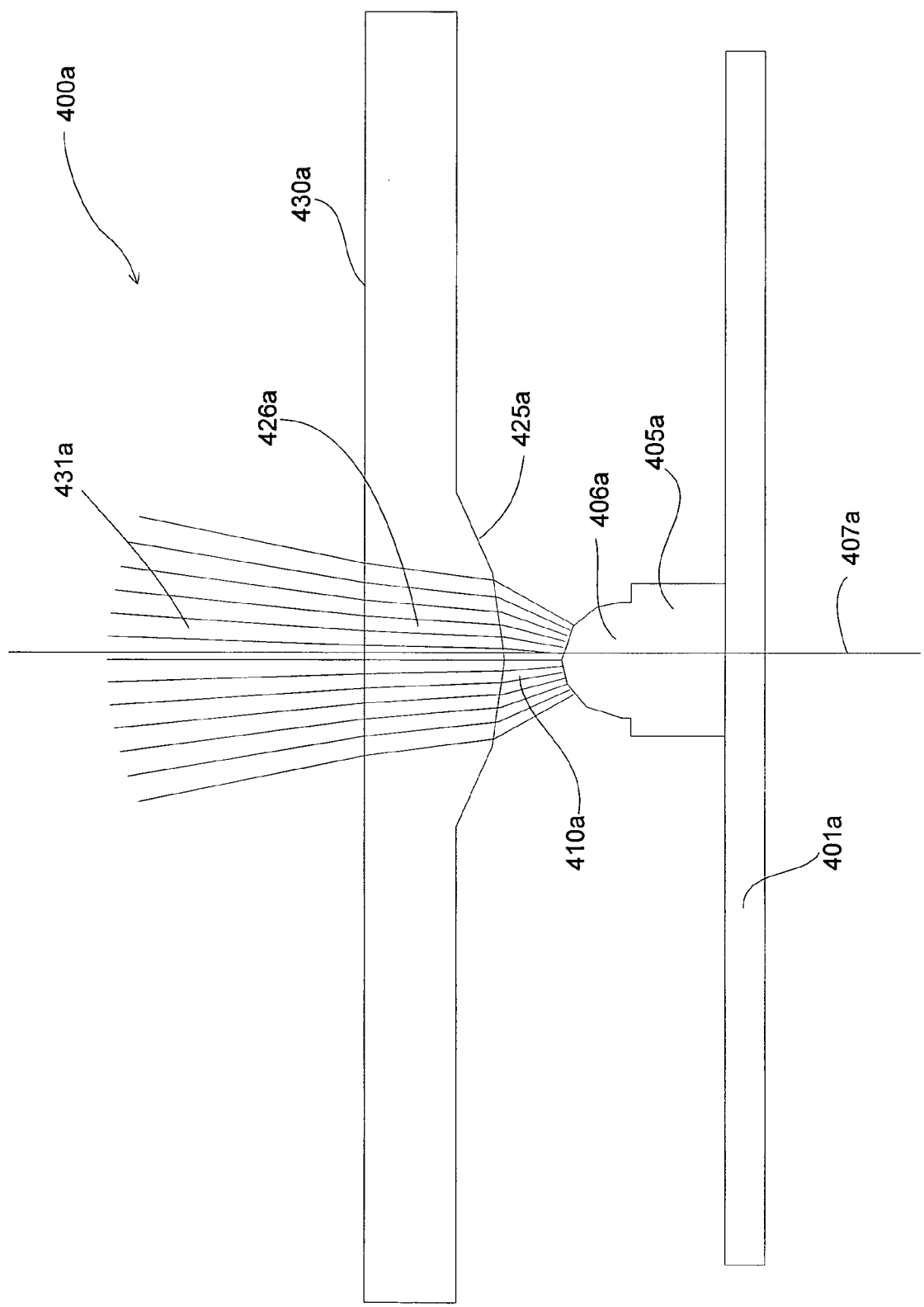
FIG. 4a depicts an indicator assembly.
Figure 4B:
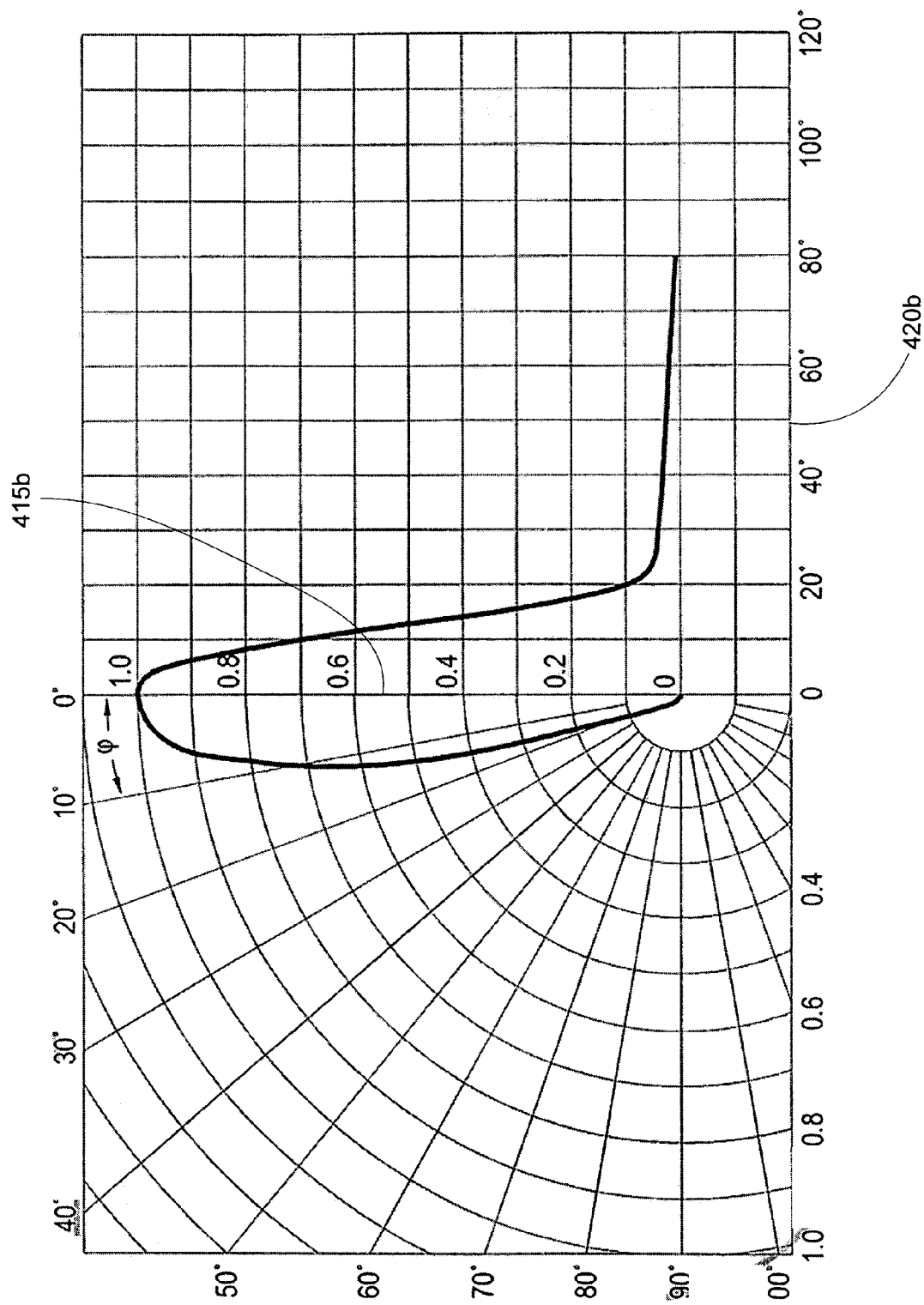
FIG. 4b depicts a graph of a light source radiation characteristic.

Turning now to FIGS. 4a and 4b, a light source 405a, having a lens 406a, is depicted to be mounted to a circuit board 401a. A typical light source will emit light rays 410a in a pattern as depicted. The x-axis of FIG. 4b represents the angular viewing position relative to the central optical axis of the light source and the y-axis represents a normalized radiation characteristic of the light source. As can be seen, light rays emitted by a typical light source will be minimally visible beyond some given viewing angle with respect to a central optical axis 407a. Preferably, an optics block is provided with a concentrating portion 425a to redirect light rays 410a to substantially concentrated light rays 426a. In at least one embodiment, the optics block comprises a deviator portion 430a to redirect light rays 426a to a desired light ray 431a direction. As can be seen, the optics block of FIG. 4a may be incorporated in a rearview mirror indicator assembly, illuminator assembly or information display assembly to control the vertical direction of light rays in a condensing fashion. The light source, circuit board and optics block form a light assembly 400a. In at least one embodiment, the optics block is configured to direct substantially all of the associated light rays to define a vertical viewing angle approximately −5° and approximately 5°(+approximately 4° to approximately 5°/−approximately 2° to approximately 3°) with respect to a central optical axis.

Figure 5:
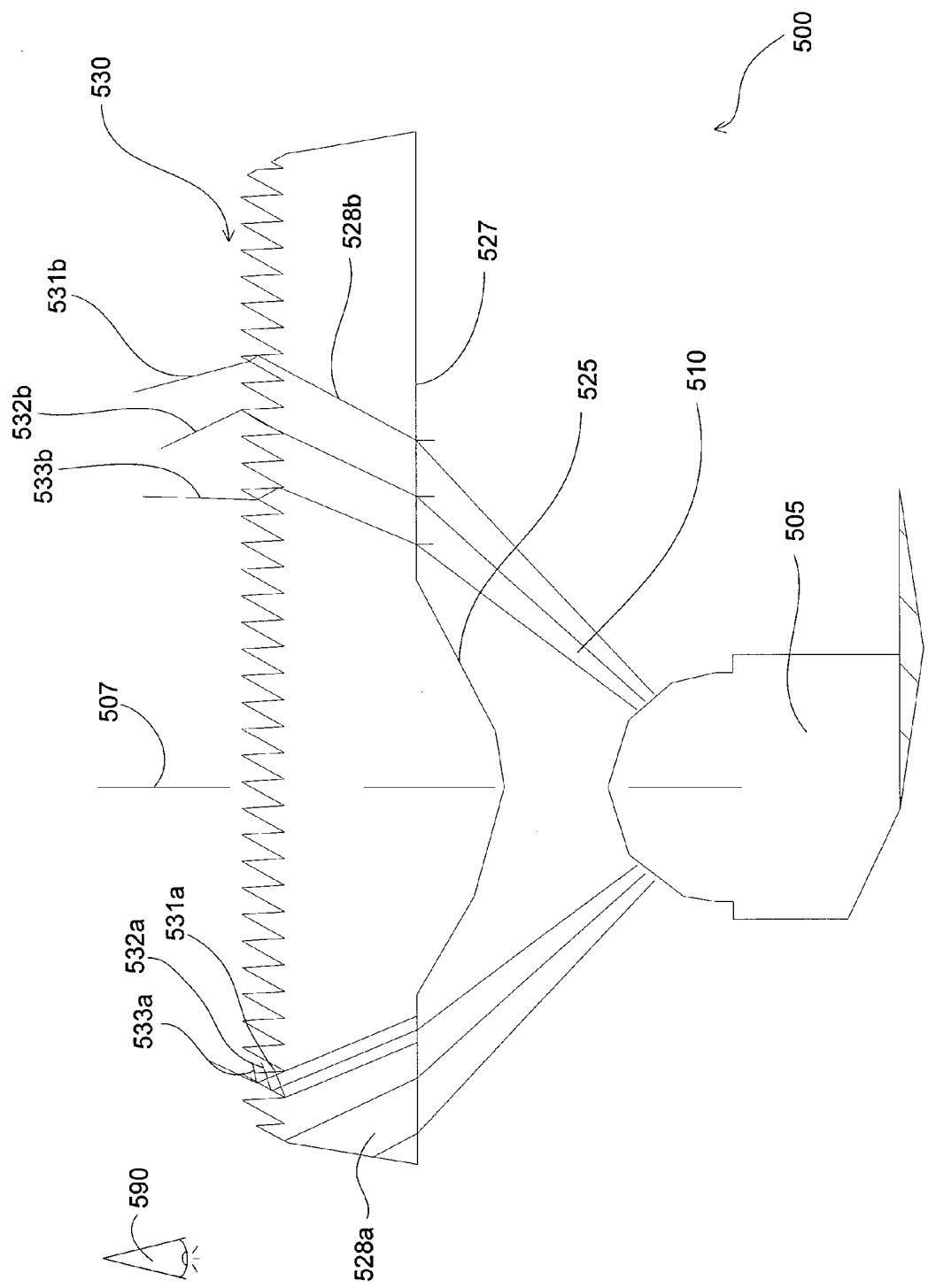
FIG. 5 depicts a light ray tracing.
Figure 6:
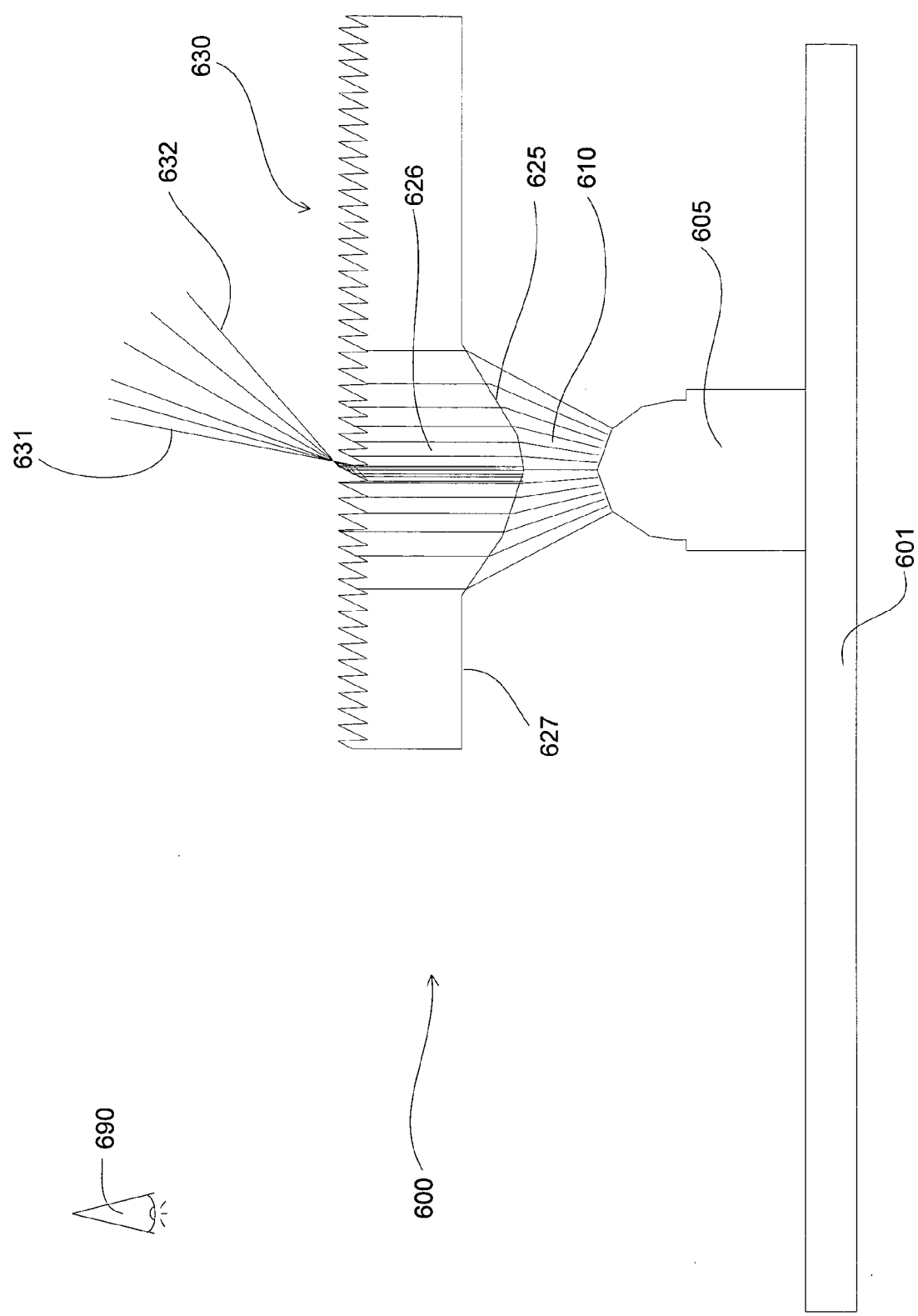
FIG. 6 depicts a second light ray tracing.

Turning now to FIGS. 5 and 6, there is shown a light source 505, 605 mounted to a circuit board 601 to define a central optical axis 507. An optics block incorporating a collimating portion 525, 625 and a deviator portion 530, 630 is provided to control the direction of the light rays preferably away from the driver's eye 590, 690. As can be seen, the light rays 626 that pass through the collimating portion are redirected substantially parallel to the central optical axis, however, light rays 528a, 528b that pass through the non-collimating portion 527, 627 are not so redirected. As can be seen, the light rays 528a result in reflected light rays 531a, 532a, 533a directed toward an undesirable portion of deviator surface 530. Similarly, light rays 528b are reflected and refracted light rays 531b, 532b, 533b directed toward an undesirable direction. Some of the light rays 510, 610 are actually directed toward the driver's eye. It should be understood that secondary optics blocks may be added to further redirect the light rays 528a, 528b. With further reference to FIG. 6, it can be seen that the light rays 626 that have been redirected substantially parallel to the central optical axis result in light rays 631, 632 that are redirected substantially as desired. As can be appreciated, this configuration does not result in a majority of the light rays emitted from the light source being redirected as desired. The light source 505, 605; circuit board 601 and the optics block form a light assembly 500, 600. In at least one embodiment, the collimating portion collimates light rays horizontally and redirects (concentrates) light rays vertically. Preferably, total internal reflections (TIR) optics form light rays horizontally in the outboard direction relative to the controlled vehicle. In at least one embodiment, the optics block is configured to direct substantially all of the associated light rays to define a vertical viewing angle approximately −5° and approximately 5° (+approximately 4° to approximately 5°/−approximately 2° to approximately 3°) with respect to a central optical axis. In at least one embodiment, a minimum of approximately 5 candelas are present at approximately 5°, approximately 4 candelas at approximately 10° and approximately 3 candelas at approximately 15°, all angles with respect to a central optical axis.

Figure 7:
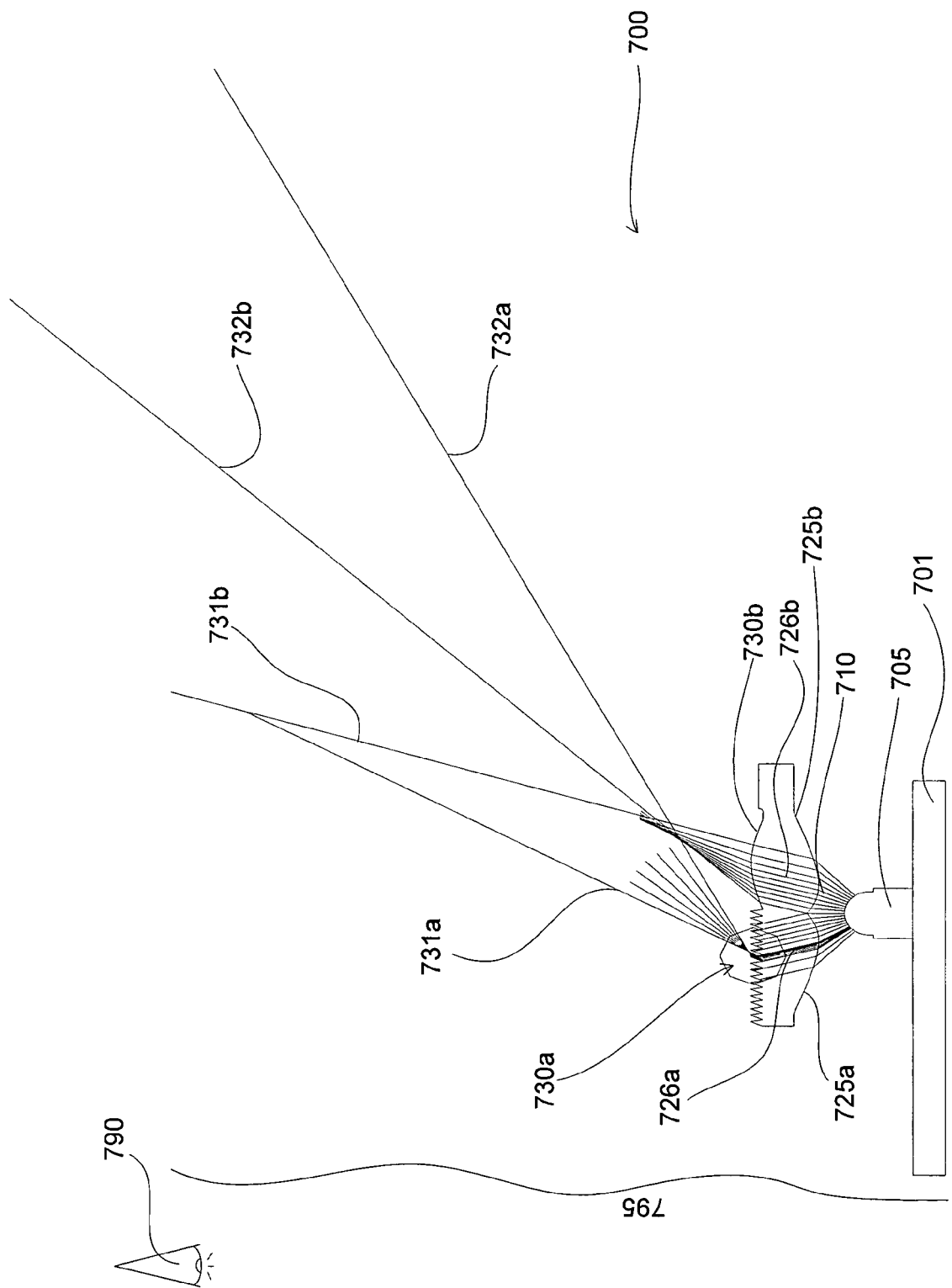
FIG. 7 depicts a third light ray tracing.

With reference to FIG. 7, a light source 705 is mounted to a circuit board 701 such that light rays 710 are emitted toward an optics block. Preferably, the optics block comprises a first collimating portion 725a to redirect a portion of the light rays 710 as partially collimated light rays 726a toward a first deviator portion 730a resulting in light rays 731a, 732a. Preferably, the optics block comprises a second collimating portion 725b to redirect a portion of the light rays 710 as partially collimated light rays 726b toward a second deviator portion 730b resulting in light rays 731b, 732b. As can be seen, substantially all of the light rays emitted from the light source are redirected as desired away from the driver's eye 790 and toward a blind spot. The light source, the circuit board and the optics block form a light assembly 700. Preferably, the first collimating portion 725a directs partially collimated light rays 726a approximately 15° inboard, toward, the controlled vehicle 795 with respect to the central optical axis of the associated light source. The first collimating portion may be configured as a curved lens surface defining either a radial, an elliptical, a hyperbolic, a parabolic or a complex shape. As described in more detail elsewhere herein, the first deviator portion 730a is preferably configured to refract substantially all of the partially collimated light rays 726a approximately 45°(+/−approximately 17°) outboard, away, from the controlled vehicle with respect to the central optical axis of the associated light source. Preferably, the second collimating portion 725b directs partially collimated light rays 726b approximately 15° outboard, away, from the controlled vehicle with respect to the central optical axis of the associated light source. The second collimating portion may be configured as a curved lens surface defining either a radial, an elliptical, a hyperbolic, a parabolic or a complex shape. The second deviator portion 730b is preferably configured to redirect substantially all of the partially collimated light rays 726b approximately 29°(+/−approximately 14°) outboard, away, from the controlled vehicle with respect to the central optical axis of the associated light source. These two groups of light rays combine to define a beam pattern that is approximately 32°(+approximately 15°/−approximately 10°) with respect to a central optical axis.

Figure 8:
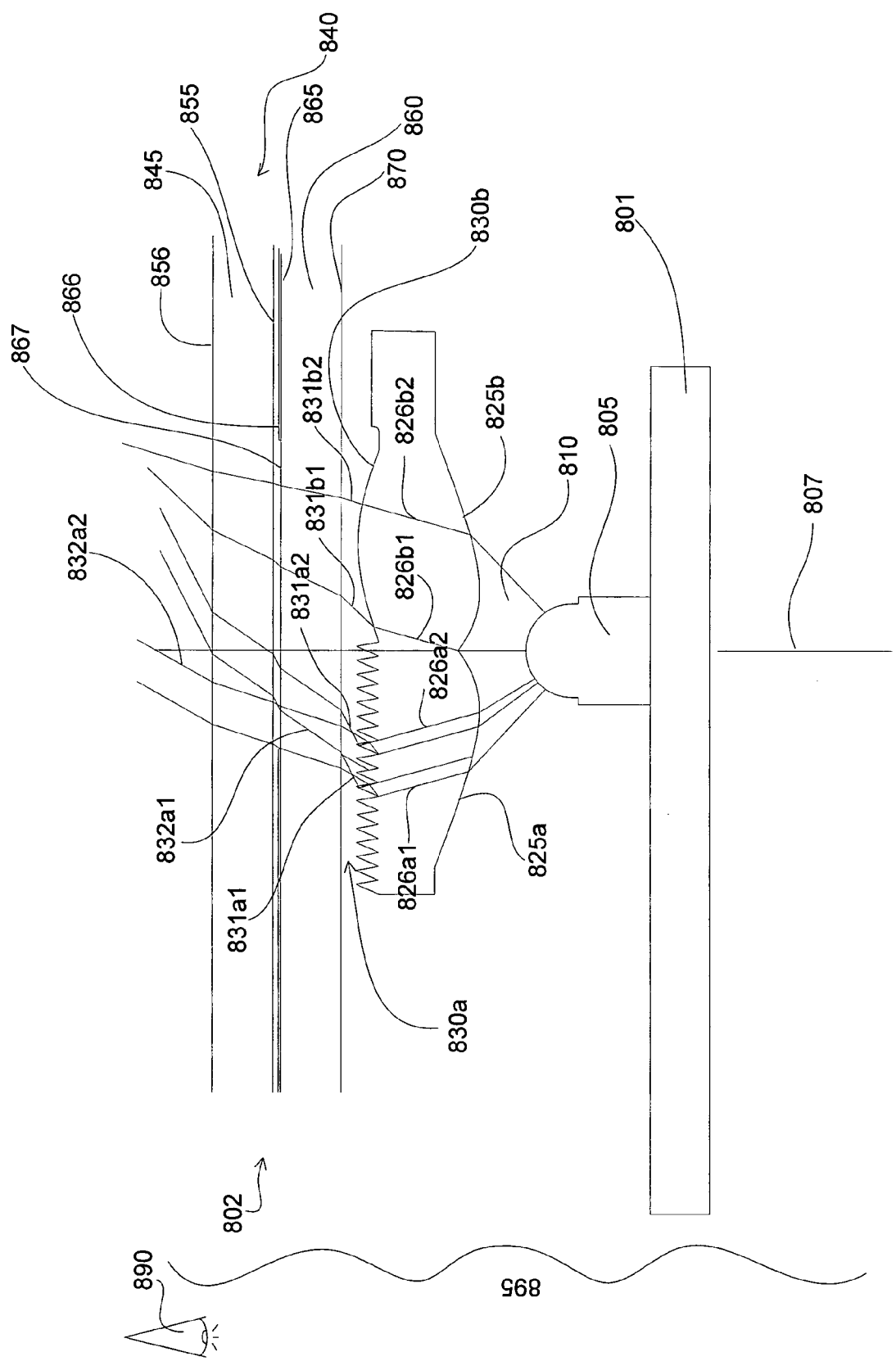
FIG. 8 depicts a forth light ray tracing.

Turning now to FIG. 8, a mirror assembly 802 is depicted to comprise a light assembly comprising a light source 805, a circuit board 801 and an optics block similar to that shown in FIG. 7. In this embodiment, a portion of the light rays 810 are redirected via a first collimating portion 825a to form at least partially collimated light rays 826a1, 826a2. Light rays 826a1 are redirected by a first deviator portion 830a to form light rays 831a1, 832a1. Light rays 826a2 are redirected by the first deviator to form light rays 831a2, 832a2. A portion of the light rays 810 are redirected via a second collimating portion 825b to form light rays 826b1, 826b2. Light rays 826b1 are redirected via a second deviator portion 830b to form light rays 831b1. Light rays 826b2 are redirected via the second deviator portion to form light rays 831b2. Preferably, substantially all of the light rays 810 emitted by the light source pass through the area 867 defined in an associated mirror element 840 reflective stack 866. Preferably, the mirror element further comprises a first substrate 845, having a first surface 850 and a second surface 855, and a second substrate 860, having a third surface 865 and a fourth surface 870. It should be understood that in at least one embodiment, the mirror element is a prismatic mirror comprising a single substrate through which the associated light rays pass. As can be seen, the majority of the light rays 810 are directed outboard of the controlled vehicle 895 and away from the driver's eye 890. In at least one embodiment, the area 867 defines a window having a higher transmissivity than the remainder of the reflective stack 866. With this window configuration in combination with aligning the light source and optics block as depicted in FIG. 8 and described with regard to FIGS. 2e-2h, approximately half of the first deviator portion 830a is out of alignment with respect to the window area. Since the second collimating portion and the second deviator portion direct substantially all of the related light rays 826b1, 826b2, 831b1, 831b2 outboard, away, from the controlled vehicle and the half of the first collimating portion. Combined with the first deviator portion, most susceptible to producing stray light rays, being out of alignment with respect to the window, very little, if any, light rays 826a1, 826a2, 831b1, 831b2 are visible to the driver of the controlled vehicle. It should be understood that substantially the entire reflective stack 866, including the area 867, may be configured to be similarly, if not identically, at least partially transmissive, may have alternating areas of differing transmissivity in the area 867, or may comprise any of the configurations as described in commonly assigned U.S. Pat. Nos. 5,682,267, 5,689,370, 6,064,509, 6,062,920, 6,268,950, 6,195,194, 5,940,201, 6,246,507, 6,057,956, 6,512,624, 6356,376, 6,166,848, 6,111,684, 6,193,378, 6,239,898, 6,441,943, 6,037,471,6,020,987, 5,825,5276,111,684 and 5,998,617, the disclosures of each of these Patents are incorporated in their entireties herein by reference.

In a preferred embodiment, a polarized reflective element comprising at least one polarized reflector in accordance with the teachings of International Patent Application publication WO 03/079318A1, to Philips, is incorporated with at least one indicator, at least one illuminator, at least one light sensor, a sub-combination thereof or combination thereof. In at least one related embodiment, at least one light source emitting at least partially polarized light rays of a second kind pass through the polarized reflective element. Incorporation of an electro-optic element with a reflective element in accordance with the Philips device results in a variable reflective device with high transmissivity for light of a second kind of polarization.

Figure 9:
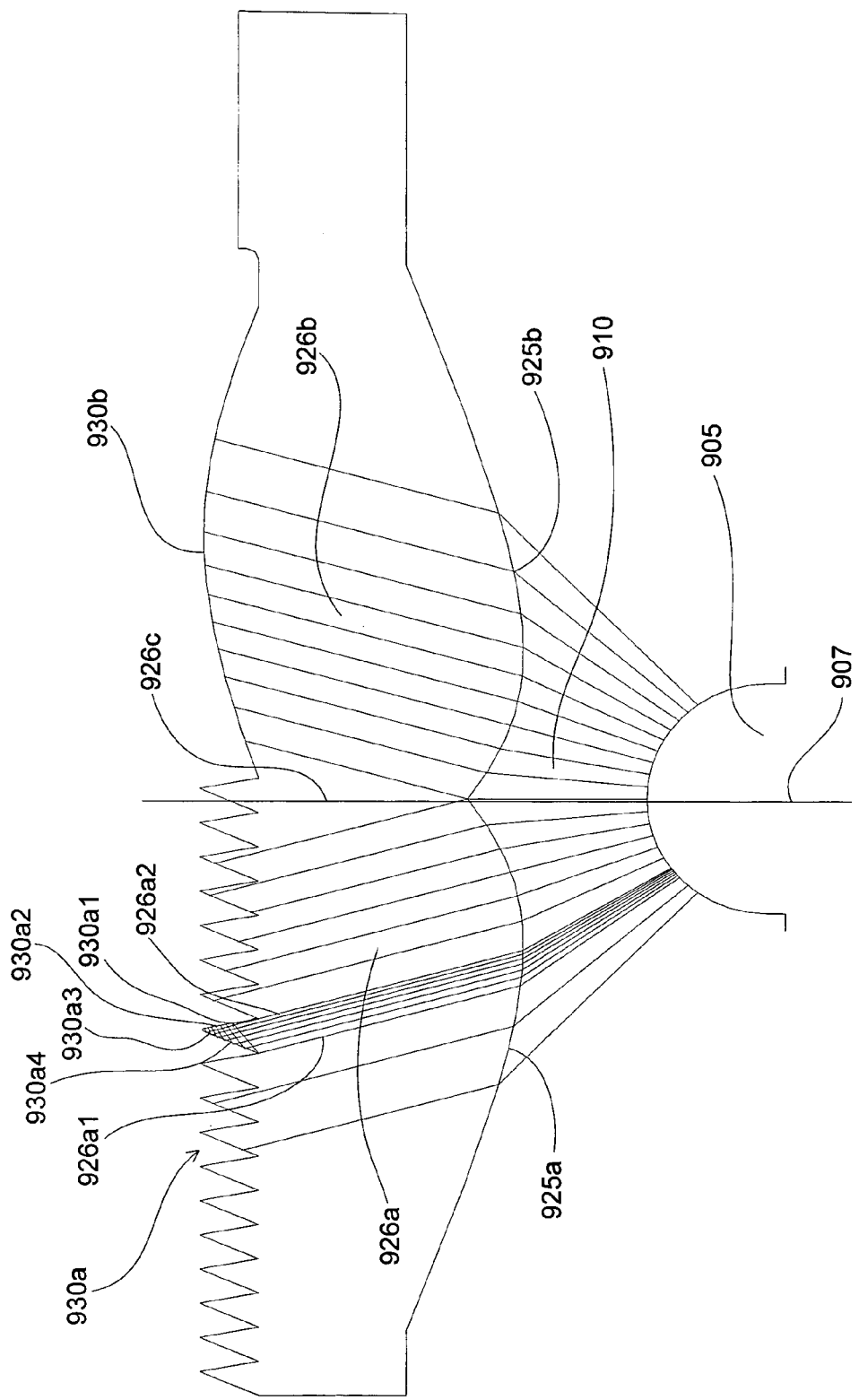
FIG. 9 depicts a portion of the light ray tracing of FIG. 7.

With reference to FIG. 9, there is shown a light source 905 in relation to an optics block similar to those shown in FIGS. 7 and 8. The optics block comprises a first collimating portion 925a configured to redirect a portion of light rays 910 as partially collimated light rays 926a. In at least one embodiment, the angle defined by the first deviator segment 930a2 with respect to the central optical axis 907 is less than the angle of the partially collimated light rays 926a1, 926a2, such that the portion of partially collimated light rays 926a that pass deviator edge 930a1 do not impinge on the second deviator segment 930a3 and are reflected by the third deviator segment 930a4 and refracted by the first deviator segment 930a2. Preferably, as described in detail elsewhere herein, deviator segment 930a4 forms an angle with respect to the central optical axis 907 such that even light rays 926a1 clear adjoining deviator segments and edges. In a preferred embodiment, a null zone 926c is defined to minimize light ray cross-over from the second collimating portion to the first deviator portion and from the first collimating portion to the second deviator portion.

Figure 10:
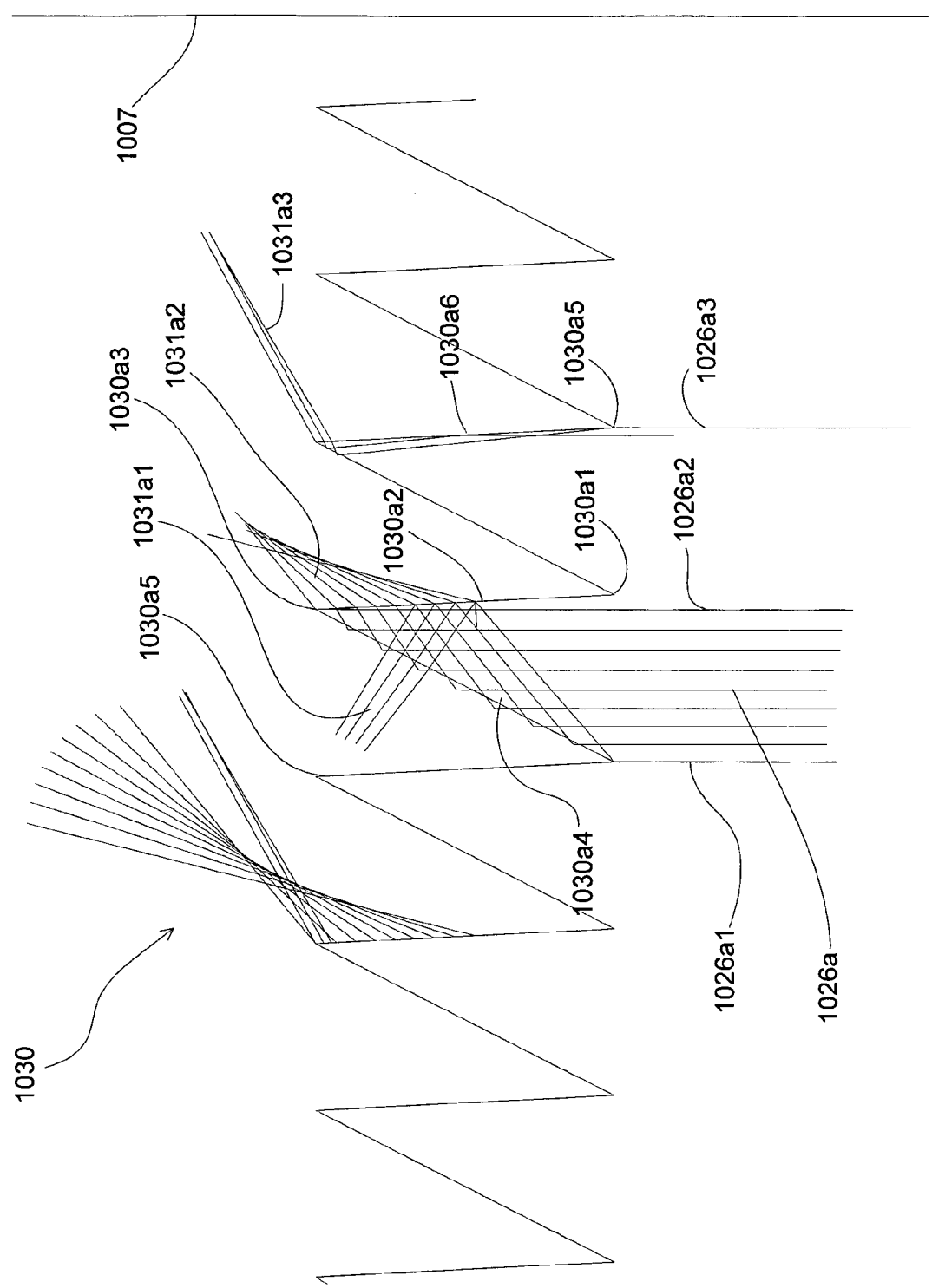
FIG. 10 depicts a magnified view of various light ray tracing details.

Turning now to FIG. 10, there is shown an enlarged view of a portion of a first deviator portion 1030. As can be seen in this embodiment, the angle defined by the first deviator segment 1030a2 with respect to the central optical axis 1007 is greater than the angle defined by the partially collimated light rays 1026a resulting in the light rays 1026a3 passing the adjoining deviator edge 1030a5 and impinging upon the adjoining second deviator segment 1030a6, resulting in stray light rays 1031a3. This configuration causes a significant amount of the associated light rays to be reflected off the first deviator segment (preferably, refracting surface) 1030a2, through the third deviator segment (preferably, reflecting surface) 1030a4, inboard toward the driver of the controlled vehicle. Light rays may be bounced off refracting surfaces, off reflecting surfaces and then refract outboard, away, from the controlled vehicle at a greater angle than desired. As well known, when light rays 1026a approach the angle of total internal reflection (TIR), the light rays are refracted and reflected according to the Fresnel equations. The configuration depicted in FIG. 10, with its relatively wide deviator pattern, results in a portion of the partially collimated light rays 1026a are reflected off segment 1030a4 toward segment 1030a2. These light rays are close to a TIR angle, reflected light rays 1031a1 will impinge upon the adjoining first deviator segment 1030a5.

Figure 11:
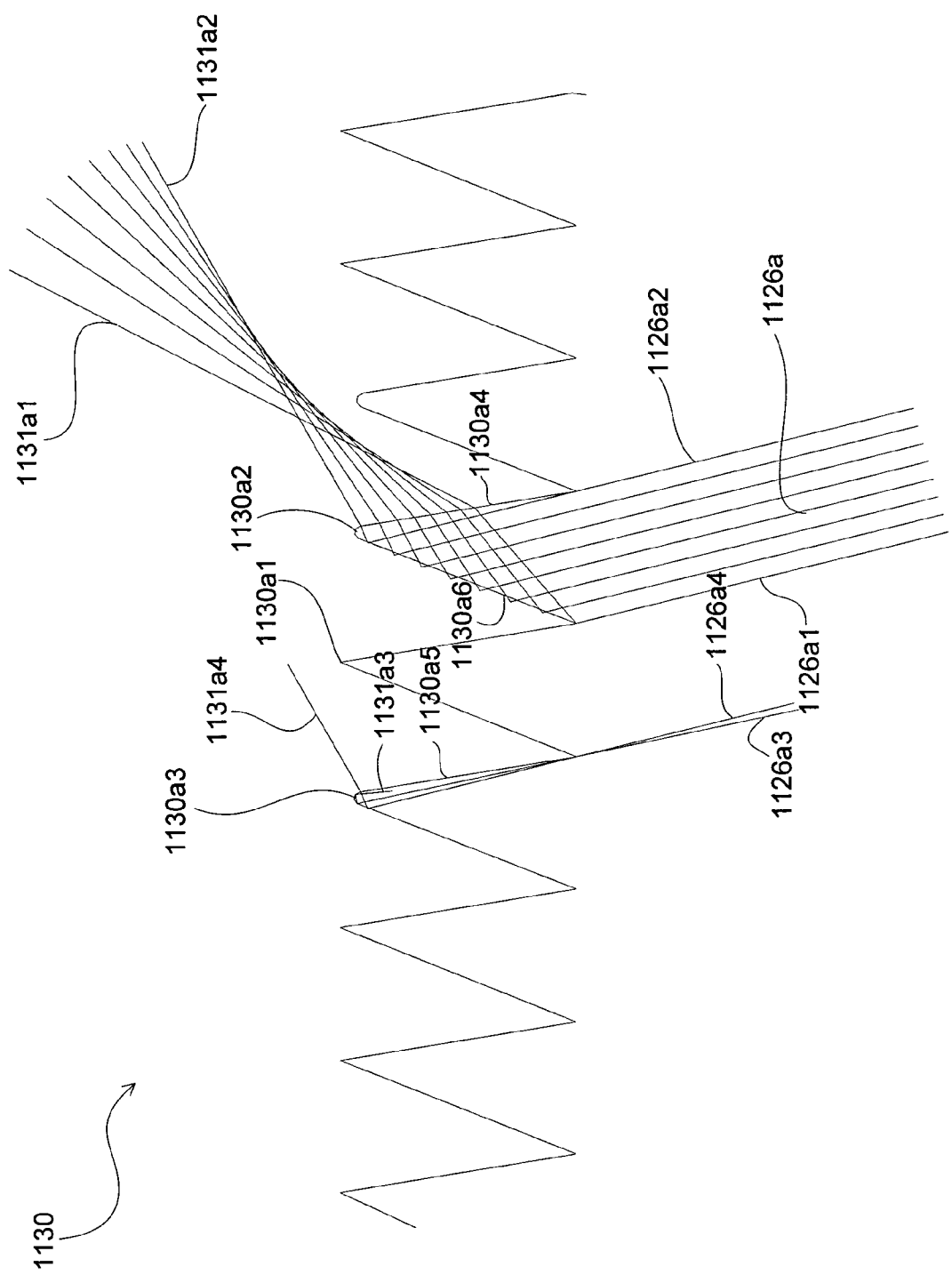
FIG. 11 depicts a second magnified view of various light ray tracing details.

FIG. 11 depicts another enlarged view of a first deviator portion 1130. As can be seen the first and second deviator segments 1130a2, 1130a3, respectively, define a less pointed shape compared to the second deviator segment 1130a1. Due to optics block molding and forming, the second deviator segment may define a more rounded shape. As can be seen, when the light rays 1126a form a desired angle with respect to the third deviator segment 1130a4 light rays 1126a1, 1126a2 are redirected as light rays 1131a1, 1131a2, respectively, as desired. However, when the light rays 1126a form an incorrect angle with respect to the adjoining third deviator segment 1130a5 a portion of the light rays 1126a3 will impinge upon adjoining deviator segments 1130a3 and become totally internally reflected light rays 1131a3. Only a portion of the light rays 1126a4 will be directed as desired light rays 1131a4. In at least one embodiment, the third deviator segment 1130a6 defines a slight convex curve such that substantially all of the light rays 1126a1, 1126a2 are directed as desired to clear all other optics block segments and edges.

Figure 12:
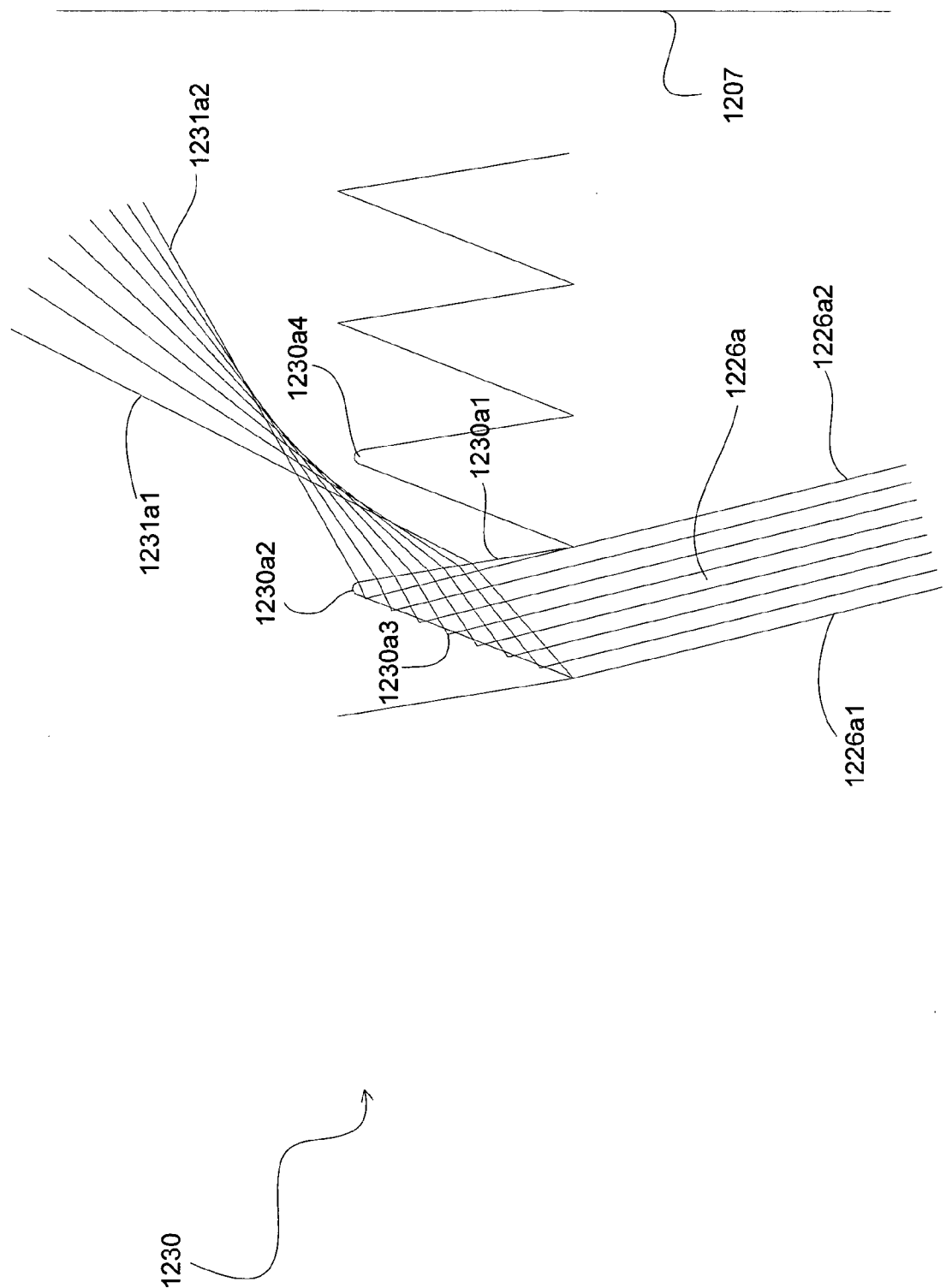
FIG. 12 depicts a magnified view of a portion of the light ray tracing of FIG. 11.

Turning now to FIG. 12, another enlarged view of a first deviator portion 1230 is depicted. Preferably, the first deviator segment 1230a1 forms a smaller angle with respect to the central optical axis 1207 compared to an angle of the light rays 1226a, such that the light rays 1226a1, 1226a2 are redirected as light rays 1231a1, 1231a2, respectively, as desired. In at least one embodiment, the second deviator segment 1230a2 defines a substantially rounded shape and the third deviator segment 1230a3 defines a slightly convex curve. This configuration results in substantially all light rays 1226a clearing the adjoining second deviator segment 1230a4.

Figure 13:
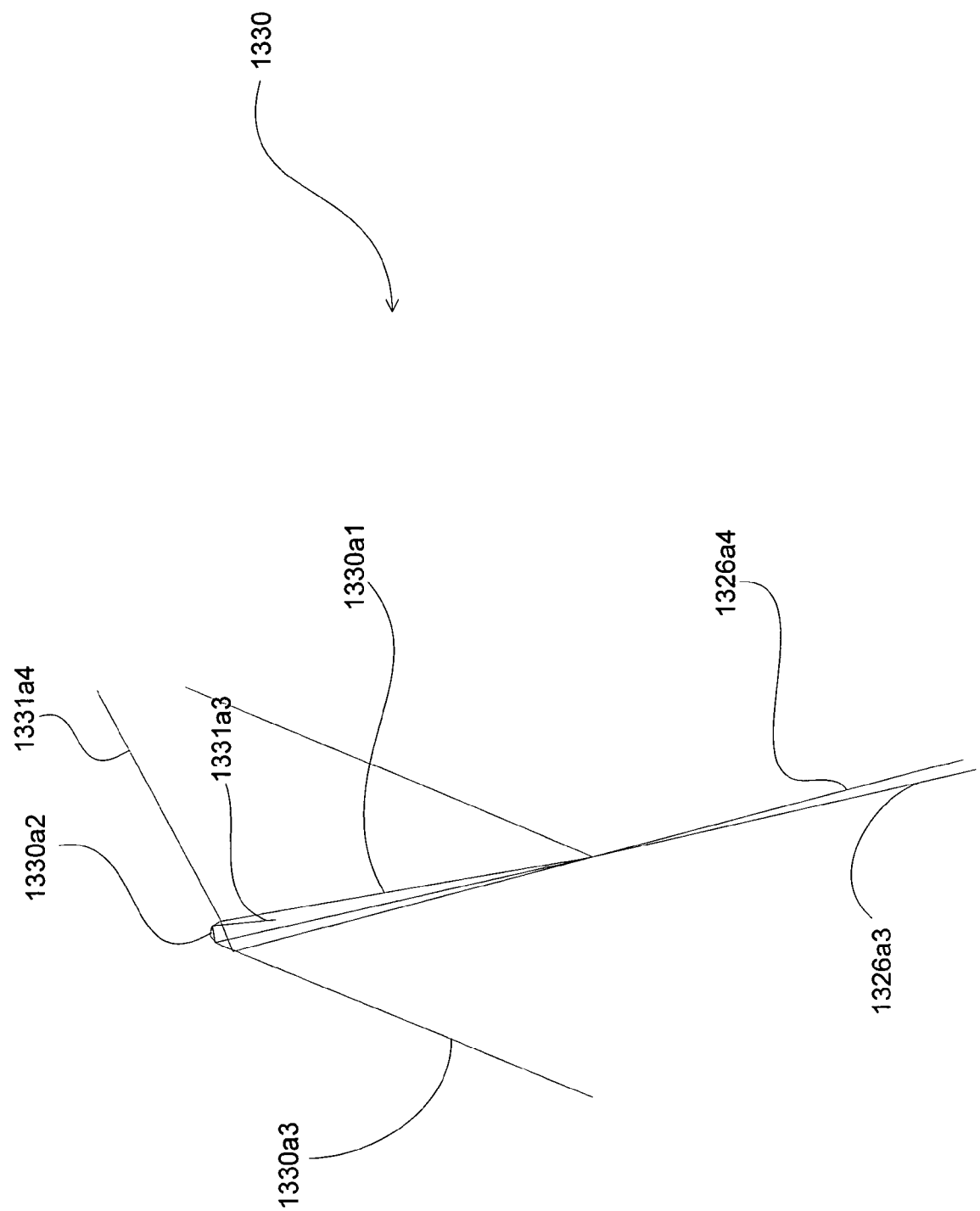
FIG. 13 depicts a magnified view of a second portion of the light ray tracing of FIG. 11.

FIG. 13 depicts another enlarged view of a first deviator portion 1330 having a first deviator segment (preferably, refraction portion) 1330a1, a second deviator segment (preferably, rounded portion) 1330a2 and slightly convex shaped third deviator segment 1330a3. In at least one embodiment, the refraction portion 1330a1 forms an angle that is greater than 5° less than the angle formed by the light rays 1326a4 such that light rays 1331a4 with respect to a central optical axis are emitted in the desired direction. When the light rays 1326a3 are less than 5° less than the angle formed by the first deviator segment, there is a potential for total internally reflected light rays 1331a3 being produced.

Figure 14A:
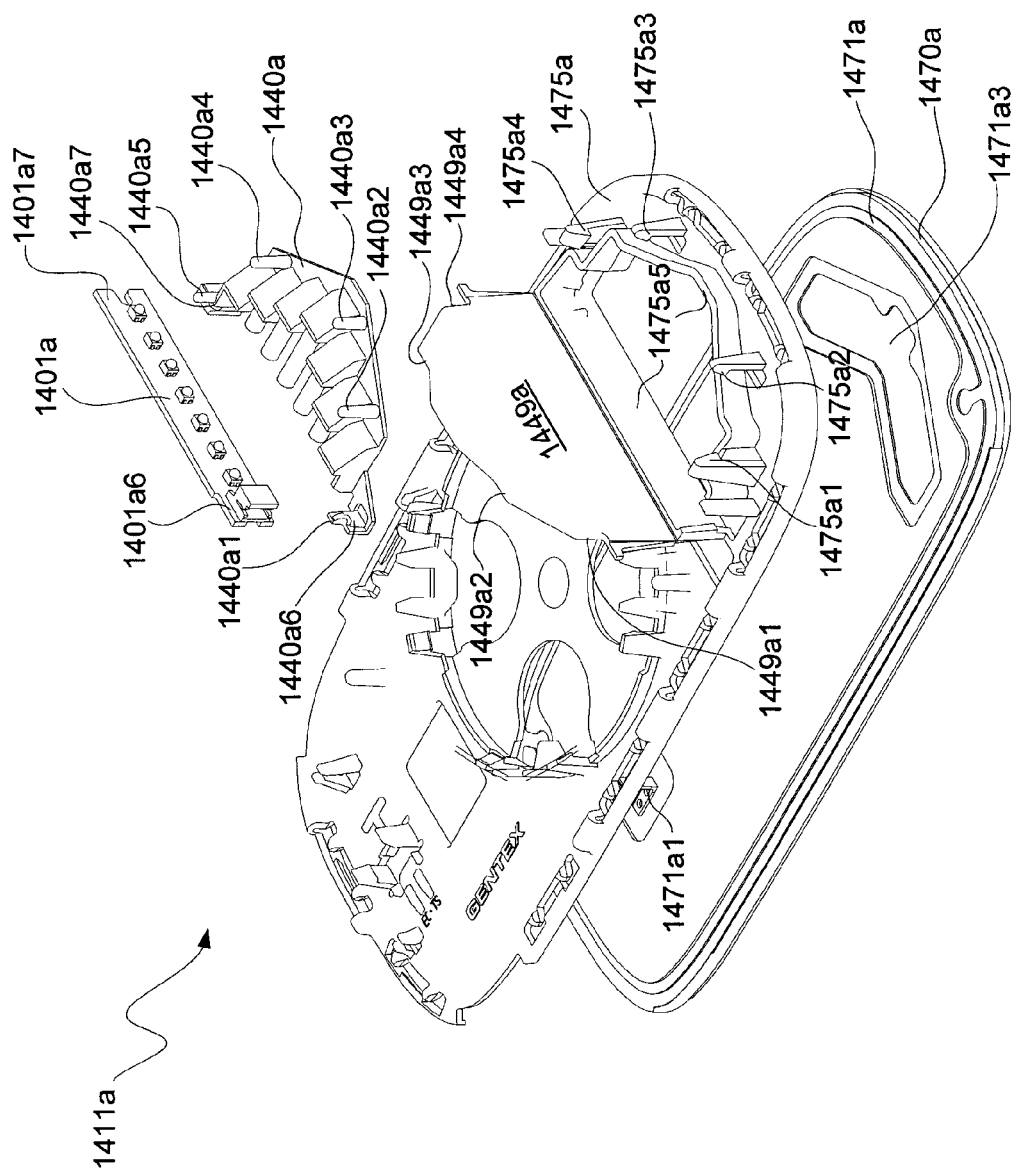

Turning now to FIG. 14a, there is shown an embodiment of a rearview mirror assembly 1411a comprising a reflective element 1470a, a carrier 1471a and a supplemental turning indicator assembly. The supplemental turning indicator assembly comprises a printed circuit board 1401a and an optics block 1440a. In at least one embodiment, a heater element 1471a is positioned proximate the reflective element for deicing and, or, defogging. A light ray diffusing material 1471a3 may be positioned proximate the reflective element in a location through which light rays associated with the supplemental turning indicator assembly pass; the light ray diffusing material may be laminated to the a surface of the reflective element, may be integrated into the heater element, may be integral with the optics block, a combination thereof or may be positioned any place between the supplemental turning indicator assembly and a viewer of the associated light rays. The heater element comprises a first electrical connector 1471a1 and a second electrical connector (not shown in FIG. 14a). The carrier comprises a supplemental turning indicator assembly receptacle defined by alignment walls 1475a5 and a lid 1449a. The lid is preferably attached to the carrier via a living hinge and comprises edge portions 1449a1, 1449a2, 1449a3 and 1449a4. Preferably, the carrier further comprises latch portions 1475a1, 1475a2, 1475a3 and 1475a4 configured to secure the lid in a closed position once the supplemental turning indicator assembly is positioned within the receptacle. In a preferred embodiment, the printed circuit board comprises alignment portions 1401a6 and 1401a7 configured to be received by the optics block mating portions 1440a6 and 1440a7, respectively. In at least one embodiment, optics block posts 1440a1, 1440a2,1440a3, 1440a4 and 1440a5 are provided and configured such that the lid will bias the supplemental turning signal indicator assembly toward the reflective element and secure the supplemental turning signal indicator assembly in a desired position when the lid is snapped closed. In at least one embodiment, the printed circuit board is also biased proximate the optics block via the closed lid. In at least one embodiment, the printed circuit board is mounted with a primary optical axis of the associated light sources substantially parallel with respect to the reflective element. In a preferred embodiment, the element within the carrier plate has +/− approximately 1 mm maximum horizontal and, or, vertical positional tolerance. The supplemental turning indicator assembly position within the carrier plate is thereby accurately aligned with the desired portion of the reflective element. In at least one embodiment, the printed circuit board is oriented in a common plane defined by the primary optical axis of the optics block light pipes and "side looker" configured light sources are employed. It should be understood that portions of the light pipes and, or, portions of the structure proximate reflecting, collimating, condensing and refracting surfaces may be void of material such that associated light rays pass through air or other gaseous areas. This improves resulting molded devices. Shrinkage and warpage is reduced when thickness is reduced. It should be understood that surfaces of the optics block may be coated to improve light ray collimation, condensing, reflecting and, or, refraction. For example, chrome, silver, aluminum, alloys thereof, subcombinations and combinations thereof may be applied to a desired surface. It should be understood that spectral filter material may also be incorporated between a light source and the intended viewer to, at least in part, bias the spectral characteristics. In at least one embodiment, an optics block is configured as a supplemental turning indicator with a portion of the light rays emitted by at least one associated light source are directed toward the driver of the controlled vehicle to provide "feedback" regarding the status of the supplemental turning indicator assembly.

Figure 14B:
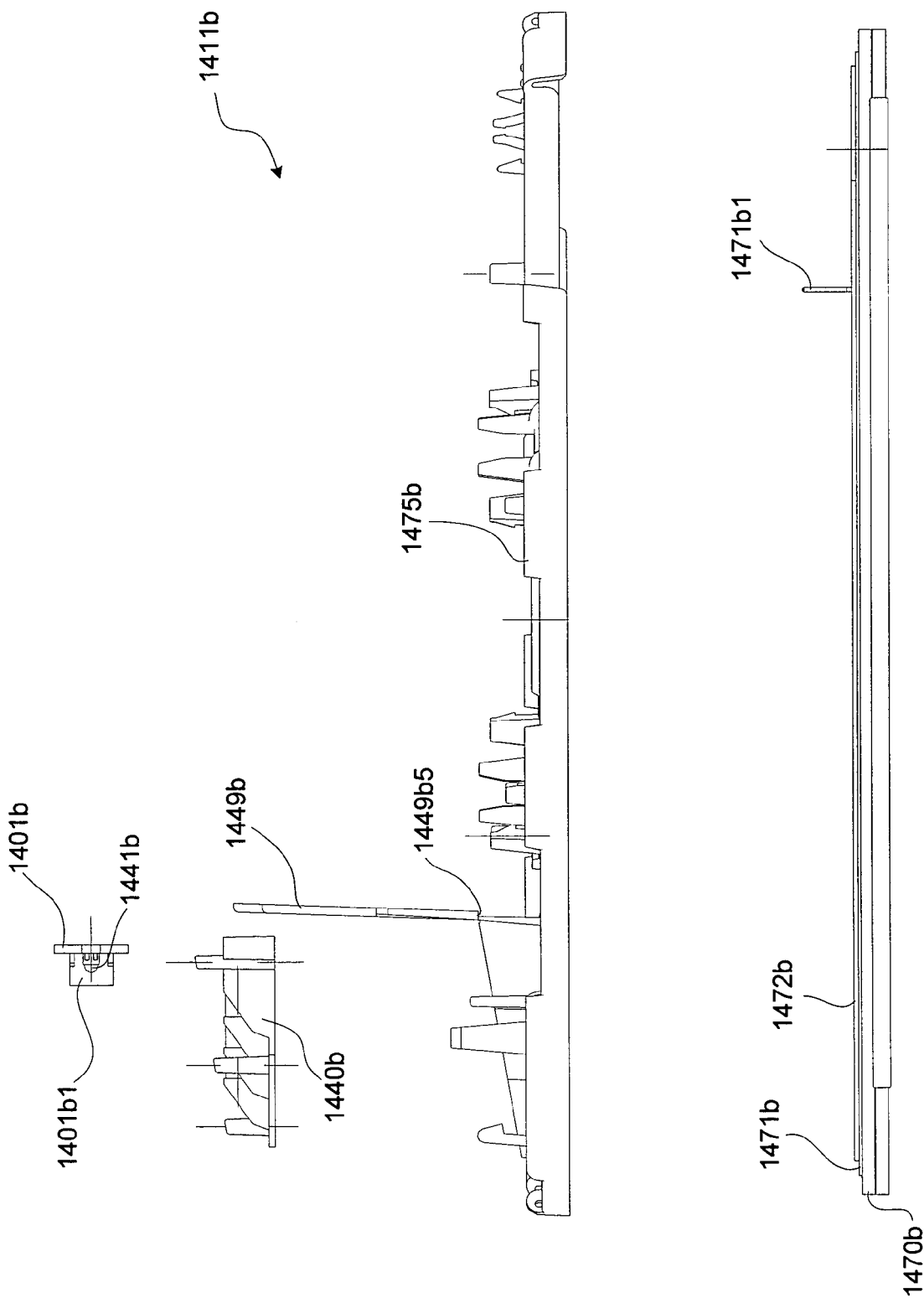

FIG. 14b depicts a profile view of a rearview mirror assembly 1411b comprising a reflective element 1470b, a carrier 1475b and a supplemental turning signal indicator assembly. In at least one embodiment, a heater element 1471b with a first electrical connector 1471b1 and a second electrical connector (not shown) and a foam backing material 1472b are provided. In a preferred embodiment, a lid 1449b is attached to the carrier via a living hinge 1449b5. The supplemental turning signal indicator assembly comprises an optics block 1440b and a printed circuit board 1401b having an electrical plug 1401b1 and at least one light source 1441b.

FIG. 14c depicts a profile view of a rearview mirror assembly comprising a reflective element 1470c, a carrier 1475c and a supplemental turning signal indicator assembly. In a preferred embodiment, a heater element 1471c having a first electrical connector 1471c1 and a second electrical connector 1471c2 and a foam backing material 1472c are provided. Preferably, the carrier is provided with a lid 1449c. In a preferred embodiment, the optics block 1440c comprises seven optics elements 1444c1, 1444c2, 1444c3, 1444c4, 1444c5, 1444c6 and 1444c7. Preferably, the printed circuit board 1401c comprises an electrical plug 1401c1 and seven light sources 1441c, 1442c, 1443c, 1444c, 1445c, 1446c and 1447c. In a preferred embodiment each light source is aligned with a given optics element such that light rays emitted from any given light source are transmitted via the given optics element to the desired illumination area. In a preferred embodiment, a primary optical axis of at least one light source is within 0.1% positional tolerance with respect to a primary optical axis of at least one optic element. FIGS. 14a-q depicts a plurality of light sources that are linearly positioned on a common surface of a printed circuit board defining a first pattern. In a related embodiment, an optics block is configured to redirect the light rays from the plurality of light sources to define a second pattern different than the first pattern.

Figure 14D:
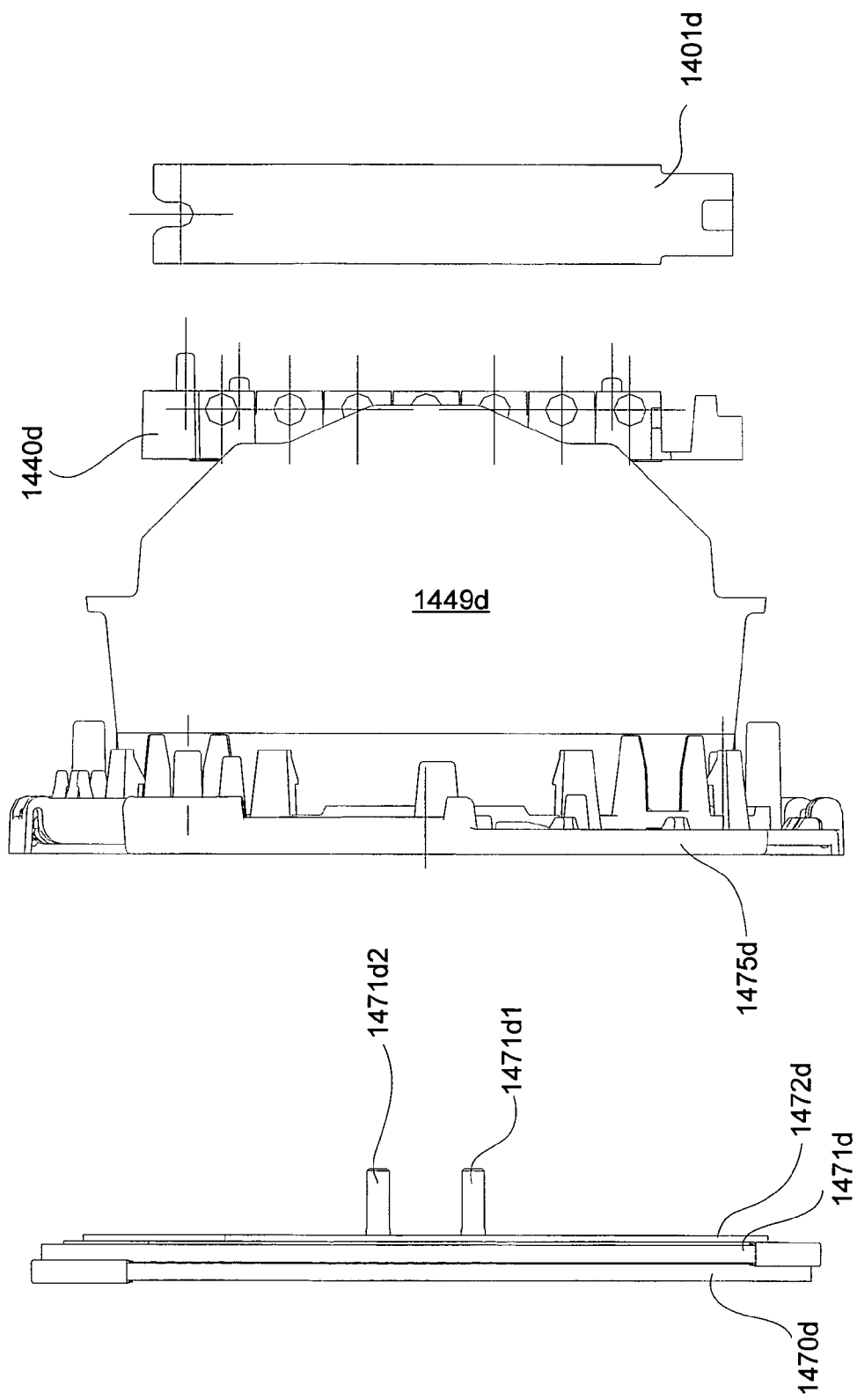

FIG. 14d depicts a profile view of a rearview mirror assembly comprising a reflective element 1470d, a carrier 1475d and a supplemental turning signal indicator assembly. A heater element 1471d with a first electrical connector 1471d1 and a second electrical connector 1471d2 and a foam backing material is provided. A lid 1449d is provided attached to the carrier. The supplemental turning signal indicator assembly comprises a printed circuit board 1401d and an optics block 1440d.

Turning to FIG. 14e, a supplemental turning signal indicator assembly is depicted comprising a printed circuit board 1401e and an optics block 1440e. The printed circuit board comprises at least one light source 1424e including a lens 1424e1. The optics block comprises four optics block posts 1440e2, 1440e3, 1440e4, 1440e5 and seven optics elements 1444e1, 1444e2, 1444e3, 1444e4, 1444e5, 1444e6 and 1444e7. At least one optics elements comprises a collimating portion 1444e8, a light pipe 1444e9 and a reflecting portion 1444e10.

FIG. 14f depicts a perspective view of a supplemental turning signal indicator assembly comprising a printed circuit board 1401f and an optics block 1440f. The optics block comprises at least four optics block posts 1440f2, 1440f3, 1440f4, 1440f5 and at least one optic element comprising a collimating portion 1444f8, a light pipe 1444f9, a reflecting portion 1444f10 and a refracting portion 1444f11.

FIG. 14g depicts a profile view of a supplemental turning signal indicator assembly comprising a printed circuit board 1401g and an optics block 1440g. The optics block comprises at least three optics block posts 1440g3, 1440g4, 1440g5 and at least four optics elements 1444g1, 1444g2, 1444g3, 1444g4.

FIG. 14h depicts a profile view of a supplemental turning signal indicator assembly comprising a printed circuit board 1401h positioned within optics block receptacles 1440h6, 1440h7.

Figure 14I:
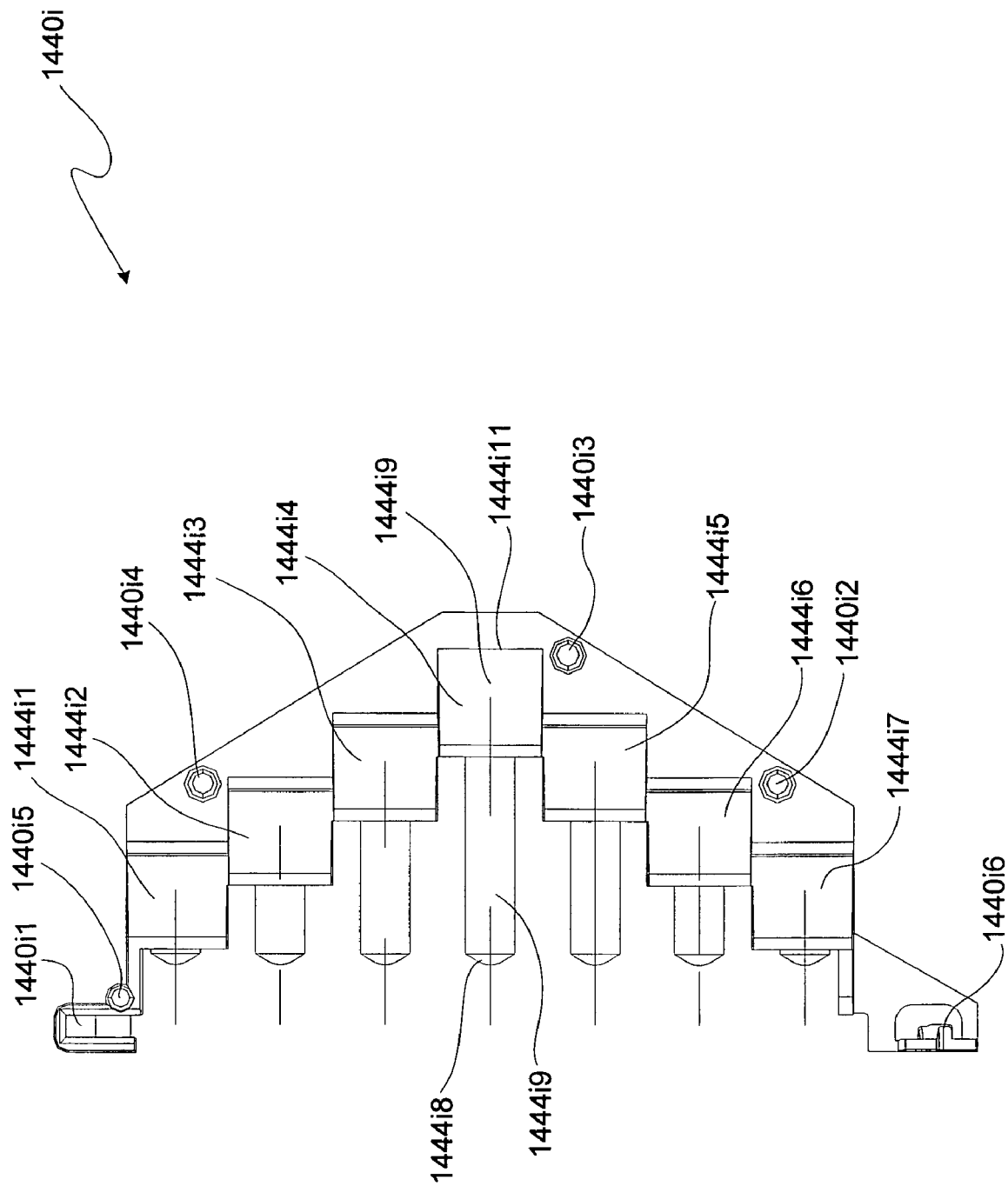

FIG. 14i depicts an exploded view of an optics block 1440i comprising four optics blocks posts 1440i2, 1440i3, 1440i4 and 1440i5. The optics block further comprises optics block mating portions 1440i6, 1440i7 for receiving a printed circuit board. The optics block further comprises seven optics elements 1444i1, 1444i2, 1444i3, 1444i4, 1444i5, 1444i6 and 1444i7 forming substantially a chevron shape. Preferably, each of the optics elements comprises a collimating portion 1444i8, a light pipe 1444i9, a reflecting portion 1444i10 and a refracting portion 1444i11.

Figure 14J:
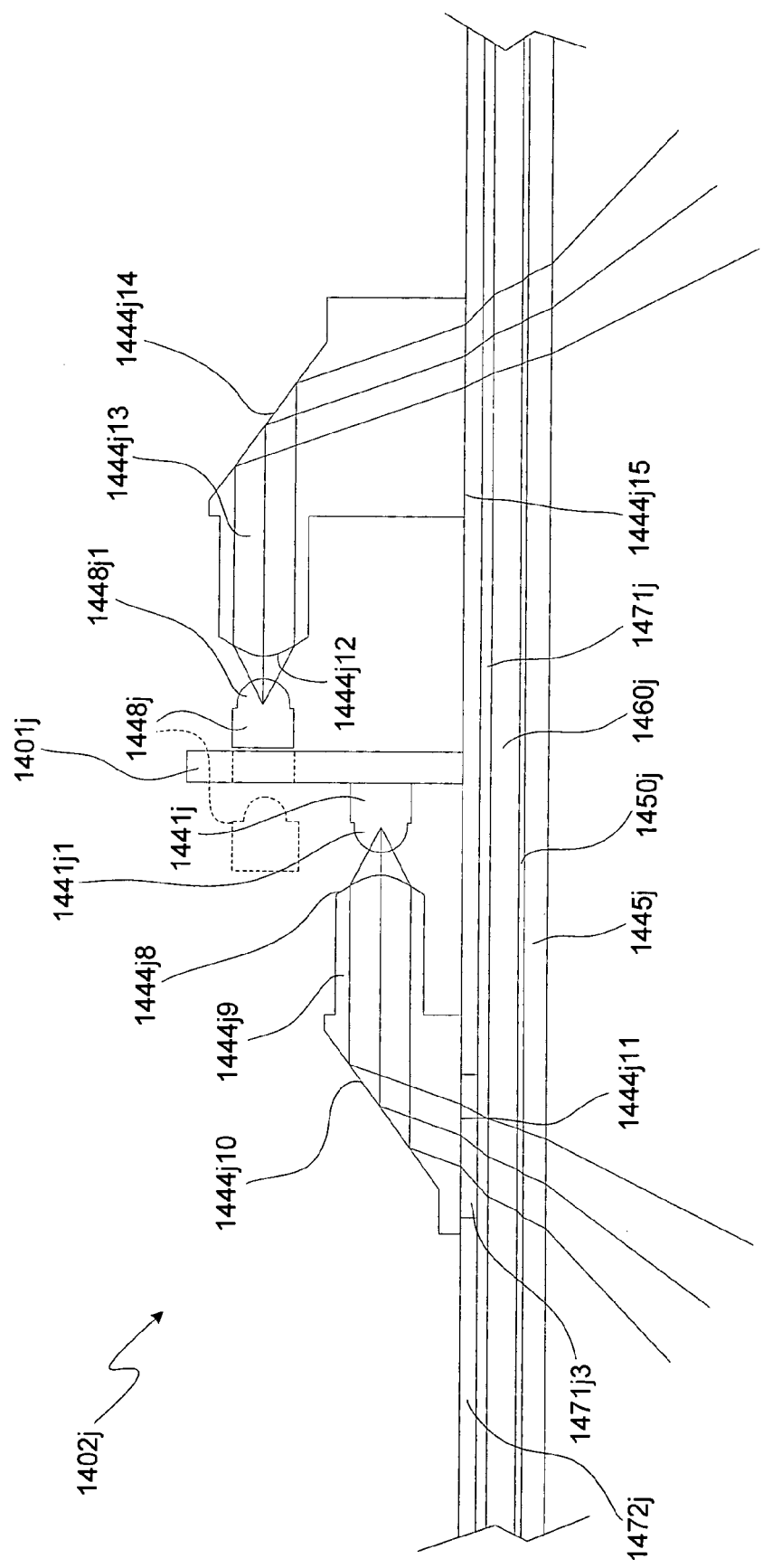

Turning to FIG. 14j, a rearview mirror assembly 1402j is depicted comprising a reflective element, a heater element 1471j, a foam backing material 1472j and a supplemental illumination assembly. The reflective element is preferably an electro-optic device comprising a first substantially transparent substrate 1445j, an electro-optic medium 1450j and a second substrate 1460j comprising at least a portion substantially aligned with area 1471j3 that is substantially transparent. Area 1471j3 may comprise a substantially diffuse material; it should be understood that the heater element is substantially transparent in this area or may have a aperture aligned with the area. The supplemental illumination assembly comprises a printed circuit board 1401j at least two light sources 1441j, 1448j and at least two optics elements. In a preferred embodiment, the first light source 1441j, the associated lens 1441j1 and the associated optics element are configured to function as a supplemental turning signal indicator; the optics block comprises a collimating portion 1444j8, a light pipe 1444j9, a reflecting portion 1444j10 and a refractive portion 1444j11 configured to direct substantially all of the light rays emitted by the light source 1441j away from a driver with respect to the side of an associated vehicle. The second light source 1448j, the associated lens 1448j1 and the associated optics element are preferably configured as a door and, or, keyhole illuminator; the optics block comprises a collimating portion 1444j12, a light pipe 1444j13, a reflecting portion 1444j14 and a refracting portion 1444j15 configured to direct substantially all of the light rays emitted by the light source 1448j toward the door and, or, keyhole of an associated vehicle. It should be understood that the rearview mirror assembly may comprise an additional illumination assembly, or an illumination assembly in lieu of at least one depicted, configured to provide a puddle light that illuminates the ground area near the respective side of a vehicle. It should be understood that the reflective element may be a prismatic type device having a single substrate, in these embodiments the associated reflective layer, or layers, will have substantially transmissive portions aligned with the refractive portions of the optics elements. It should be understood that the light sources may be mounted to the same side of the printed circuit board with one aimed through a hole in the printed circuit board to facilitate efficient manufacturing. Having both light sources configured as surface mount devices and positioned on a common side of the printed circuit board provides further manufacturing improvements. In at least one embodiment, a polarized reflective element in accordance with the Philips device described in detail elsewhere herein is employed. It should be understood that at least two light sources may be oriented such that their respective optical axis are parallel and the optics block is configured such that the light rays are redirected as shown in FIG. 14*j*. In at least one related embodiment, a single light source is utilized with an optics block configured such that the light rays are split such that a portion are directed as depicted in FIG. 14*j*.

Turning to FIG. 14*k* a rearview mirror assembly is depicted comprising a reflective element, a heater element 1471*k*, a foam backing material 1472*k* and a supplemental illumination assembly. Preferably, the foam backing material and the heater element comprise areas aligned with area 1471*k*3 that substantially transmit light rays. The reflective element is preferably configured as an electro-optic device comprising a first substantially transparent substrate 1445*k*, an electro-optic medium 1450*k* and a second substrate 1460*k*. The supplemental illumination assembly comprises a printed circuit board 1401*k*, a light source 1441*k* with a lens 1441*k*1 and an associated optics element. The optics element comprises a condensing portion 1444*k*8, a light pipe 1444*k*9, a reflecting portion 1444*k*10 and a refracting portion 1444*k*11. In at least one related embodiment, the surface 1444*k*8 defines the desired beam pattern cross sectional shape. It should be understood that the beam pattern may be square, chevron, circular, oval, diamond, triangular, rectangular, subcombination thereof, combination thereof, etc.

Figure 14L:
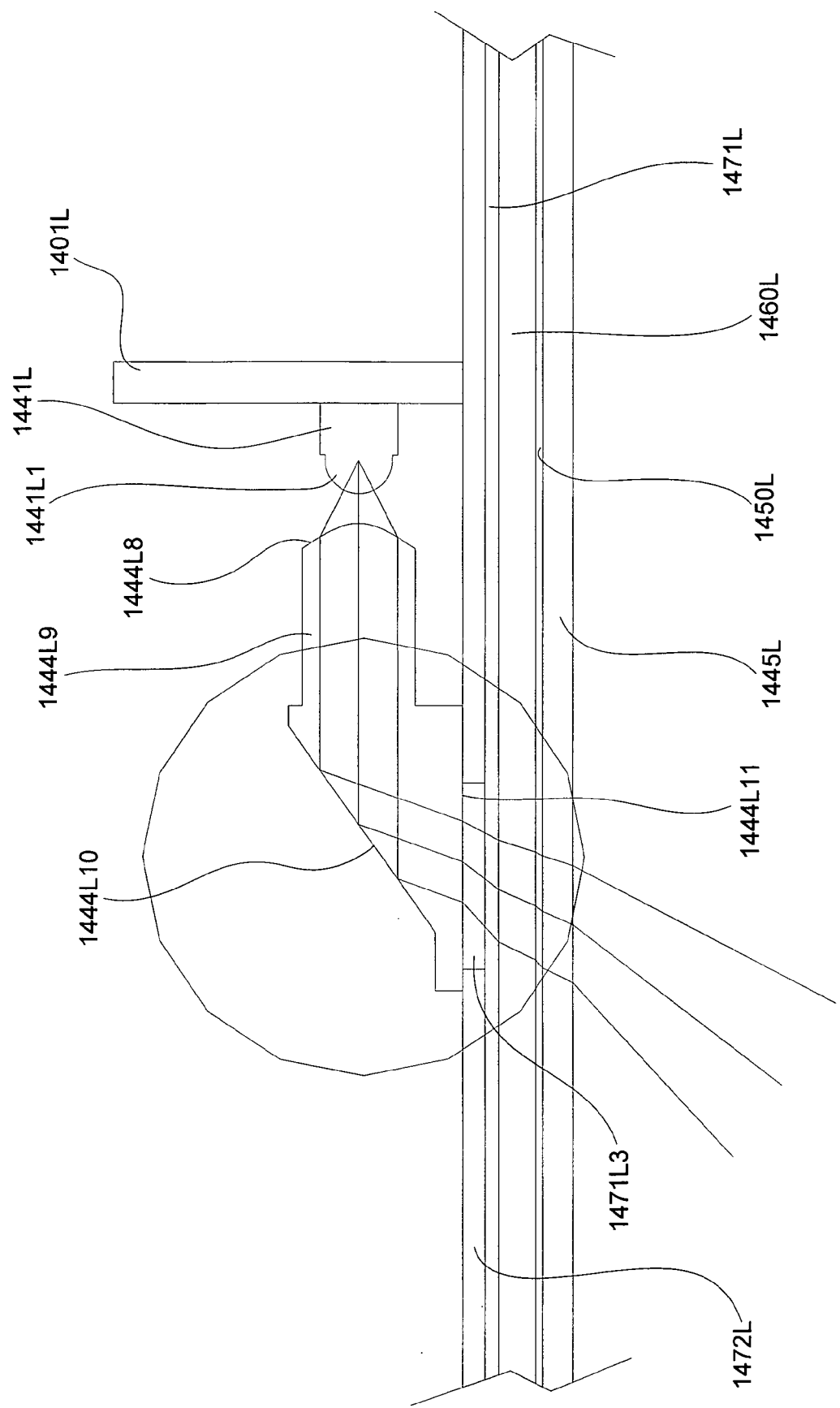

Turning to FIG. 14L a rearview mirror assembly is depicted comprising a reflective element, a heater element 1471L, a foam backing material 1472L and a supplemental illumination assembly. Preferably, the foam backing material and the heater element comprise areas aligned with area 1471L3 that substantially transmit light rays. The reflective element is preferably configured as an electro-optic device comprising a first substantially transparent substrate 1445L, an electro-optic medium 1450L and a second substrate 1460L. The supplemental illumination assembly comprises a printed circuit board 1401L, a light source 1441L with a lens 1441L1 and an associated optics element. The optics element comprises a collimating portion 1444L8, a light pipe 1444L9, a reflecting portion 1444L10 and a refracting portion 1444L11. The portion of the rearview mirror assembly of FIG. 14L enclosed by the circle is depicted in exploded views of FIGS. 14*m-q*. In at least one related embodiment, the surface 1444L11 defines the desired beam pattern cross sectional shape. It should be understood that the beam pattern may be square, chevron, circular, oval, diamond, triangular, rectangular, subcombination thereof, combination thereof, etc.

Figure 14M:
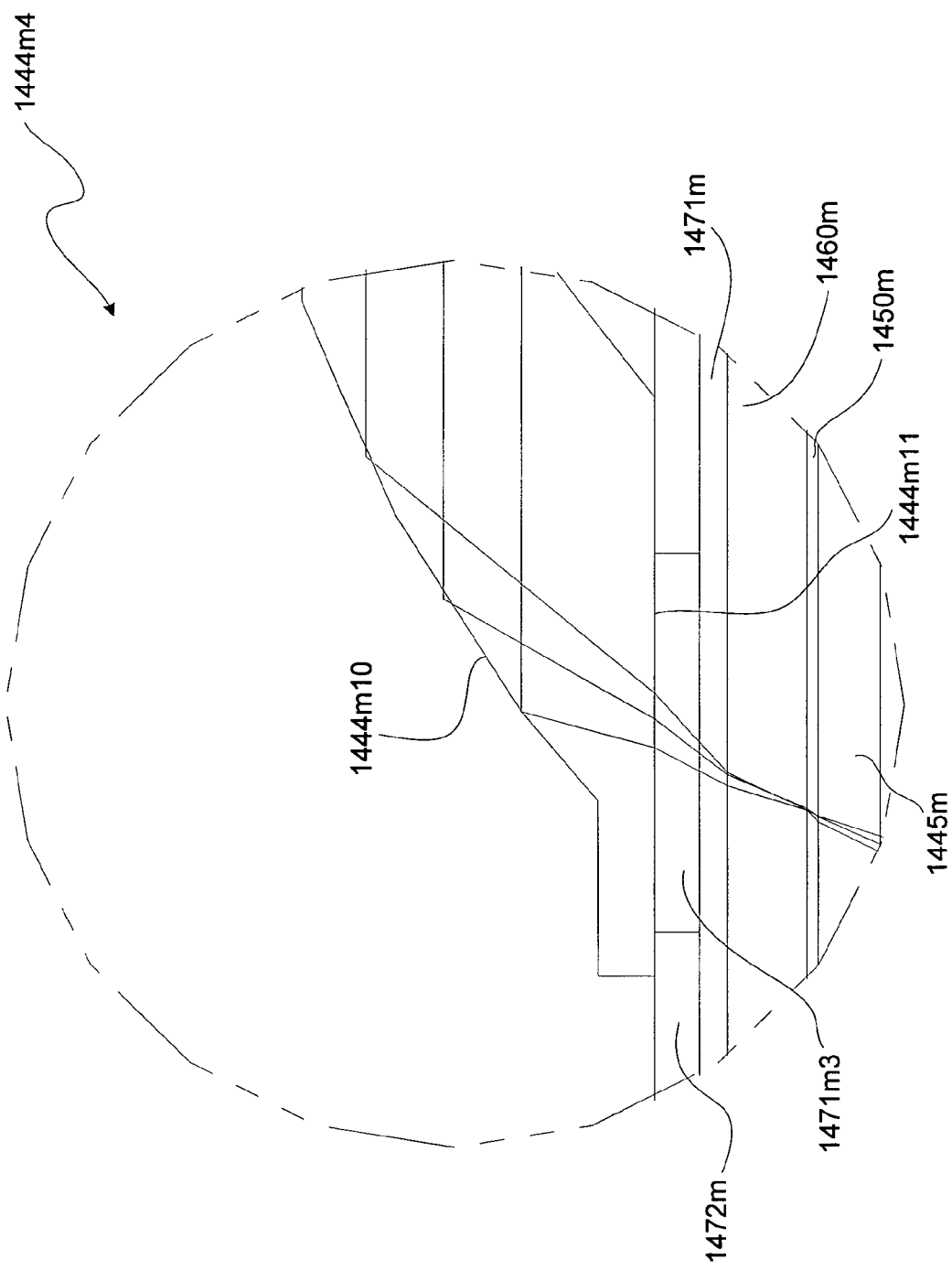

FIG. 14*m* depicts a portion 1444*m*4 of a rearview mirror assembly comprising a reflective element, a heater element 1471*m*, a foam backing material 1472*m* and an optics element. The reflective element comprises a first substantially transparent substrate 1445*m*, an electro-optic medium 1450*m* and a second substrate 1460*m*. An area 1471*m*3 is preferably substantially transparent and may comprise a diffusing material. The optics block comprises a substantially convex shaped macro reflecting portion 1444*m*10 and a refracting portion 1444*m*11. In at least one embodiment, the associated light rays are condensed by said reflecting portion. In at least one related embodiment, the surface 1444*m*10 defines the desired beam pattern cross sectional shape. It should be understood that the beam pattern may be square, chevron, circular, oval, diamond, triangular, rectangular, subcombination thereof, combination thereof, etc.

Figure 14N:
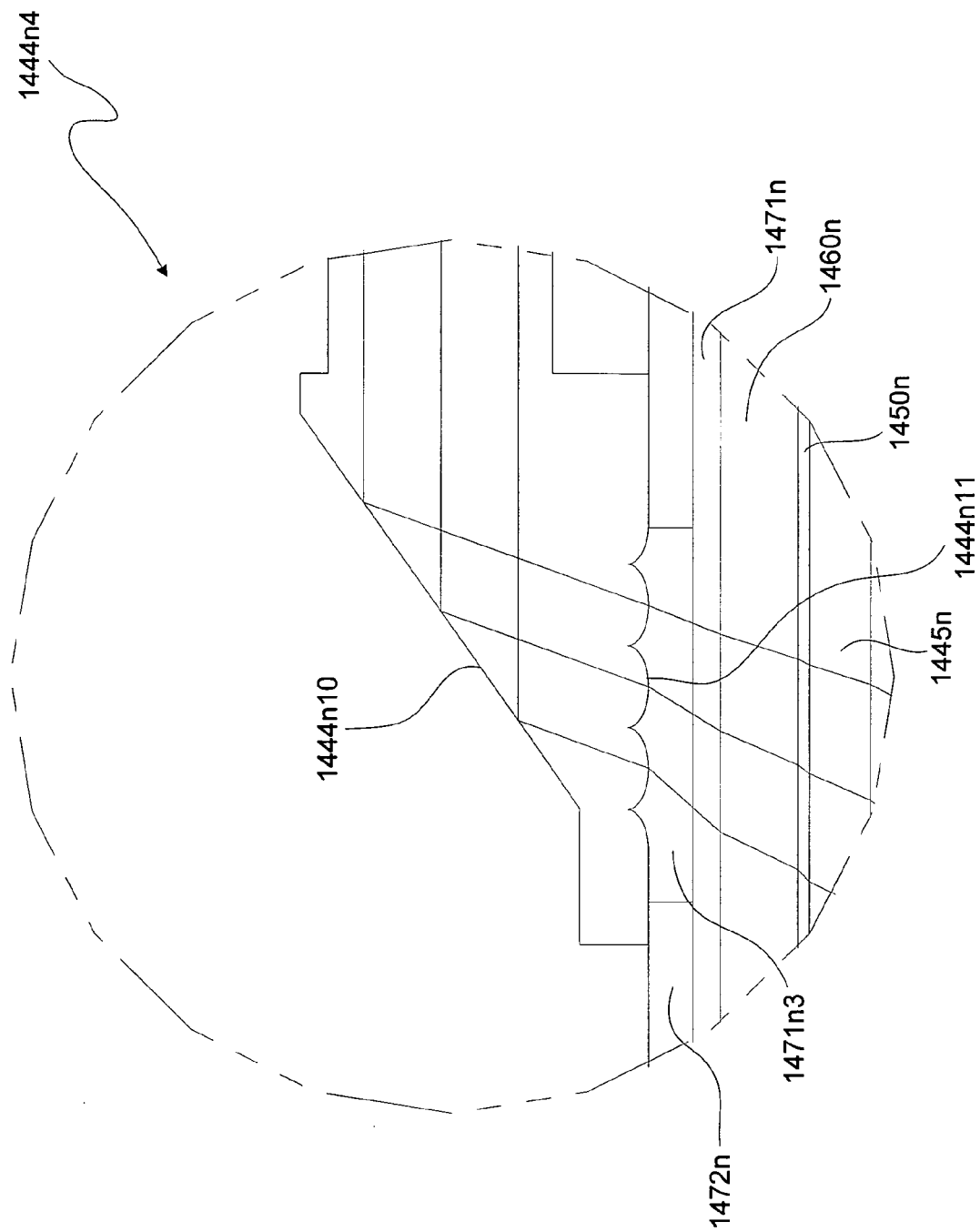

FIG. 14*n* depicts a portion 1444*n*4 of a rearview mirror assembly comprising a reflective element, a heater element 1471*n*, a foam backing material 1472*n* and an optics element. The reflective element comprises a first substantially transparent substrate 1445*n*, an electro-optic medium 1450*n* and a second substrate 1460*n*. An area 1471*n*3 is preferably substantially transparent and may comprise a diffusing material. The optics block comprises a reflecting portion 1444*n*10 and a micro refracting portion 1444*n*11. In at least one related embodiment, the surface 1444*n*11 defines the desired beam pattern cross sectional shape. It should be understood that the beam pattern may be square, chevron, circular, oval, diamond, triangular, rectangular, subcombination thereof, combination thereof, etc.

Figure 14O:
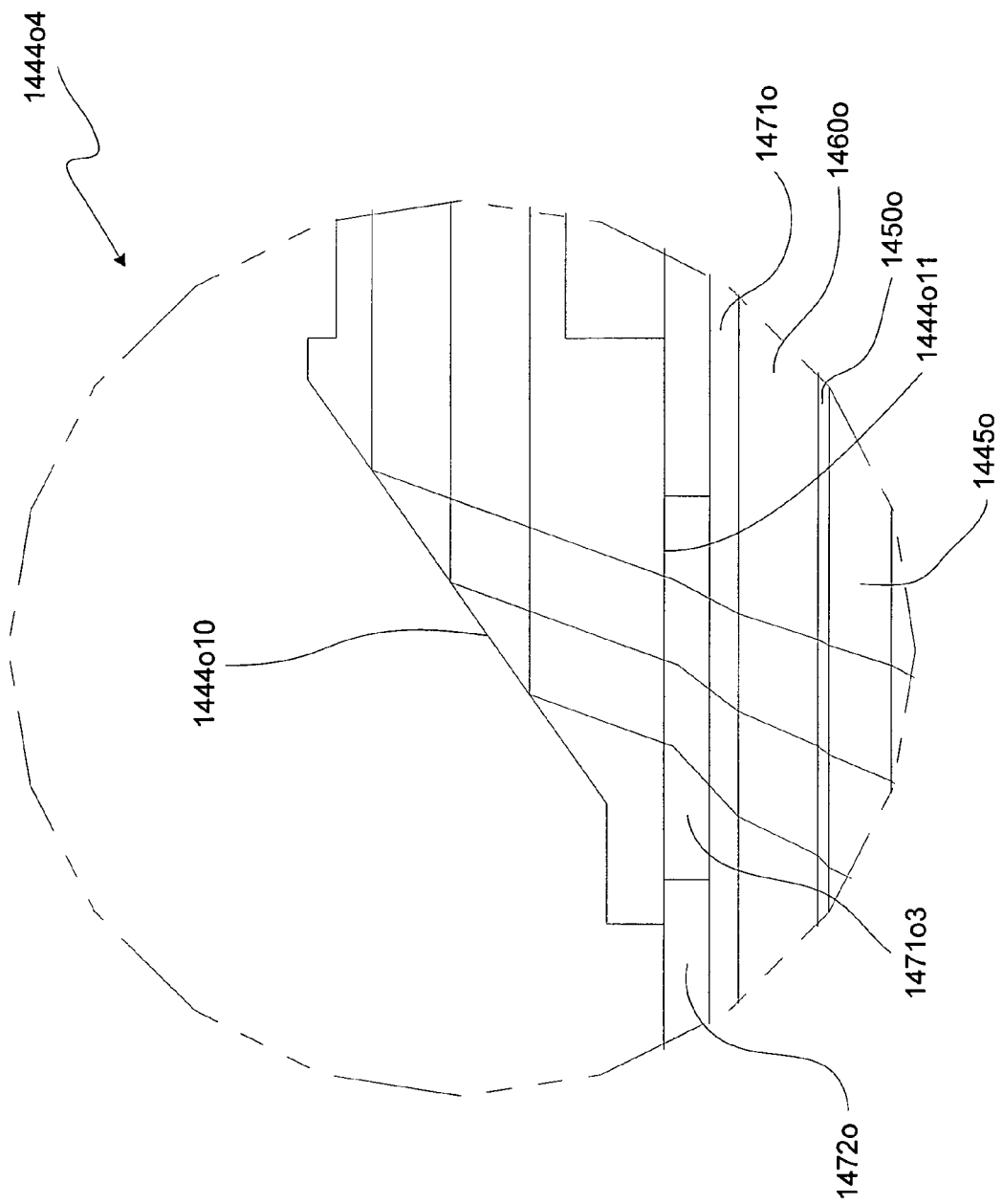

FIG. 14*o* depicts a portion 1444*o*4 of a rearview mirror assembly comprising a reflective element, a heater element 1471*o*, a foam backing material 1472*o* and an optics element. The reflective element comprises a first substantially transparent substrate 1445*o*, an electro-optic medium 1450*o* and a second substrate 1460*o*. An area 1471*o*3 is preferably substantially transparent and may comprise a diffusing material. The optics block comprises a reflecting portion 1444*o*10 and a macro refracting portion 1444*o*11. In at least one related embodiment, the surface 1444*o*11 defines the desired beam pattern cross sectional shape. It should be understood that the beam pattern may be square, chevron, circular, oval, diamond, triangular, rectangular, subcombination thereof, combination thereof, etc.

Figure 14P:
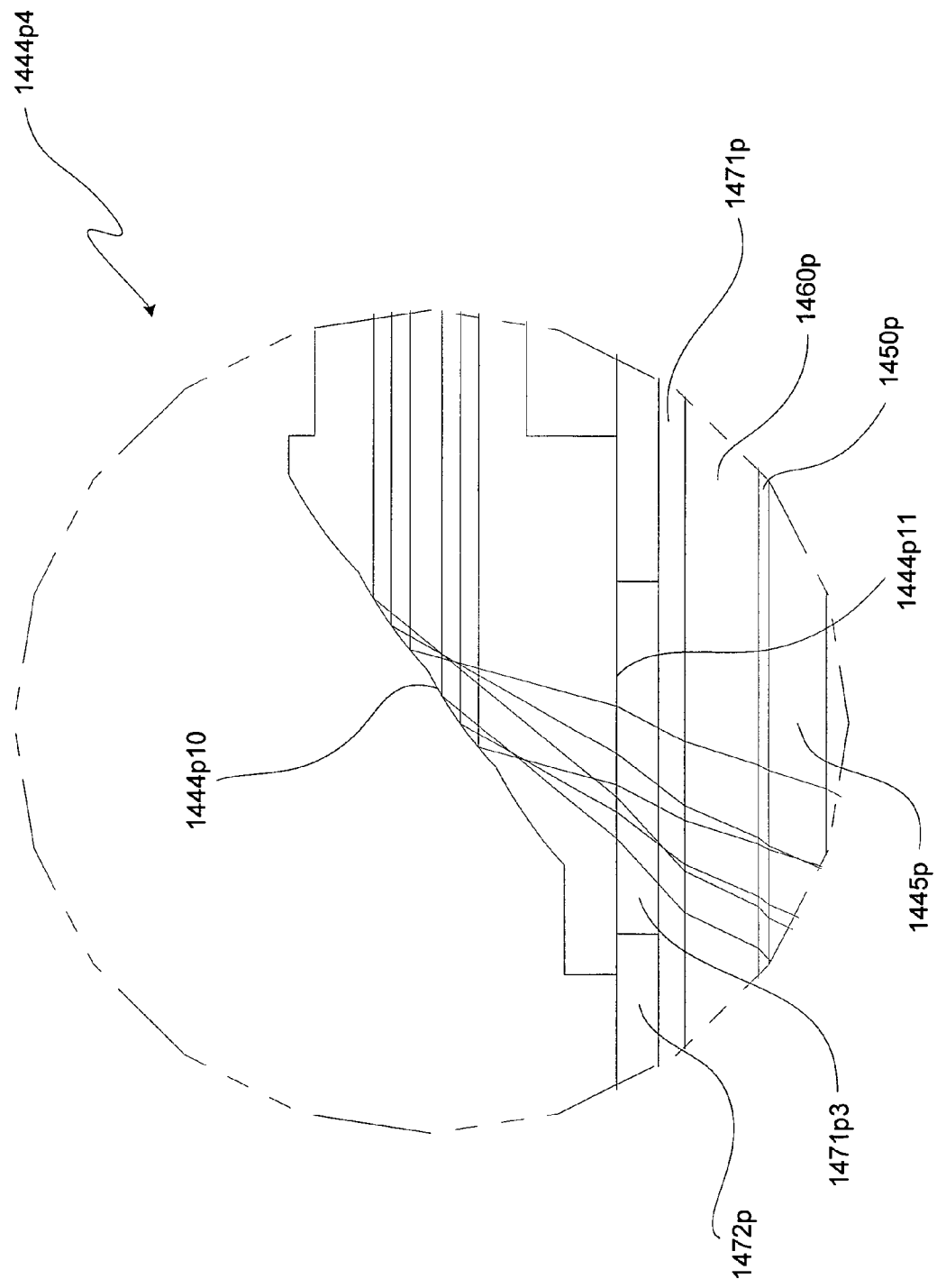
Figure 14Q:
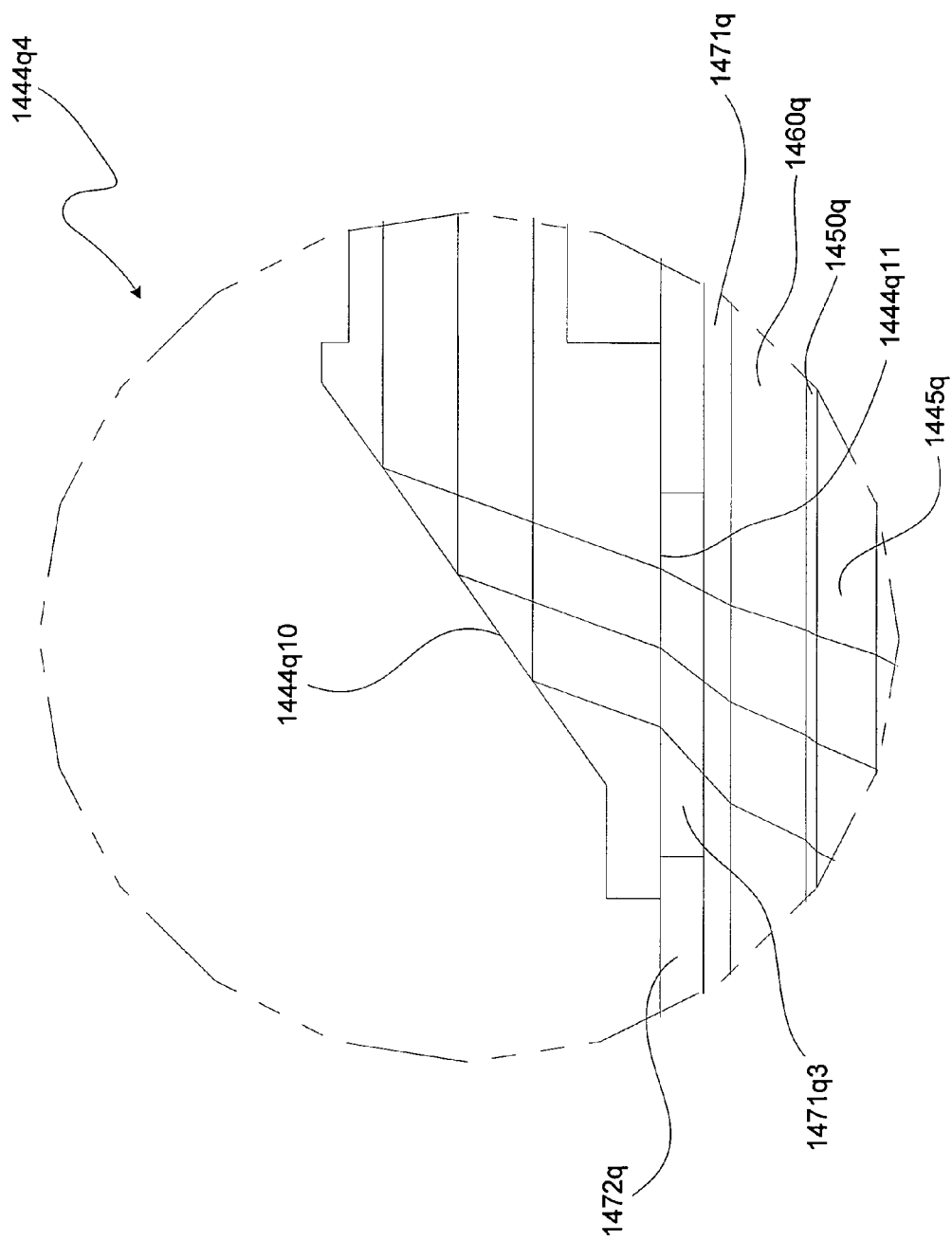

FIG. 14*p* depicts a portion 1444*p*4 of a rearview mirror assembly comprising a reflective element, a heater element 1471*p*, a foam backing material 1472*p* and an optics element. The reflective element comprises a first substantially transparent substrate 1445*p*, an electro-optic medium 1450*p* and a second substrate 1460*p*. An area 1471*p*3 is preferably substantially transparent and may comprise a diffusing material. The optics block comprises a micro reflecting portion 1444*p*10 and a refracting portion 1444*p*11. In at least one related embodiment, the surface 1444*p*10 defines the desired beam pattern cross sectional shape. It should be understood that the beam pattern may be square, chevron, circular, oval, diamond, triangular, rectangular, subcombination thereof, combination thereof, etc.

FIG. 14*q* depicts a portion 1444*q*4 of a rearview mirror assembly comprising a reflective element, a heater element 1471*q*, a foam backing material 1472*q* and an optics element. The reflective element comprises a first substantially transparent substrate 1445*q*, an electro-optic medium 1450*q* and a second substrate 1460*q*. An area 1471*q*3 is preferably substantially transparent and may comprise a diffusing material. The optics block comprises a reflecting portion 1444*q*10 and a holographic refracting portion 1444*q*11. In at least one related embodiment, the surface 1444q11 defines the desired beam pattern cross sectional shape. It should be understood that the beam pattern may be square, chevron, circular, oval, diamond, triangular, rectangular, subcombination thereof, combination thereof, etc.

Figure 15A:
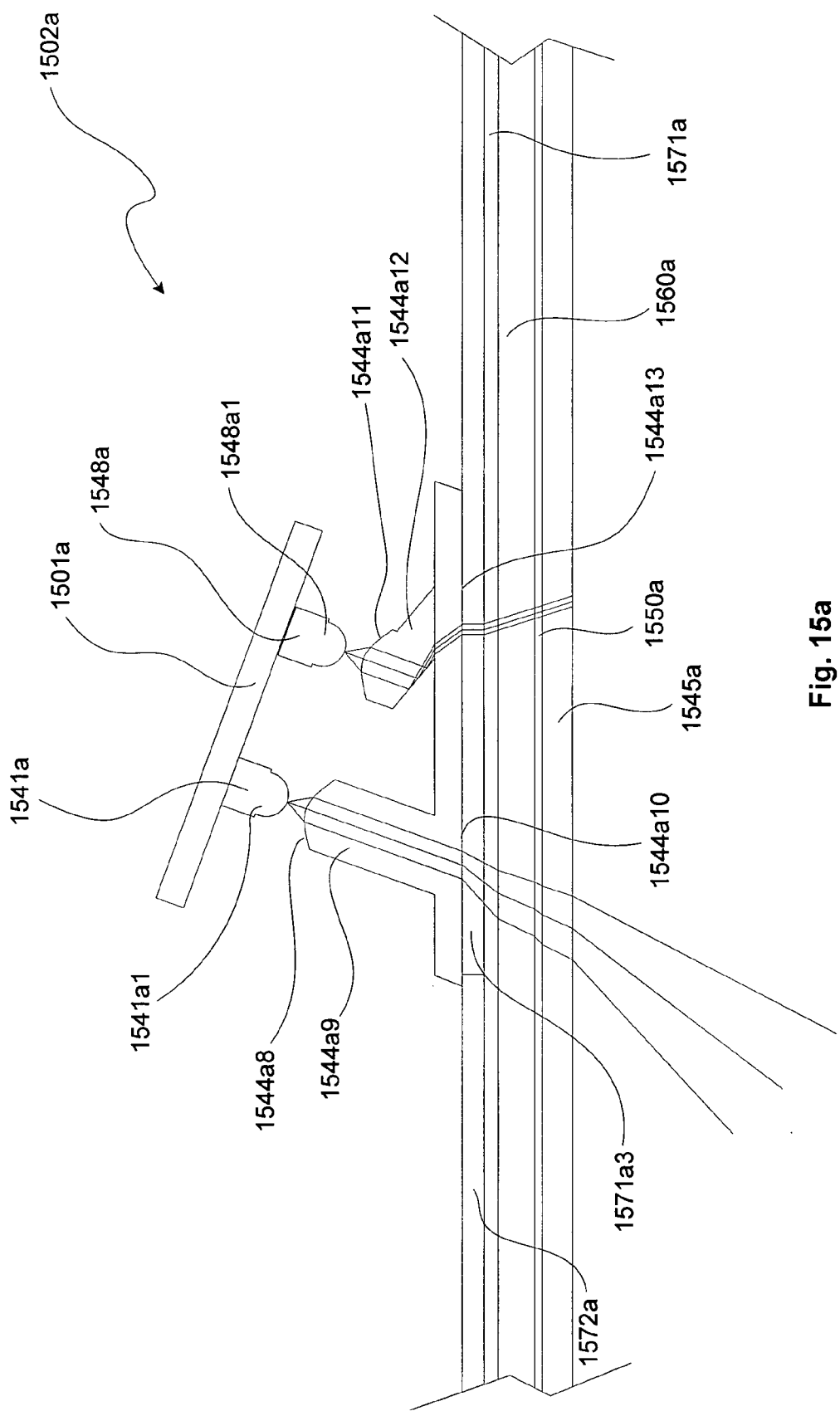
FIGS. 15a-h depict various views of various optics blocks and light modules.

Turning to FIG. 15a a rearview mirror assembly 1502a is depicted comprising a reflective element, a heater element 1571a, a foam backing material 1572a and a supplemental illumination assembly. The reflective element comprises a first substantially transparent substrate 1545a, an electro-optic medium 1550a and a second substrate 1560a. Preferably, the reflective element, the heater element and the foam backing material comprise transparent portions and, or, apertures substantially aligned with area 1571a3 in proximity with the refractive portions 1544a10, 1544a13. The supplemental illumination assembly comprises a printed circuit board 1501a, at least two light sources 1541a, 1548a with lenses 1541a1, 1548a1, respectively, and associated optics elements. In at least one embodiment, the a first light source 1541a and associated optics element is configured as a supplemental turning signal indicator assembly. The optics element comprises a collimating portion 1544a8, a light pipe 1544a9 and a refractive portion 1544a10 configured to direct substantially all of the light rays emitted by light source 1541a away from a driver of an associated vehicle. The second light source 1548a and associated optics element is configured as a door and, or, keyhole illuminator. The optics element comprises a collimating portion 1544a11, a light pipe 1544a12 and a refracting portion 1544a13 configured to direct substantially all of the light rays emitted by light source 1548a toward a door and, or, keyhole of an associated vehicle. It should be understood that an illumination assembly may be provided to function as a puddle light to substantially illuminate the ground area near the respective side of a vehicle in lieu of, or in addition to, the supplemental illumination assembly as depicted in FIG. 15a. In at least one embodiment, the printed circuit board is mounted with a primary optical axis of the associated light sources forming approximately a twenty degree angle with respect to the reflective element.

Figure 15B:
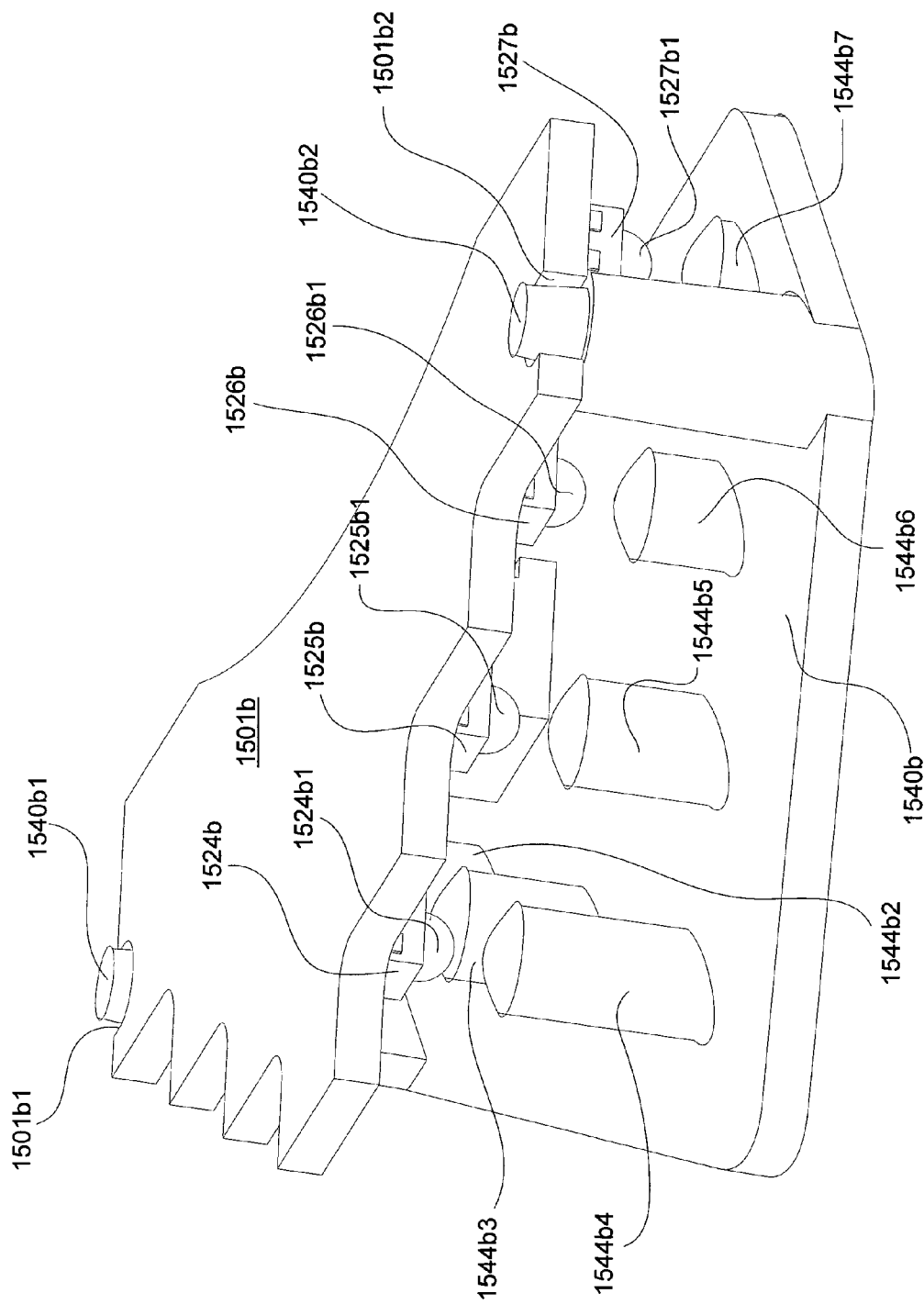

Turning to FIG. 15b perspective view of a supplemental turning signal indicator assembly is depicted comprising a printed circuit board 1501b and an optics block 1540b. The printed circuit board comprises optics block post receptacles 1501b1, 1501b2 and light sources 1524b, 1525b, 1526b, 1527b with associated lenses 1524b1, 1525b1, 1526b1, 1527b1. The optics block comprises optics block posts 1540b1, 1540b2 and optic elements 1544b2, 1544b3, 1544b4, 1544b5, 1544b6, 1544b7. In a preferred embodiment, each light source has an associated optic element. As can be seen from the figures, alignment of the supplemental turning indicator assembly with respect to the foam backing material, heater element, diffusing material and associated reflective element may be inspected with the supplemental turning indicator assembly in place; the supplemental turning indicator assembly does not block the view. This insures and improves manufacturing quality. The profile height of a preferred supplemental turning indicator assembly will be substantially equivalent to the width of an associated light source; the printed circuit board, electrical plug and optics are lower profile. Thereby, a supplemental turning indicator assembly having a profile height less than 1 cm is provided.

Figure 15D:
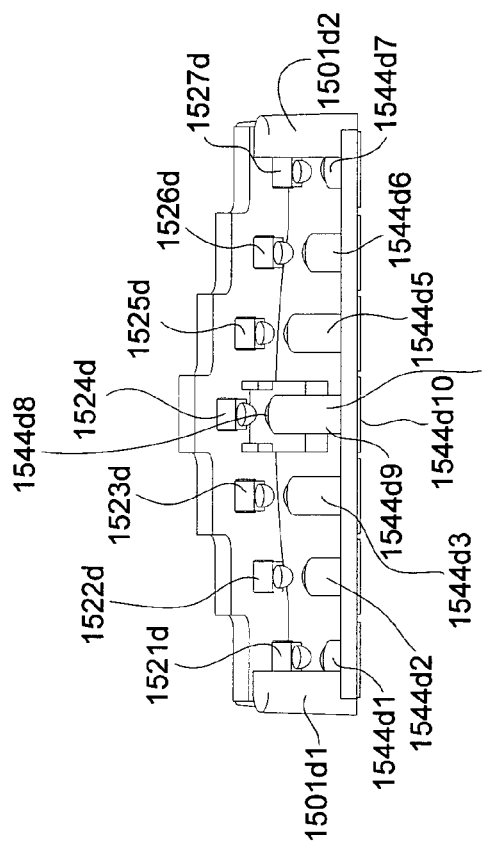
Figure 15C:
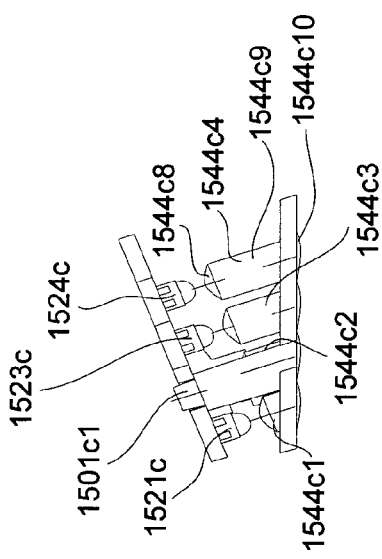

FIG. 15c depicts a profile view of a supplemental turning signal indicator assembly comprising a printed circuit board with light sources 1521c, 1523c, 1524c and an optics block. The optics block comprises an optics block post 1501c1 and optic elements 1544c1, 1544c2, 1544c3, 1544c4. In a preferred embodiment, each optic element comprises a collimating portion 1544c8, a light pipe 1544c9 and a refracting portion 1544c10.

FIG. 15d depicts a profile view of a supplemental turning signal indicator assembly comprising a printed circuit board with light sources 1521d, 1523d, 1524d, 1525d, 1526d, 1527d and an optics block. The optics block comprises optics block posts 1501d1, 1501d2 and optic elements 1544d1, 1544d2, 1544d3, 1544d4, 1544d5, 1544d6, 1544d7. In a preferred embodiment, each optic element comprises a collimating portion 1544d8, a light pipe 1544d9 and a refracting portion 1544d10.

Figure 15E:
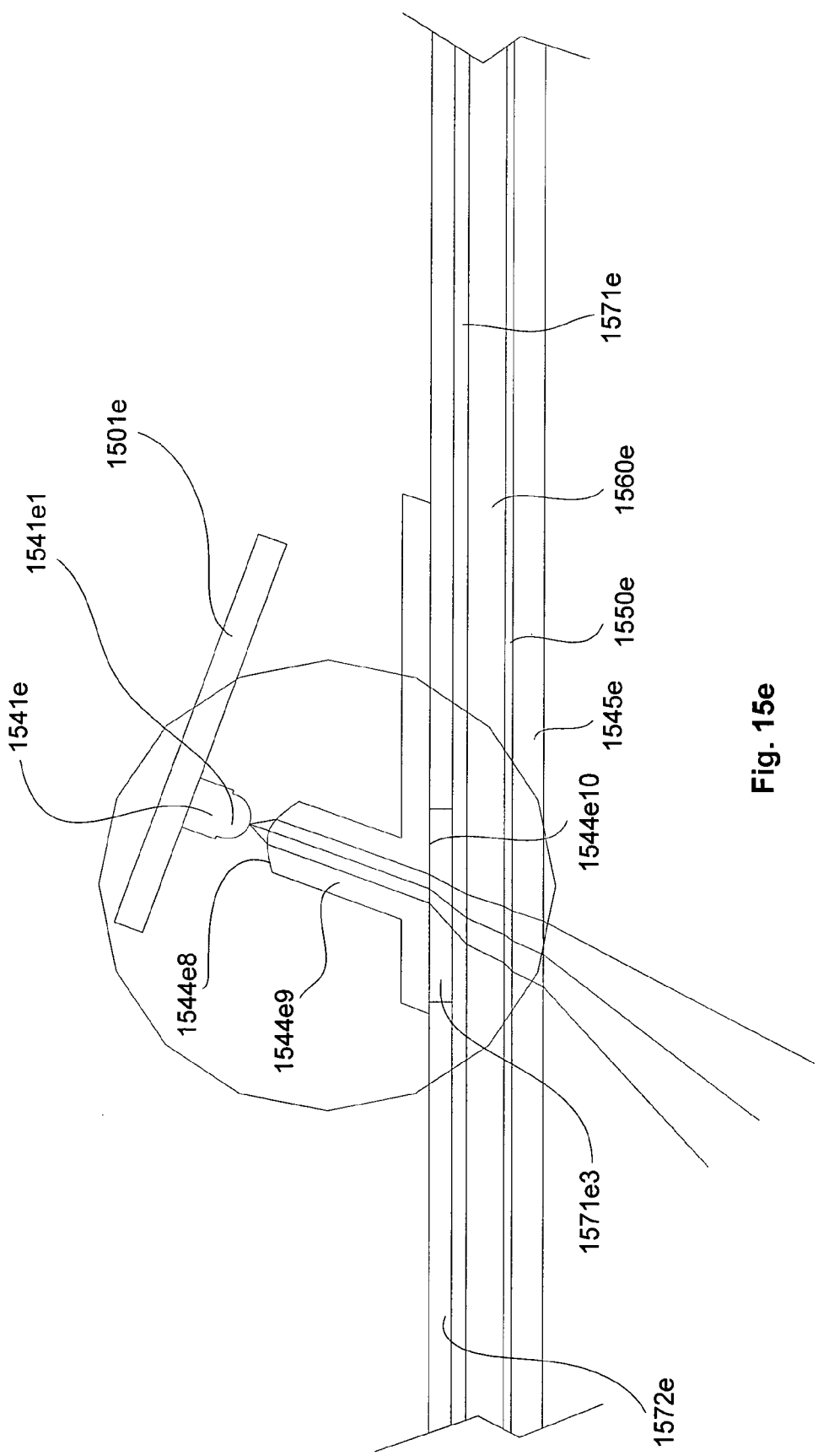

Turning to FIG. 15e, a rearview mirror assembly is depicted comprising a reflective element, a heater element 1571e, a foam backing material 1572e and a supplemental turning signal indicator assembly. The reflective element comprises a first substantially transparent substrate 1545e, an electro-optic medium 1550e and a second substrate 1560e. In a preferred embodiment, the heater element, the foam backing material and a reflective layer, or layers, of the reflective element comprise substantially transparent portions substantially aligned with area 1571e3 proximate a refractive portion 1544e10 of the optic element. It should be understood that a diffusing material may be positioned proximate the area 1571e3. The supplemental turning signal indicator assembly comprises a printed circuit board 1501e and an optic element. The printed circuit board comprises at least one light source 1541e having a lens 1541e1. The optic element comprises a collimating portion 1544e8, a light pipe 1544e9 and a refractive portion 1544e10. The encircled area of the assembly depicted in FIG. 15e is depicted in FIGS. 15f-h in exploded views.

Figure 15F:
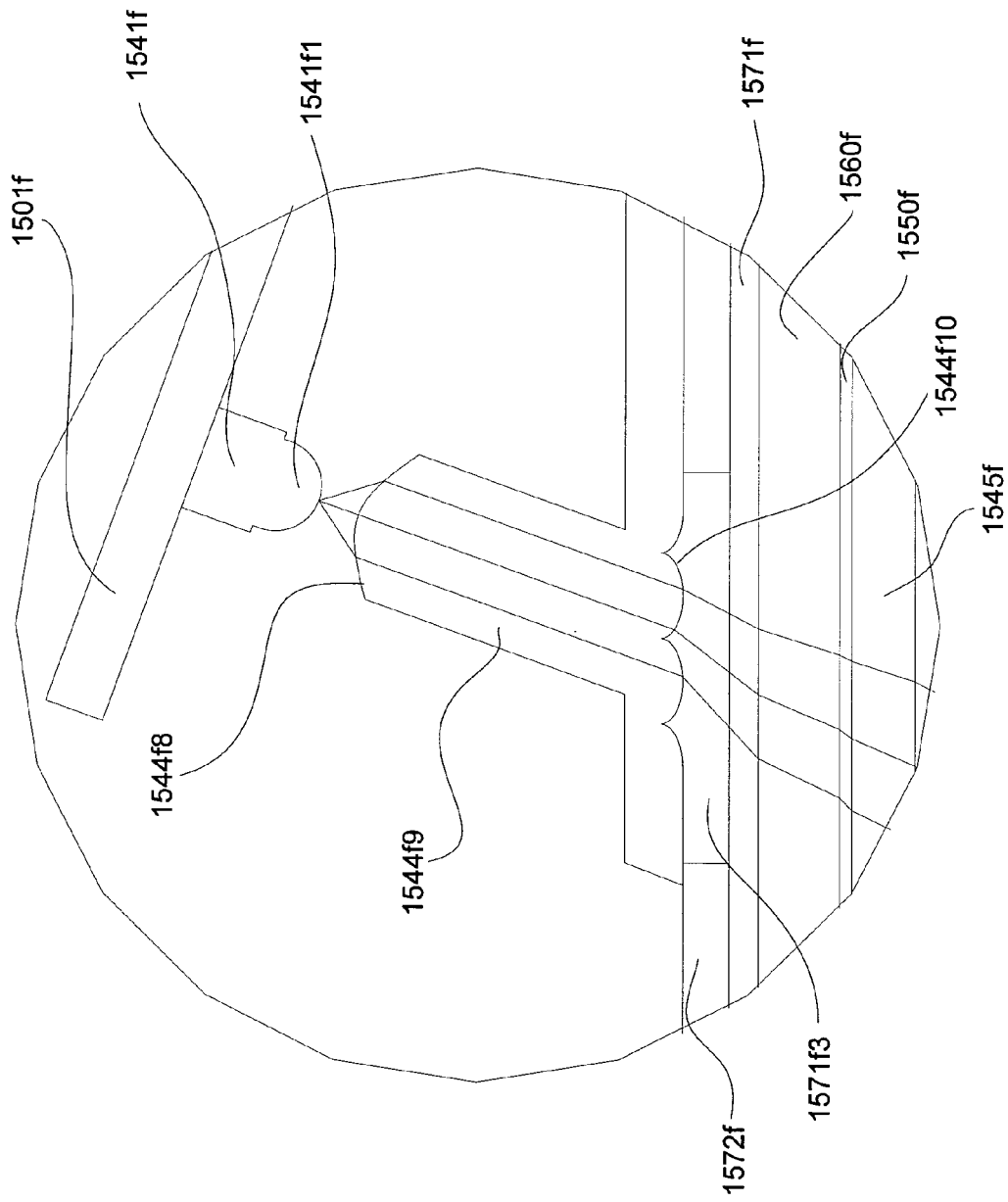

FIG. 15f depicts a profile view of a portion of a rearview mirror assembly comprising a reflective element, a heater element 1571f, a foam backing material 1572f and a supplemental turning signal indicator assembly. The reflective element comprises a first substantially transparent substrate 1545f, an electro-optic medium 1550f and a second substrate 1560f. An area 1571f3 is preferably substantially transparent and may comprise a diffusing material. The supplemental turning signal indicator assembly comprises a printed circuit board 1501f with a light source 1541f having a lens 1541f1 and an optic element. The optic element comprises a collimating portion 1544f8, a light pipe 1544f9 and a micro refracting portion 1544f10. In at least one related embodiment, the surface 1544f10 defines the desired beam pattern cross sectional shape. It should be understood that the beam pattern may be square, chevron, circular, oval, diamond, triangular, rectangular, subcombination thereof, combination thereof, etc.

Figure 15G:
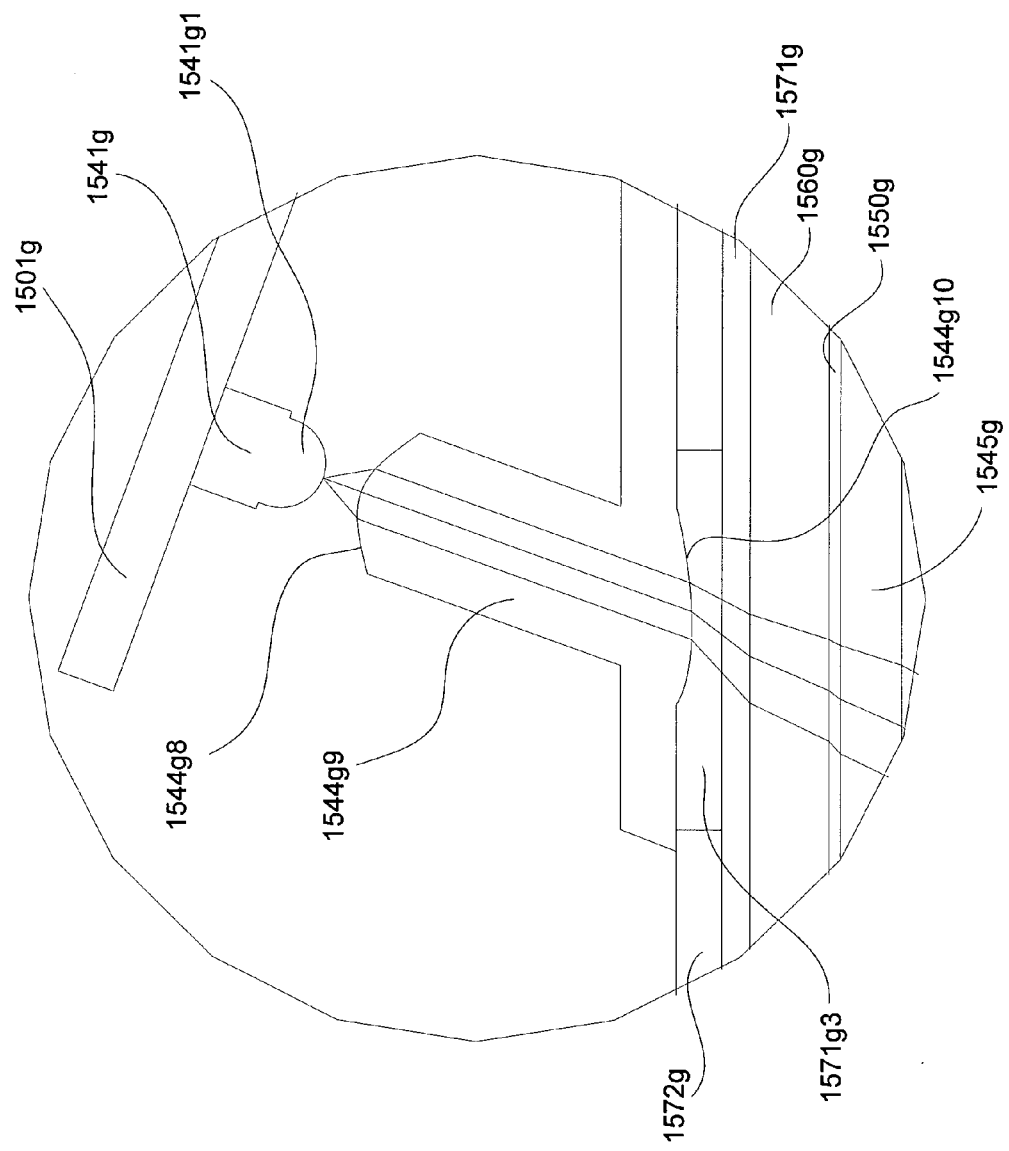

FIG. 15g depicts a profile view of a portion of a rearview mirror assembly comprising a reflective element, a heater element 1571g, a foam backing material 1572g and a supplemental turning signal indicator assembly. The reflective element comprises a first substantially transparent substrate 1545g, an electro-optic medium 1550g and a second substrate 1560g. An area 1571g3 is preferably substantially transparent and may comprise a diffusing material. The supplemental turning signal indicator assembly comprises a printed circuit board 1501g with a light source 1541g having a lens 1541g1 and an optic element. The optic element comprises a collimating portion 1544g8, a light pipe 1544g9 and a macro refracting portion 1544g10. In at least one related embodiment, the surface 1544g10 defines the desired beam pattern cross sectional shape. It should be understood that the beam pattern may be square, chevron, circular, oval, diamond, triangular, rectangular, subcombination thereof, combination thereof, etc.

Figure 15H:
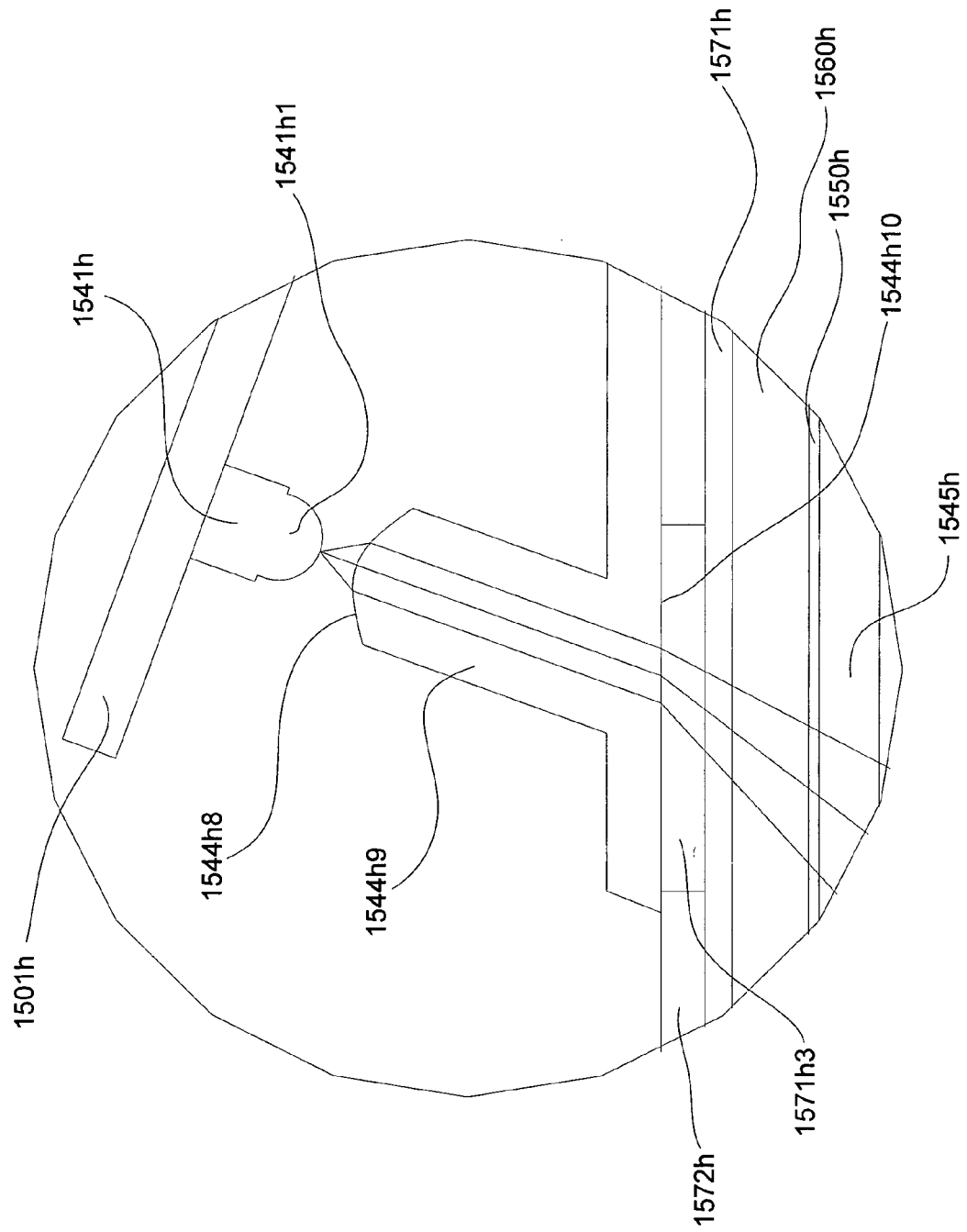

FIG. 15h depicts a profile view of a portion of a rearview mirror assembly comprising a reflective element, a heater element 1571h, a foam backing material 1572h and a supplemental turning signal indicator assembly. The reflective element comprises a first substantially transparent substrate 1545h, an electro-optic medium 1550h and a second substrate 1560h. An area 1571h3 is preferably substantially transparent and may comprise a diffusing material. The supplemental turning signal indicator assembly comprises a printed circuit board 1501h with a light source 1541h having a lens 1541h1 and an optic element. The optic element comprises a collimating portion 1544h8, a light pipe 1544h9 and a holographic refracting portion 1544h10. In at least one related embodiment, the surface 1544h10 defines the desired beam pattern cross sectional shape. It should be understood that the beam pattern may be square, chevron, circular, oval, diamond, triangular, rectangular, subcombination thereof, combination thereof, etc.

Turning to FIG. 16a, a profile view of a portion of a rearview mirror element is depicted comprising a reflective element 1660a and a supplemental illumination assembly. The supplemental illumination assembly comprises a printed circuit board 1601a with a light source 1621a having a lens 1621a1 and an optic element. The optic element comprises a collimating portion 1644a8, a first light pipe 1644a13, a first reflecting portion 1644a9, a second reflecting portion 1644a10, a second light pipe 1644a11 and a refracting portion 1644a12. As can be seen, the primary optical axis of the light source is oriented approximately 180 degrees with respect to orientation of a primary optical axis associated with the light rays emitted from the assembly.

FIG. 16b depicts a perspective view of a supplemental turning signal indicator assembly comprising a printed circuit board 1601b and an optics block 1640b. The printed circuit board comprises an electrical plug 1601b1 and seven light sources 1621b, 1622b, 1623b, 1624b, 1625b, 1626b, 1627b with lenses 1621b1, 1622b1, 1623b1, 1624b1, 1625b1, 1626b1, 1627b1, respectively. The optics block comprises seven optic elements 1644b1, 1644b2, 1644b3, 1644b4, 1644b5, 1644b6, 1644b7.

Preferably, each optic element comprises a first reflecting portion 1644b9 and a first light pipe 1644b13.

FIG. 16c depicts a perspective view of a supplemental turning signal indicator assembly comprising a printed circuit board 1601c and an optics block 1640c. The printed circuit board comprises light sources 1624c, 1625c, 1626c, 1627c with lenses 1627c1 and an electrical plug 1601c1. The optics block comprises seven optic elements 1644c1, 1644c2, 1644c3, 1644c4, 1644c5, 1644c6, 1644c7.

FIG. 16d depicts a plan view of a supplemental turning signal indicator assembly comprising a printed circuit board 1601d having an electrical plug 1601d1 and an optics block 1640d. The optics block comprises seven optic elements 1644d1, 1644d2, 1644d3, 1644d4, 1644d5, 1644d6, 1644d7. Preferably, each optic element comprises a first reflecting portion 1644d9, a second reflecting portion 1644d10 and a second light pipe 1644a11.

FIG. 16e depicts a profile view of a supplemental turning signal indicator assembly comprising a printed circuit board 1601e and an optics block 1640e. The printed circuit board comprises an electrical plug 1601e1 and light sources 1626e, 1627e with lenses 1627e1. The optics block comprises optic elements 1644e4, 1644e5, 1644e6, 1644e7.

FIG. 16f depicts a profile view of a supplemental turning signal indicator assembly comprising a printed circuit board 1601f and an optics block. The printed circuit board comprises an electrical plug 1601f1 and seven light sources 1621f, 1622f, 1623f, 1624f, 1625f, 1626f, 1627f. The optics block comprises seven optic elements 1644f1, 1644f2, 1644f3, 1644f4, 1644f5, 1644f6, 1644f7. In a preferred embodiment, each optic element comprises a first light pipe 1644f13 and a first reflecting portion 1644f9. In at least one embodiment each light source has a corresponding optic element for directing substantially all of the associated light rays to a desired field of view.

Although the present invention has been described with regard to specific embodiments, it should be understood that the scope of the present invention extends to all embodiments encompassed within the doctrine of equivalents.

What is claimed is:

1. An apparatus, comprising:
a visual signal assembly configured for vehicle mounting comprising:
a plurality of light sources defining a first pattern that is different from a second pattern defined from the perspective of a viewer of said visual signal assembly,
at least one printed circuit board, and
at least one optics block,
said plurality of light sources comprises at least a first and a second light source, wherein an optical axis of said first light source is approximately 180 degrees from an optical axis of said second light source and said first and second light sources are mounted to a common surface of said printed circuit board and emit light through said at least one optics block.

2. An apparatus as in claim 1 wherein said first pattern is linear.

3. An apparatus as in claim 1 wherein said second pattern substantially defines a chevron.

4. An apparatus as in claim 2 wherein said second pattern substantially defines a chevron.

5. An apparatus as in claim 1 configured as a supplemental turning signal indicator assembly.

6. An apparatus as in claim 1 further comprising a reflective element.

7. An apparatus as in claim 6 wherein said visual signal assembly is positioned behind said reflective element with respect to a viewer.

8. An apparatus as in claim 7 wherein said reflective element is electro-optic.

9. An apparatus as in claim 7 wherein said reflective element is prismatic.

10. An apparatus as in claim 1 wherein said second light source emits light rays that pass through a hole in said printed circuit board.

11. An apparatus as in claim 1, wherein at least one of said light sources is configured as a supplemental turning signal indicator assembly and at least one of said light sources is configured as a device selected from the group comprising: a door illuminator, a keyhole illuminator or a puddle light.

12. An apparatus, comprising:
a supplemental illumination assembly configured for vehicle mounting comprising:
at least one light source,
an optics block having substantially smooth optics for redirecting light rays emitted by at least one light source, and
at least one printed circuit board, said at least one light source comprises at least a first and a second light source, wherein an optical axis of said first light source is approximately 180 degrees from an optical axis of said second light source and said first and second light sources are mounted to a common surface of said printed circuit board.

13. An apparatus as in claim 12 configured as a supplemental turning signal indicator assembly.

14. An apparatus as in claim 12 further comprising a reflective element.

15. An apparatus as in claim 14 wherein said supplemental illumination assembly is positioned behind said reflective element with respect to a viewer.

16. An apparatus as in claim 15 wherein said reflective element is electro-optic.

17. An apparatus as in claim 15 wherein said reflective element is prismatic.

18. An apparatus as in claim 12 wherein said second light source emits light rays that pass through a hole in said printed circuit board.

19. An apparatus as in claim 12, wherein at least one of said light sources is configured as a supplemental turning signal indicator assembly and at least one of said light sources is configured as a device selected from the group comprising: a door illuminator, a keyhole illuminator or a puddle light.

20. An apparatus, comprising:
a reflective element configured for vehicle mounting,
a first light source, wherein said first light source comprises a primary optical axis and said first light source is mounted such that the primary optical axis is substantially parallel to a surface of said reflective element,
a second light source,
at least one printed circuit board, and
at least one optics block through which at least one of said first and second light sources emit light,
wherein said primary optical axis of said first light source is approximately 180 degrees from an optical axis of said second light source and said first and second light sources are mounted to a common surface of said printed circuit board.

21. An apparatus as in claim 20 configured as a supplemental turning signal indicator assembly.

22. An apparatus as in claim 21 wherein said light source assembly is positioned behind said reflective element with respect to a viewer.

23. An apparatus as in claim 22 wherein said reflective element is electro-optic.

24. An apparatus as in claim 22 wherein said reflective element is prismatic.

25. An apparatus as in claim 20 wherein said second light source emits light rays that pass through a hole in said printed circuit board.

26. An apparatus as in claim 20, wherein at least one of said light sources is configured as a supplemental turning signal indicator assembly and at least one of said light sources is configured as a device selected from the group comprising: a door illuminator, a keyhole illuminator or a puddle light.

27. An apparatus, comprising:
a supplemental illumination assembly configured for vehicle mounting, said supplemental illumination assembly comprises:
at least one light source comprising at least a first light source and a second light source,
at least one primary optic,
at least one secondary optic, wherein said primary optic redirects light rays associated with a primary optical axis of said first light source at an undesired angle with respect to a primary optical axis associated with light rays emanating from said secondary optic, and
at least one printed circuit board,
wherein said primary optical axis of said first light source is approximately 180 degrees from an optical axis of said second light source and said first and second light sources are mounted to a common surface of said printed circuit board.

28. An apparatus as in claim 27 configured as a supplemental turning signal indicator assembly.

29. An apparatus as in claim 27 further comprising a reflective element.

30. An apparatus as in claim 29 wherein said supplemental illumination assembly is positioned behind said reflective element with respect to a viewer.

31. An apparatus as in claim 30 wherein said reflective element is electro-optic.

32. An apparatus as in claim 30 wherein said reflective element is prismatic.

33. An apparatus as in claim 27 wherein said second light source emits light rays that pass through a hole in said printed circuit board.

34. An apparatus as in claim 27, wherein at least one of said light sources is configured as a supplemental turning signal indicator assembly and at least one of said light sources is configured as a device selected from the group comprising: a door illuminator, a keyhole illuminator or a puddle light.

* * * * *